(12) United States Patent
Mech et al.

(10) Patent No.: US 12,277,652 B2
(45) Date of Patent: Apr. 15, 2025

(54) MODIFYING TWO-DIMENSIONAL IMAGES UTILIZING SEGMENTED THREE-DIMENSIONAL OBJECT MESHES OF THE TWO-DIMENSIONAL IMAGES

(71) Applicant: Adobe Inc., San Jose, CA (US)

(72) Inventors: Radomir Mech, Mountain View, CA (US); Nathan Carr, San Jose, CA (US); Matheus Gadelha, San Jose, CA (US)

(73) Assignee: Adobe Inc., San Jose, CA (US)

( * ) Notice: Subject to any disclaimer, the term of this patent is extended or adjusted under 35 U.S.C. 154(b) by 166 days.

(21) Appl. No.: 18/055,585

(22) Filed: Nov. 15, 2022

(65) Prior Publication Data

US 2024/0161405 A1    May 16, 2024

(51) Int. Cl.
*G06T 17/20* (2006.01)
*G06T 7/11* (2017.01)
(Continued)

(52) U.S. Cl.
CPC .............. *G06T 17/205* (2013.01); *G06T 7/11* (2017.01); *G06T 7/50* (2017.01); *G06T 7/70* (2017.01); *G06T 11/60* (2013.01); *G06V 20/70* (2022.01); *G06T 2200/08* (2013.01); *G06T 2200/24* (2013.01); *G06T 2207/20021* (2013.01); *G06T 2207/20084* (2013.01); *G06T 2207/20228* (2013.01)

(58) Field of Classification Search
None
See application file for complete search history.

(56) References Cited

U.S. PATENT DOCUMENTS 8,289,318 B1    10/2012    Hadap et al.
8,830,237 B2 *   9/2014    Zimmermann ......... G06T 19/20
                                                           345/419
(Continued)

OTHER PUBLICATIONS

U.S. Appl. No. 18/055,590, Apr. 8, 2024, Office Action.
(Continued)

*Primary Examiner* — Sultana M Zalalee
(74) *Attorney, Agent, or Firm* — Keller Preece PLLC

(57) ABSTRACT

Methods, systems, and non-transitory computer readable storage media are disclosed for generating three-dimensional meshes representing two-dimensional images for editing the two-dimensional images. The disclosed system utilizes a first neural network to determine density values of pixels of a two-dimensional image based on estimated disparity. The disclosed system samples points in the two-dimensional image according to the density values and generates a tessellation based on the sampled points. The disclosed system utilizes a second neural network to estimate camera parameters and modify the three-dimensional mesh based on the estimated camera parameters of the pixels of the two-dimensional image. In one or more additional embodiments, the disclosed system generates a three-dimensional mesh to modify a two-dimensional image according to a displacement input. Specifically, the disclosed system maps the three-dimensional mesh to the two-dimensional image, modifies the three-dimensional mesh in response to a displacement input, and updates the two-dimensional image.

20 Claims, 39 Drawing Sheets

(51) Int. Cl.
*G06T 7/50* (2017.01)
*G06T 7/70* (2017.01)
*G06T 11/60* (2006.01)
*G06V 20/70* (2022.01)

(56) References Cited

U.S. PATENT DOCUMENTS

| | | | |
|---|---|---|---|
| 9,153,209 B2* | 10/2015 | Dmitriev | G09G 5/363 |
| 10,043,279 B1 | 8/2018 | Eshet | |
| 10,460,214 B2 | 10/2019 | Lu et al. | |
| 10,679,046 B1 | 6/2020 | Black et al. | |
| 10,691,286 B2 | 6/2020 | King et al. | |
| 10,930,075 B2 | 2/2021 | Costa et al. | |
| 11,094,083 B2 | 8/2021 | Eisenmann et al. | |
| 11,217,035 B2 | 1/2022 | Hajjar | |
| 11,263,823 B2 | 3/2022 | Gauseback et al. | |
| 11,494,995 B2 | 11/2022 | Berkebile | |
| 11,514,638 B2* | 11/2022 | Lafer | G06T 7/50 |
| 11,741,668 B2 | 8/2023 | Jones et al. | |
| 11,869,152 B2 | 1/2024 | Koh et al. | |
| 11,881,049 B1* | 1/2024 | Soltz | G06T 17/205 |
| 12,026,845 B2 | 7/2024 | Pardeshi | |
| 12,141,916 B2 | 11/2024 | Brown et al. | |
| 2011/0018873 A1 | 1/2011 | Chang et al. | |
| 2011/0298799 A1 | 12/2011 | Mariani et al. | |
| 2012/0081357 A1 | 4/2012 | Habbecke et al. | |
| 2013/0135305 A1 | 5/2013 | Bystrov et al. | |
| 2014/0359536 A1 | 12/2014 | Cheng et al. | |
| 2016/0035068 A1 | 2/2016 | Wilensky et al. | |
| 2016/0063669 A1 | 3/2016 | Wilensky et al. | |
| 2016/0119670 A1 | 4/2016 | Izutsu et al. | |
| 2018/0158230 A1 | 6/2018 | Yan et al. | |
| 2018/0218535 A1 | 8/2018 | Ceylan et al. | |
| 2018/0329485 A1 | 11/2018 | Carothers et al. | |
| 2019/0026958 A1 | 1/2019 | Gausebeck et al. | |
| 2019/0065026 A1 | 2/2019 | Kiemele et al. | |
| 2019/0130229 A1 | 5/2019 | Lu et al. | |
| 2019/0354699 A1* | 11/2019 | Pekelny | H04L 63/105 |
| 2020/0020173 A1 | 1/2020 | Sharif et al. | |
| 2020/0175756 A1 | 6/2020 | Crowe et al. | |
| 2021/0005026 A1 | 1/2021 | Lesbordes | |
| 2021/0065440 A1 | 3/2021 | Sunkavalli et al. | |
| 2021/0074062 A1 | 3/2021 | Madonna et al. | |
| 2021/0097776 A1 | 4/2021 | Faulkner et al. | |
| 2021/0335039 A1* | 10/2021 | Jones | G06T 19/20 |
| 2021/0343080 A1 | 11/2021 | Kim et al. | |
| 2021/0398351 A1 | 12/2021 | Papandreou et al. | |
| 2022/0068007 A1 | 3/2022 | Lafer et al. | |
| 2022/0068037 A1 | 3/2022 | Pardeshi | |
| 2022/0222887 A1 | 7/2022 | Hundal et al. | |
| 2022/0284613 A1 | 9/2022 | Yin et al. | |
| 2022/0292352 A1* | 9/2022 | Jourdan | G06T 7/11 |
| 2022/0414834 A1 | 12/2022 | Du et al. | |
| 2023/0033956 A1 | 2/2023 | Yong et al. | |
| 2023/0080584 A1 | 3/2023 | Zohar et al. | |
| 2023/0117686 A1* | 4/2023 | Jain | G06V 10/70 |
| | | | 345/423 |
| 2023/0140460 A1 | 5/2023 | Munkberg et al. | |
| 2023/0141494 A1 | 5/2023 | Brown et al. | |
| 2023/0143034 A1* | 5/2023 | Wu | G06T 7/50 |
| | | | 345/423 |
| 2023/0230321 A1 | 7/2023 | Schreckenbert et al. | |
| 2023/0239458 A1 | 7/2023 | Clares et al. | |
| 2023/0281925 A1 | 9/2023 | Aigerman et al. | |
| 2023/0290090 A1* | 9/2023 | Su | G06T 17/00 |
| 2023/0298269 A1 | 9/2023 | Genova et al. | |
| 2023/0306686 A1 | 9/2023 | Zangenehpour et al. | |
| 2023/0326028 A1 | 10/2023 | Zhang et al. | |
| 2023/0368339 A1 | 11/2023 | Zheng et al. | |
| 2024/0013462 A1 | 1/2024 | Seol et al. | |
| 2024/0037717 A1 | 2/2024 | Amirghodsi et al. | |
| 2024/0112396 A1 | 4/2024 | Spencer | |
| 2024/0135572 A1 | 4/2024 | Singh et al. | |
| 2024/0144520 A1 | 5/2024 | Gori et al. | |
| 2024/0144586 A1 | 5/2024 | Hold-Geoffroy et al. | |
| 2024/0144623 A1 | 5/2024 | Gori et al. | |
| 2024/0161320 A1 | 5/2024 | Gadelha et al. | |
| 2024/0161366 A1 | 5/2024 | Mech et al. | |
| 2024/0161405 A1 | 5/2024 | Mech et al. | |
| 2024/0161406 A1 | 5/2024 | Mech et al. | |

OTHER PUBLICATIONS

U.S. Appl. No. 18/304,162, Apr. 25, 2024, Notice of Allowance.
U.S. Appl. No. 18/055,584, Jun. 21, 2024, Office Action.
Abhishek Kar, Shubham Tulsiani, Joao Carreira, and Jitendra Malik. Amodal completion and size constancy in natural scenes. In Proceedings of the IEEE international conference on computer vision, pp. 127-135, 2015.
Angel Chang, Angela Dai, Thomas Funkhouser, Maciej Halber, Matthias Niessner, Manolis Savva, Shuran Song, Andy Zeng, and Yinda Zhang. Matterport3d: Learning from rgb-d data in indoor environments. International Conference on 3D Vision (3DV), 2017.
Antonio Criminisi, Ian Reid, and Andrew Zisserman. Single view metrology. International Journal of Computer Vision, 40(2):123-148, 2000.
Ben Mildenhall, Pratul P Srinivasan, Matthew Tancik, Jonathan T Barron, Ravi Ramamoorthi, and Ren Ng. Nerf: Representing scenes as neural radiance fields for view synthesis. Communications of the ACM, 65(1):99-106, 2021.
Benjamin Ummenhofer, Huizhong Zhou, Jonas Uhrig, Nikolaus Mayer, Eddy Ilg, Alexey Dosovitskiy, and Thomas Brox. Demon: Depth and motion network for learning monocular stereo. In Proceedings of the IEEE conference on computer vision and pattern recognition, pp. 5038-5047, 2017.
Byeong-Uk Lee, Kyunghyun Lee, and In So Kweon. Depth completion using plane-residual representation. In Proceedings of the IEEE/CVF Conference on Computer Vision and Pattern Recognition, pp. 13916-13925, 2021.
Derek Hoiem, Alexei A Efros, and Martial Hebert. Putting objects in perspective. International Journal of Computer Vision, 80(1):3-15, 2008.
Enric Corona, Albert Pumarola, Guillem Alenyà, Gerard Pons-Moll, Francesc Moreno-Noguer—SMPLicit: Topology-aware Generative Model for Clothed People, Corona et al., 2021.
Fangchang Ma and Sertac Karaman. Sparse-to-dense: Depth prediction from sparse depth samples and a single image. In 2018 IEEE international conference on robotics and automation (ICRA), pp. 4796-4803. IEEE, 2018.
Hyunjoon Lee, Eli Shechtman, Jue Wang, and Seungyong Lee. Automatic upright adjustment of photographs with robust camera calibration. IEEE transactions on pattern analysis and machine intelligence, 36(5):833-844, 2013.
Iro Armeni, Sasha Sax, Amir R Zamir, and Silvio Savarese. Joint 2d-3d-semantic data for indoor scene understanding. arXiv preprint arXiv:1702.01105, 2017.
Jeong Joon Park, Peter Florence, Julian Straub, Richard Newcombe, and Steven Lovegrove. Deepsdf: Learning continuous signed distance functions for shape representation. In Proceedings of the IEEE/CVF conference on computer vision and pattern recognition, pp. 165-174, 2019.
Jia Deng, Wei Dong, Richard Socher, Li-Jia Li, Kai Li, and Li Fei-Fei. Imagenet: A large-scale hierarchical image database. In 2009 IEEE conference on computer vision and pattern recognition, pp. 248-255. Ieee, 2009.
Jia-Ren Chang and Yong-Sheng Chen. Pyramid stereo matching network. In Proceedings of the IEEE conference on computer vision and pattern recognition, pp. 5410-5418, 2018.
Jin Han Lee, Myung-Kyu Han, Dong Wook Ko, Il Hong Suh. From big to small: Multi-scale local planar guidance for monocular depth estimation. arXiv preprint arXiv:1907.10326, 2019.
Johannes Kopf, Xuejian Rong, and Jia-Bin Huang. Robust consistent video depth estimation. In Proceedings of the IEEE/CVF Conference on Computer Vision and Pattern Recognition, pp. 1611-1621, 2021.
Jonathan Deutscher, Michael Isard, and John MacCormick. Automatic camera calibration from a single manhattan image. In European Conference on Computer Vision, pp. 175-188. Springer, 2002.

(56) References Cited

OTHER PUBLICATIONS

Kevin Lin, Lijuan Wang, Zicheng Liu—End-to-End Human Pose and Mesh Reconstruction with Transformers, CVPR (2021).
Kripasindhu Sarkar, Vladislav Golyanik, Lingjie Liu, Christian Theobalt—Style and Pose Control for Image Synthesis of Humans from a Single Monocular View, Sarkar et al., 2021.
Menghua Zhai, Scott Workman, and Nathan Jacobs. Detecting vanishing points using global image context in a non-manhattan world. In Proceedings of the IEEE Conference on Computer Vision and Pattern Recognition, pp. 5657-5665, 2016.
Nikolaus Mayer, Eddy Ilg, Philip Hausser, Philipp Fischer, 942 Daniel Cremers, Alexey Dosovitskiy, and Thomas Brox. A large dataset to train convolutional networks for disparity, optical flow, and scene flow estimation. In Proceedings of the IEEE conference on computer vision and pattern recognition, pp. 4040-4048, 2016.
Olaf Ronneberger, Philipp Fischer, and Thomas Brox. U-net: Convolutional networks for biomedical image segmentation. In International Conference on Medical image computing and computer-assisted intervention, pp. 234-241.Springer, 2015.
Olga Barinova, Victor Lempitsky, Elena Tretiak, and Pushmeet Kohli. Geometric image parsing in man-made environments. In European conference on computer vision, pp. 57-70. Springer, 2010.
Patrick Denis, James H Elder, and Francisco J Estrada. Efficient edge-based methods for estimating manhattan frames in urban imagery. In European conference on computer vision, pp. 197-210. Springer, 2008.
Renè Ranftl, Katrin Lasinger, David Hafner, Konrad Schindler, and Vladlen Koltun. Towards robust monocular depth estimation: Mixing datasets for zero-shot cross-dataset transfer. IEEE transactions on pattern analysis and machine intelligence, 2020.
Ricardo Martin-Brualla, Noha Radwan, Mehdi SM Sajjadi, Jonathan T Barron, Alexey Dosovitskiy, and Daniel Duckworth. Nerf in the wild: Neural radiance fields for unconstrained photo collections. In Proceedings of the IEEE/CVF Conference on Computer Vision and Pattern Recognition, pp. 7210-7219, 2021.
Rui Zhu, Xingyi Yang, Yannick Hold-Geoffroy, Federico Perazzi, Jonathan Eisenmann, Kalyan Sunkavalli, and Man-mohan Chandraker. Single view metrology in the wild. In European Conference on Computer Vision, pp. 316-333. Springer, 2020.
Scott Workman, Connor Greenwell, Menghua Zhai, Ryan Baltenberger, and Nathan Jacobs. Deepfocal: A method for direct focal length estimation. In 2015 IEEE International Conference on Image Processing (ICIP), pp. 1369-1373. IEEE, 2015.
Scott Workman, Menghua Zhai, and Nathan Jacobs. Horizon lines in the wild. arXiv preprint arXiv:1604.02129, 2016.
Shariq Farooq Bhat, Ibraheem Alhashim, and Peter Wonka. Adabins: Depth estimation using adaptive bins. In Proceedings of the IEEE/CVF Conference on Computer Vision and Pattern Recognition, pp. 4009-4018, 2021.
Thomas Muller, Alex Evans, Christoph Schied, and Alexander Keller. Instant neural graphics primitives with a multiresolution hash encoding. arXiv preprint arXiv:2201.05989, 2022.
Tinghui Zhou, Matthew Brown, Noah Snavely, and David G Lowe. Unsupervised learning of depth and ego-motion from video. In Proceedings of the IEEE conference on computer vision and pattern recognition, pp. 1851-1858, 2017.
Wei Yin, Jianming Zhang, Oliver Wang, Simon Niklaus, Long Mai, Simon Chen, and Chunhua Shen. Learning to recover 3d scene shape from a single image. In Proceedings of the IEEE/CVF Conference on Computer Vision and Pattern Recognition, pp. 204-213, 2021.
Wenhai Wang, Enze Xie, Xiang Li, Deng-Ping Fan, Kaitao Song, Ding Liang, Tong Lu, Ping Luo, and Ling Shao. Pvt v2: Improved baselines with pyramid vision transformer. Computational Visual Media, 8(3):415-424, 2022.
Xie et al., SegFormer: Simple and Efficient Design for Semantic Segmentation with Transformers, 2021.
Xuan Luo, Jia-Bin Huang, Richard Szeliski, Kevin Matzen, and Johannes Kopf. Consistent video depth estimation. ACM Transactions on Graphics (ToG), 39(4):71-1, 2020.
Yannick Hold-Geoffroy, Kalyan Sunkavalli, Jonathan Eisenmann, Matthew Fisher, Emiliano Gambaretto, Sunil Hadap, and Jean-Francois Lalonde. A perceptual measure for deep single image camera calibration. In Proceedings of the IEEE Conference on Computer Vision and Pattern Recognition, pp. 2354-2363, 2018.
Yao Yao, Zixin Luo, Shiwei Li, Tian Fang, and Long Quan. Mvsnet: Depth inference for unstructured multi-view stereo. In Proceedings of the European conference on computer vision (ECCV), pp. 767-783, 2018.
Zhe Cao, Gines Hildago, Tomas Simon, Shih-En Wei, Yaser Sheikh—OpenPose—Realtime Multi-Person 2D Pose Estimation using Part Affinity Fields, CVPS (2019).
Zhengqi Li, Tali Dekel, Forrester Cole, Richard Tucker, Noah Snavely, Ce Liu, and William T Freeman. Learning the depths of moving people by watching frozen people. In Proceedings of the IEEE/CVF conference on computer vision and pattern recognition, pp. 4521-4530, 2019.
Office Action as received in CN Application No. 2023112860680.7 dated Nov. 2, 2023.
Combined Search Report and Written Opinion as received in GB 2312456.3 dated Feb. 15, 2024.
Lili Wang et al., "Bidirectional Shadow Rendering for Interactive Mixed 360° Videos", 2021 IEEE Virtual Reality and 3D User Interfaces (VR), p. 170-178, 2021.
U.S. Appl. No. 18/055,590 filed Sep. 17, 2024.
U.S. Appl. No. 18/304,162 filed Sep. 11, 2024.
Combined Search Report and Written Opinion as received in GB 2402407.7 dated Jul. 9, 2024.
S. Lv, X. Yang, L. Gu, X. Xing, L. Pan and M. Fang, "Delaunay Mesh Reconstruction from 3D Medical Images Based on Centroidal Voronoi Tessellations," 2009 International Conference on Computational Intelligence and Software Engineering, Wuhan, China, 2009, pp. 1-4, doi: 10.1109/CISE.2009.5364777. (Year: 2009).
Shrivastava, S. (2020). Stereo Vision Based Object Detection Using V-Disparity and 3D Density-Based Clustering. In: Arai, K., Kapoor, S. (eds) Advances in Computer Vision. CVC 2019. Advances in Intelligent Systems and Computing, vol. 944. Springer, Cham. (Year: 2019).
Watson, Jamie, Oisin Mac Aodha, Daniyar Turmukhambetov, Gabriel J. Brostow and Michael Firman. University of Edinburgh. "Learning Stereo from Single Images." European Conference on Computer Vision (2020). Aug. 2020. (Year: 2020).
U.S. Appl. No. 18/055,584, Dec. 16. 2024, Office Action.
U.S. Appl. No. 18/055,590, Feb. 3, 2025, Notice of Allowance.
U.S. Appl. No. 18/055,594, Mar. 5, 2025, Notice of Allowance.
U.S. Appl. No. 18/304,144, Mar. 10, 2025, Office Action.
U.S. Appl. No. 18/304,147, Jan. 21, 2025, Office Action.
Combined Search Report and Written Opinion as received in GB 2403090.0 dated Jan. 28, 2025.
Chung-Yi Weng et al. "Photo Wake-Up: 3D Character Animation from a Single Photo", IEEE/CVF Conference on Computer Vision and Pattern Recognition (CVPR), pp. 5908-5917 (2019).
Federica Bogo et al. "Keep it SMPL: Automatic Estimation of 3D Human Pose and Shape from a Single Image", ECCV, pp. 561-578 (2016).
Imry Kissos et al. "Beyond Weak Perspective for Monocular 3D Human Pose Estimation", Springer Nature, pp. 541-554 (2020).
Shih-En Wei et al. "Convolutional Pose Machines", IEEE Conference on Computer Vision and Pattern Recognition (CVPR), pp. 4724-4732 (2016).

* cited by examiner

MODIFYING TWO-DIMENSIONAL IMAGES UTILIZING SEGMENTED THREE-DIMENSIONAL OBJECT MESHES OF THE TWO-DIMENSIONAL IMAGES

BACKGROUND

Improvements to computer processing technologies have led to significant advancements in the field of image processing. Many industries utilize image processing techniques including machine-learning models to manipulate digital images in a variety of ways. To illustrate, many entities use neural network image processing to detect and modify objects of two-dimensional images for further modification via image editing tools. Editing digital images using image processing applications with existing image editing tools, however, can often be a time-consuming and computationally expensive task that requires significant experience with the image editing tools. Furthermore, many entities are adapting image editing applications for use on a variety of devices with limited processing resources or user interface capabilities, thereby providing increased utility of lightweight, flexible image processing models.

SUMMARY

This disclosure describes one or more embodiments of methods, non-transitory computer readable media, and systems that solve the foregoing problems (in addition to providing other benefits) by generating adaptive three-dimensional meshes representing two-dimensional images for editing the two-dimensional images. Specifically, in one or more embodiments, the disclosed systems utilize a first neural network to determine density values of pixels of a two-dimensional image based on estimated disparity. The disclosed systems sample points in the two-dimensional image according to the density values and generate a tessellation based on the sampled points. Furthermore, the disclosed systems utilize a second neural network to estimate camera parameters for the two-dimensional image and modify the three-dimensional mesh based on the camera parameters of the pixels of the two-dimensional image.

In one or more embodiments, the disclosed systems utilize a three-dimensional mesh representing a two-dimensional image to modify a two-dimensional image. In some embodiments, the three-dimensional mesh includes an adaptive three-dimensional mesh representing the two-dimensional image. Alternatively, the disclosed systems generate a three-dimensional mesh via uniform tessellation based on pixel depth values and estimated camera parameters for the two-dimensional image. In particular, in response to a displacement input to modify the two-dimensional image within a graphical user interface, the disclosed systems modify the three-dimensional mesh representing the two-dimensional image. For example, the disclosed systems identify a portion of the three-dimensional mesh corresponding to the displacement input and displace the portion of the three-dimensional mesh. The disclosed systems also modify the two-dimensional image based on the displaced portion of the three-dimensional mesh according to a mapping between the three-dimensional mesh and the two-dimensional image.

According to one or more embodiments, the disclosed systems modify a two-dimensional image based on segmented three-dimensional object meshes representing objects in the two-dimensional image. Specifically, the disclosed systems generate a three-dimensional mesh representing the two-dimensional image (e.g., an adaptive three-dimensional mesh or a three-dimensional mesh based on pixel depth values and estimated camera parameters). Additionally, the disclosed systems segment the three-dimensional mesh into a plurality of separate three-dimensional object meshes corresponding to separate objects in the two-dimensional image. The disclosed systems modify the two-dimensional image in response to a displacement input by displacing a portion of a selected three-dimensional object mesh.

In one or more embodiments, the disclosed systems perform an iterative tessellation process for modifying two-dimensional images. For example, the disclosed systems generate an initial three-dimensional mesh representing a two-dimensional image and modify the initial three-dimensional mesh in response to a displacement input. Additionally, the disclosed systems modify the two-dimensional image based on a displaced portion of the initial three-dimensional mesh. In response to an action to commit the modification to the two-dimensional image, the disclosed systems perform an additional tessellation iteration by generating an updated three-dimensional mesh from the modified two-dimensional image.

BRIEF DESCRIPTION OF THE DRAWINGS

Various embodiments will be described and explained with additional specificity and detail through the use of the accompanying drawings in which.

DETAILED DESCRIPTION

Figure 1:
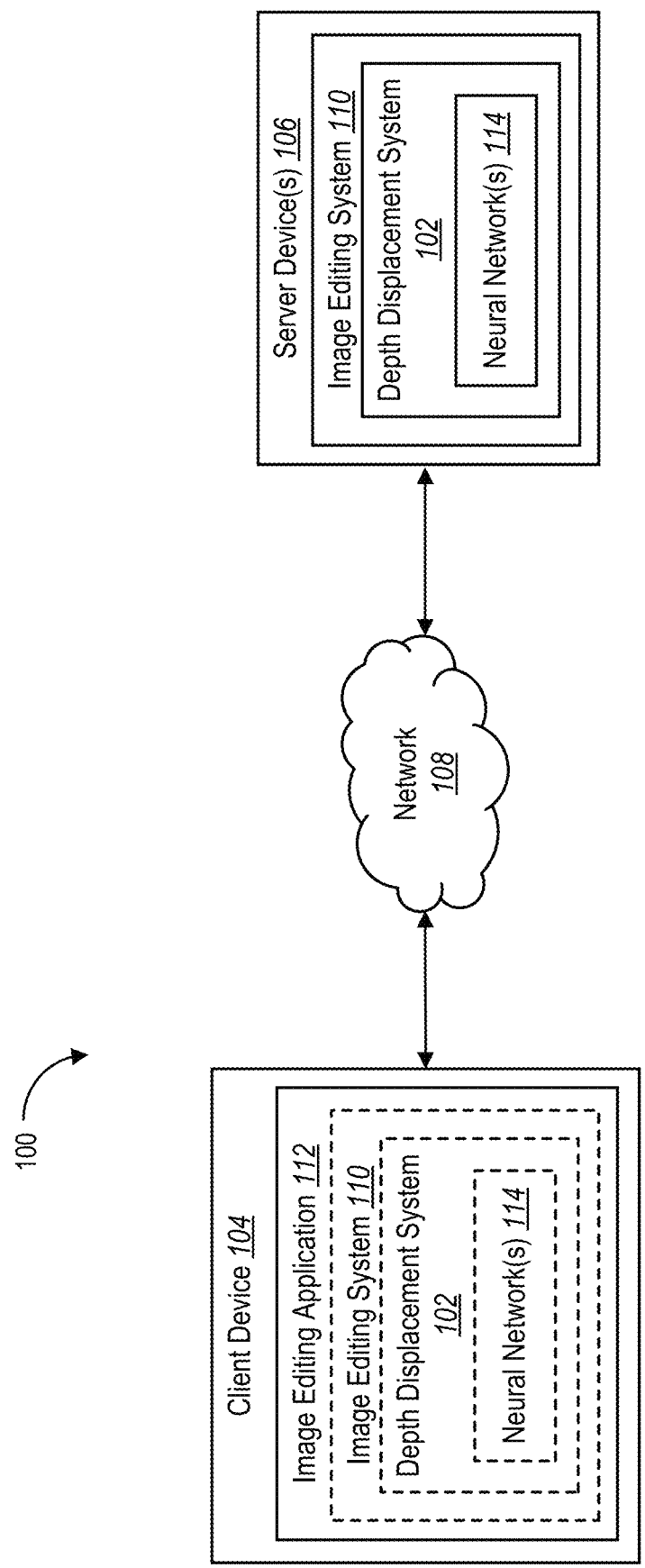
FIG. 1 illustrates an example system environment in which a depth displacement system operates in accordance with one or more implementations.

This disclosure describes one or more embodiments of a depth displacement system that generates a three-dimensional mesh representing a two-dimensional image for modifying the two-dimensional image. Specifically, the depth displacement system utilizes neural networks to generate a three-dimensional mesh of a two-dimensional image to represent the depth displacement of content of the two-dimensional image in a three-dimensional environment. In one or more embodiments, the depth displacement system generates the three-dimensional mesh as an adaptive three-dimensional mesh including depth displacement information. The depth displacement system modifies the three-dimensional mesh in response to a displacement input via the two-dimensional image. Additionally, the depth displacement system modifies the two-dimensional image based on the modified portion(s) of the three-dimensional mesh according to the displacement input. Thus, the depth displacement system provides real-time displacement of portions of a two-dimensional image while maintaining depth details of the content of the two-dimensional image.

As mentioned, in one or more embodiments, the depth displacement system generates an adaptive three-dimensional mesh that represents depth displacement of content in a two-dimensional image. In particular, the depth displacement system utilizes one or more neural networks to determine density values of pixels in a two-dimensional image based on disparity estimation for the two-dimensional image. More specifically, the depth displacement system determines the rate of change of the change (e.g., the second derivative) in depth for the pixels of the two-dimensional image. For example, the depth displacement system utilizes a plurality of filtering operations to determine density values for use in sampling a plurality of points in connection with the two-dimensional image.

According to one or more additional embodiments, the depth displacement system utilizes density values of a two-dimensional image to sample points from the two-dimensional image. For instance, the depth displacement system samples a plurality of points based on the density values in a density map in one or more sampling iterations. Accordingly, the depth displacement system samples a number of points at different locations corresponding to the two-dimensional image based on the density of depth information at the different locations.

In one or more embodiments, the depth displacement system tessellates a two-dimensional image based on sampled points. In particular, the depth displacement system generates an initial three-dimensional mesh of the two-dimensional image by triangulating the sampled points. Furthermore, the depth displacement system incorporates depth information into the tessellation of the two-dimensional image based on camera parameters associated with the two-dimensional image. For example, the depth displacement system utilizes one or more neural networks to estimate the camera parameters and modify the initial three-dimensional mesh to include displacement of the vertices based on the depth information according to the estimated camera parameters.

According to one or more embodiments, the depth displacement system leverages a three-dimensional mesh of a two-dimensional image to modify the two-dimensional image. In one or more embodiments, the three-dimensional mesh includes an adaptive three-dimensional mesh of the two-dimensional image, as described above. In alternative embodiments, the three-dimensional mesh includes a three-dimensional mesh with a tessellation from pixel depth values and estimated camera parameters of the two-dimensional image. Specifically, the depth displacement system determines parameters of a displacement input to displace a portion of the two-dimensional image. The depth displacement system utilizes the parameters of the displacement input to determine a corresponding portion of the three-dimensional mesh. To illustrate, the depth displacement system determines a mapping (e.g., a projection) between the three-dimensional mesh and the two-dimensional image to determine a portion of the three-dimensional mesh to modify.

In one or more embodiments, the depth displacement system modifies a three-dimensional mesh based on a displacement input for modifying a two-dimensional image. For example, the depth displacement system determines one or more displacement directions based on the displacement input. The depth displacement system modifies a selected portion of the three-dimensional mesh according to the one or more displacement directions, such as by changing positions of vertices of the selected portion of the three-dimensional mesh. Additionally, the depth displacement system determines a particular surface or direction based on attributes of the displacement input and/or automatically detected attributes of the portion of the three-dimensional mesh.

In some embodiments, the depth displacement system generates a modified two-dimensional image based on a displacement input. Specifically, the depth displacement system determines one or more modifications to the two-dimensional image based on the modified portion(s) of the three-dimensional mesh. For instance, the depth displacement system utilizes a mapping between the two-dimensional image and the three-dimensional mesh to determine how a displaced portion of the three-dimensional mesh modifies the two-dimensional image. To illustrate, the depth displacement system utilizes a previously determined mapping between the two-dimensional image and the three-dimensional mesh to displace a texture of the two-dimensional image based on a displaced three-dimensional portion of the three-dimensional mesh.

In one or more embodiments, the depth displacement system segments a three-dimensional mesh representing content of a two-dimensional image to provide additional control over separate portions of the two-dimensional image. In particular, the depth displacement system detects one or more objects in the two-dimensional image via one or more object detection models. For example, the depth displacement system determines a semantic map for objects in the two-dimensional image. Alternatively, the depth displacement system determines depth discontinuities between regions of the two-dimensional image based on extracted depth/density information.

According to one or more embodiments, the depth displacement system segments a three-dimensional mesh according to detected objects in a two-dimensional image. For instance, the depth displacement system utilizes a semantic map and/or depth discontinuities to segment/slice a three-dimensional mesh into a plurality of three-dimensional object meshes. To illustrate, the three-dimensional mesh determines a plurality of three-dimensional object meshes corresponding to detected objects to provide separate control over the individual objects via displacement inputs.

In connection with segmenting a three-dimensional mesh into a plurality of three-dimensional object meshes, the depth displacement system utilizes parameters of a displacement input to modify a two-dimensional image based on a selected three-dimensional object mesh. Specifically, the depth displacement system determines a selected three-dimensional object mesh based on a position of the displacement input in the two-dimensional image relative to a position of the displacement input in the three-dimensional mesh. Additionally, the depth displacement system displaces a portion of the selected three-dimensional object mesh according to the displacement input.

In additional embodiments, the depth displacement system provides iterative two-dimensional image displacement based on a plurality of iterative, adaptive three-dimensional meshes. In particular, the depth displacement system generates an initial three-dimensional mesh representing depth displacement of content of a two-dimensional image. For example, as mentioned above, the depth displacement system utilizes one or more neural networks to generate the displacement three-dimensional mesh according to density values of the two-dimensional image. Additionally, the depth displacement system utilizes the one or more neural networks to generate the displacement three-dimensional mesh according to estimated camera parameters for the two-dimensional image.

In one or more embodiments, in response to modifying a two-dimensional image, the depth displacement system utilizes one or more neural networks to generate an updated three-dimensional mesh. For instance, the depth displacement system generates a modified two-dimensional image according to a displacement input that displaces a portion of the three-dimensional mesh. Furthermore, in response to an action to commit the modification to the two-dimensional image, the depth displacement system generates an updated three-dimensional mesh based on the modified two-dimensional image. To illustrate, the depth displacement system utilizes the one or more neural networks to generate a new three-dimensional mesh according to density values extracted from the two-dimensional image. Accordingly, in one or more embodiments, the depth displacement system generates iterative three-dimensional meshes to account for changing depth displacement and/or to account for new geometries not previously visible in the two-dimensional image.

Conventional systems for editing two-dimensional images have a number of shortcomings in relation to accuracy and efficiency of operation. In particular, conventional image editing systems provide digital editing tools for selecting, generating, or modifying portions of a two-dimensional image within a two-dimensional space. While editing two-dimensional images within two-dimensional coordinate systems corresponding to the two-dimensional images can provide a large variety of ways in which client devices can modify the two-dimensional images, performing certain types of modifications typically requires a significant amount of time, user interactions, user interfaces, and resources to achieve good results. Accordingly, in many circumstances, conventional systems provide inaccurate or unrealistic digital editing results.

Furthermore, because the conventional systems perform edits to two-dimensional images in corresponding two-dimensional coordinates, the conventional systems lack efficiency of operation. Specifically, the conventional systems generally are unable to perform certain types of image editing operations without editing individual pixels and/or performing a plurality of separate operations involving a plurality of tools, interactions, and user interfaces. For instance, certain image editing operations involve deforming/displacing objects in certain ways while modifying colors, shadows, or other visual aspects to maintain consistency/realism within the edited two-dimensional image. The conventional systems also typically require each of the separate operations to be performed using one or more neural networks, brushes, layers, or manual pixel editing to achieve an accurate result. Thus, the conventional systems are generally slow, computationally expensive, and inaccurate.

The disclosed adaptive depth displacement system provides a number of advantages over conventional systems. In contrast to conventional systems that edit two-dimensional images in two-dimensional environments, the depth displacement system provides improved computer functionality by leveraging three-dimensional representations of two-dimensional images to apply modifications to the two-dimensional images. In particular, the depth displacement system generates adaptive three-dimensional meshes including depth displacement information from two-dimensional images to edit the two-dimensional images in a manner consistent with three-dimensional space. For example, by generating adaptive three-dimensional meshes representing the two-dimensional images, the depth displacement system applies modifications to the two-dimensional images based on modifications in three-dimensional space. Accordingly, the depth displacement system applies accurate geometry displacement/distortion, texture changes, and shading when modifying two-dimensional images.

Furthermore, the depth displacement system provides improved efficiency and flexibility over conventional systems. In contrast to conventional systems that require the use of many different tools/operations to perform certain image editing operations, the depth displacement system provides fast and efficient editing of two-dimensional images via three-dimensional with fewer image editing tools (e.g., with a displacement tool), interactions, and user interfaces. Specifically, by editing two-dimensional images in a three-dimensional space, the depth displacement system provides a displacement tool that allows for a variety of object modifications. Additionally, the depth displacement system provides a displacement tool that has minimally intrusive user interface elements while also providing intuitive interactivity. The depth displacement system thus improves the flexibility of computing systems that edit two-dimensional images to allow for complex image editing operations with reduced time, interactions, and computing resources.

Figure 2:
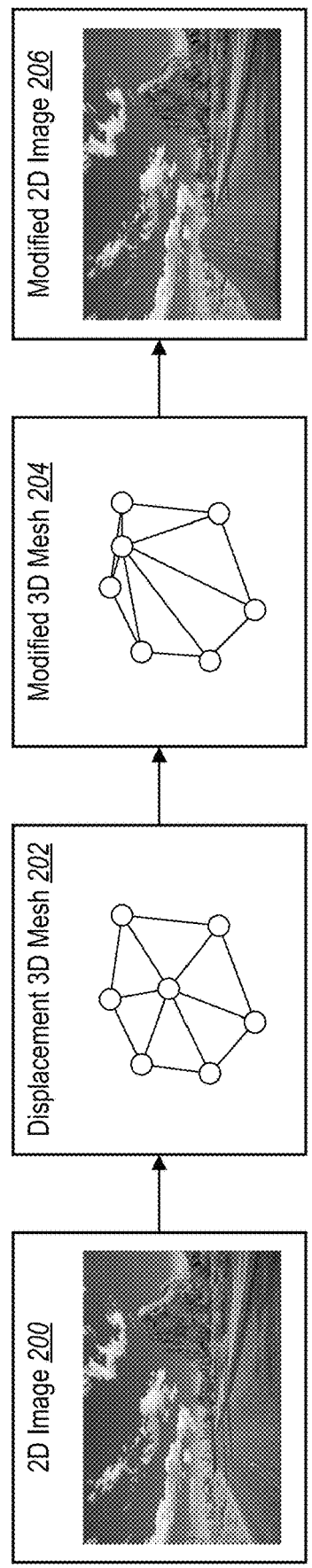
FIG. 2 illustrates a diagram of an overview of the depth displacement system modifying a two-dimensional image based on a three-dimensional mesh representing the two-dimensional image in accordance with one or more implementations.

Turning now to the figures, FIG. 1 includes an embodiment of a system environment 100 in which a depth displacement system 102 is implemented. In particular, the system environment 100 includes server device(s) 104 and a client device 106 in communication via a network 108. Moreover, as shown, the server device(s) 104 include an image editing system 110, which includes the depth displacement system 102. Additionally, the client device 106 includes an image editing application 112, which optionally includes the image editing system 110 and the depth displacement system 102. Furthermore, as illustrated in FIG. 2, the depth displacement system 102 includes neural network(s) 114.

As shown in FIG. 1, the server device(s) 104 includes or hosts the image editing system 110. The image editing system 110 includes, or is part of, one or more systems that implement digital image editing operations. For example, the image editing system 110 provides tools for performing various operations on digital images. To illustrate, the image editing system 110 communicates with the client device 106 via the network 108 to provide the tools for display and interaction via the image editing application 112 at the client device 106. Additionally, in some embodiments, the image editing system 110 receives data from the client device 106 in connection with editing digital images, including requests to access digital images stored at the server device(s) 104 (or at another device such as a digital content database) and/or requests to store digital images from the client device 106 at the server device(s) 104 (or at another device). In some embodiments, the image editing system 110 receives interaction data for viewing, generating, or editing a digital image from the client device 106, processes the interaction data (e.g., to view, generate, or edit a digital image), and provides the results of the interaction data to the client device 106 for display via the image editing application 112 or to a third-party system.

According to one or more embodiments, the image editing system 110 utilizes the depth displacement system 102 to generate adaptive three-dimensional meshes for editing two-dimensional images. In particular, in connection with editing digital images, the image editing system 110 utilizes the depth displacement system 102 to generate three-dimensional meshes (e.g., via the neural network(s) 114) that represent the content of two-dimensional images in connection with a displacement tool (e.g., provided for use via the image editing application 112). Additionally, the depth displacement system 102 utilizes the neural network(s) 114 to modify the two-dimensional images by modifying corresponding portions of the three-dimensional meshes. In one or more embodiments, the image editing system 110 also provides the two-dimensional images and modifications based on the displacement tool to the client device 106 (e.g., for display within the image editing application 112).

In one or more embodiments, the server device(s) 104 include a variety of computing devices, including those described below with reference to FIG. 25. For example, the server device(s) 104 includes one or more servers for storing and processing data associated with editing digital images and generating three-dimensional meshes. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 25. Furthermore, although not shown in FIG. 1, the client device 106 is operable by a user (e.g., a user included in, or associated with, the system environment 100) to perform a variety of functions. In particular, the client device 106 performs functions such as, but not limited to, accessing, viewing, and interacting with digital images. In some embodiments, the client device 106 also performs functions for generating, capturing, or accessing data to provide to the image editing system 110 and the depth displacement system 102 in connection with editing digital content. For example, the client device 106 communicates with the server device(s) 104 via the network 108 to provide information (e.g., user interactions) associated with digital content. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 optionally include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 25.

Although FIG. 1 illustrates the server device(s) 104 and the client device 106 communicating via the network 108, in alternative embodiments, the various components of the system environment 100 communicate and/or interact via other methods (e.g., the server device(s) 104 and the client device 106 communicate directly). Furthermore, although FIG. 1 illustrates the depth displacement system 102 being implemented by a particular component and/or device within the system environment 100, the depth displacement system 102 is implemented, in whole or in part, by other computing devices and/or components in the system environment 100 (e.g., the client device 106).

In particular, in some implementations, the depth displacement system 102 on the server device(s) 104 supports the depth displacement system 102 on the client device 106. For instance, the server device(s) 104 generates or obtains the depth displacement system 102 (including the neural network(s) 114) for the client device 106. The server device(s) 104 trains and provides the depth displacement system 102 to the client device 106 for performing three-dimensional mesh generation/modification process at the client device 106. In other words, the client device 106 obtains (e.g., downloads) the depth displacement system 102 from the server device(s) 104. At this point, the client device 106 is able to utilize the depth displacement system 102 to generate three-dimensional meshes for editing two-dimensional images independently from the server device(s) 104.

In alternative embodiments, the depth displacement system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform digital image editing operations and, in response, the depth displacement system 102 or the image editing system 110 on the server device(s) 104 performs operations to generate three-dimensional meshes for editing two-dimensional images and/or to perform additional digital image editing operations. The server device(s) 104 provide the output or results of the operations to the client device 106.

As mentioned, the depth displacement system 102 generates three-dimensional meshes for editing two-dimensional images. FIG. 2 illustrates an overview of the depth displacement system 102 editing a two-dimensional image via modifications to a corresponding three-dimensional mesh in a three-dimensional environment. Specifically, FIG. 2 illustrates that the depth displacement system generates a three-dimensional mesh to represent content of a two-dimensional image in a three-dimensional space. FIG. 2 further illustrates that the depth displacement system 102 utilizes the three-dimensional mesh to modify the two-dimensional image.

In one or more embodiments, as illustrated in FIG. 2, the depth displacement system 102 identifies a two-dimensional ("2D") image 200. In one or more embodiments, the two-dimensional image 200 includes a raster image. For example, the two-dimensional image 200 includes a digital photograph of a scene including one or more objects in one or more positions relative to a viewpoint (e.g., based on a camera position) associated with the two-dimensional image 200. In additional embodiments, the two-dimensional image 200 includes a drawn image (e.g., a digital representation of a hand drawn image or a digital image generated via a computing device) including a plurality of objects with relative depths.

According to one or more embodiments, the depth displacement system 102 generates a displacement three-dimensional ("3D") mesh 202 representing the two-dimensional image 200. Specifically, the depth displacement system 102 utilizes a plurality of neural networks to generate the displacement three-dimensional mesh 202 including a plurality of vertices and faces that form a geometry representing objects from the two-dimensional image 200. For instance, the depth displacement system 102 generates the displacement three-dimensional mesh 202 to represent depth information and displacement information (e.g., relative positioning of objects) from the two-dimensional image 200 in three-dimensional space. FIGS. 3-8 and the corresponding description provide additional detail with respect to generating an adaptive three-dimensional mesh for a two-dimensional image. In alternative embodiments, the depth displacement system 102 generates a displacement three-dimensional mesh for a two-dimensional image based on estimated pixel depth values and estimated camera parameters—e.g., by determining a position of each vertex of a tessellation corresponding to objects in the two-dimensional image according to the estimated pixel depth values and estimated camera parameters.

In one or more embodiments, a neural network includes a computer representation that is tuned (e.g., trained) based on inputs to approximate unknown functions. For instance, a neural network includes one or more layers or artificial neurons that approximate unknown functions by analyzing known data at different levels of abstraction. In some embodiments, a neural network includes one or more neural network layers including, but not limited to, a convolutional neural network, a recurrent neural network (e.g., an LSTM), a graph neural network, or a deep learning model. In one or more embodiments, the depth displacement system 102 utilizes one or more neural networks including, but is not limited to, a semantic neural network, an object detection neural network, a density estimation neural network, a depth estimation neural network, a camera parameter estimation.

In additional embodiments, the depth displacement system 102 determines a modified three-dimensional mesh 204 in response to a displacement input. For example, in response to a displacement input to modify the two-dimensional image 200, the depth displacement system 102 modifies the displacement three-dimensional mesh 202 to generate the modified three-dimensional mesh 204. Accordingly, the modified three-dimensional mesh 204 includes one or more modified portions based on the displacement input. FIGS. 9-19B and the corresponding description provide additional detail with respect to modifying a three-dimensional mesh based on a displacement input.

FIG. 2 also illustrates that the depth displacement system 102 generates a modified two-dimensional image 206 based on the modified three-dimensional mesh 204. In particular, the depth displacement system 102 generates the modified two-dimensional image 206 to include modified portions of the modified three-dimensional mesh 204. To illustrate, the depth displacement system 102 utilizes a mapping of the two-dimensional image 200 to the displacement three-dimensional mesh 202 to reconstruct the modified two-dimensional image 206 based on the modified three-dimensional mesh 204.

Figure 3:
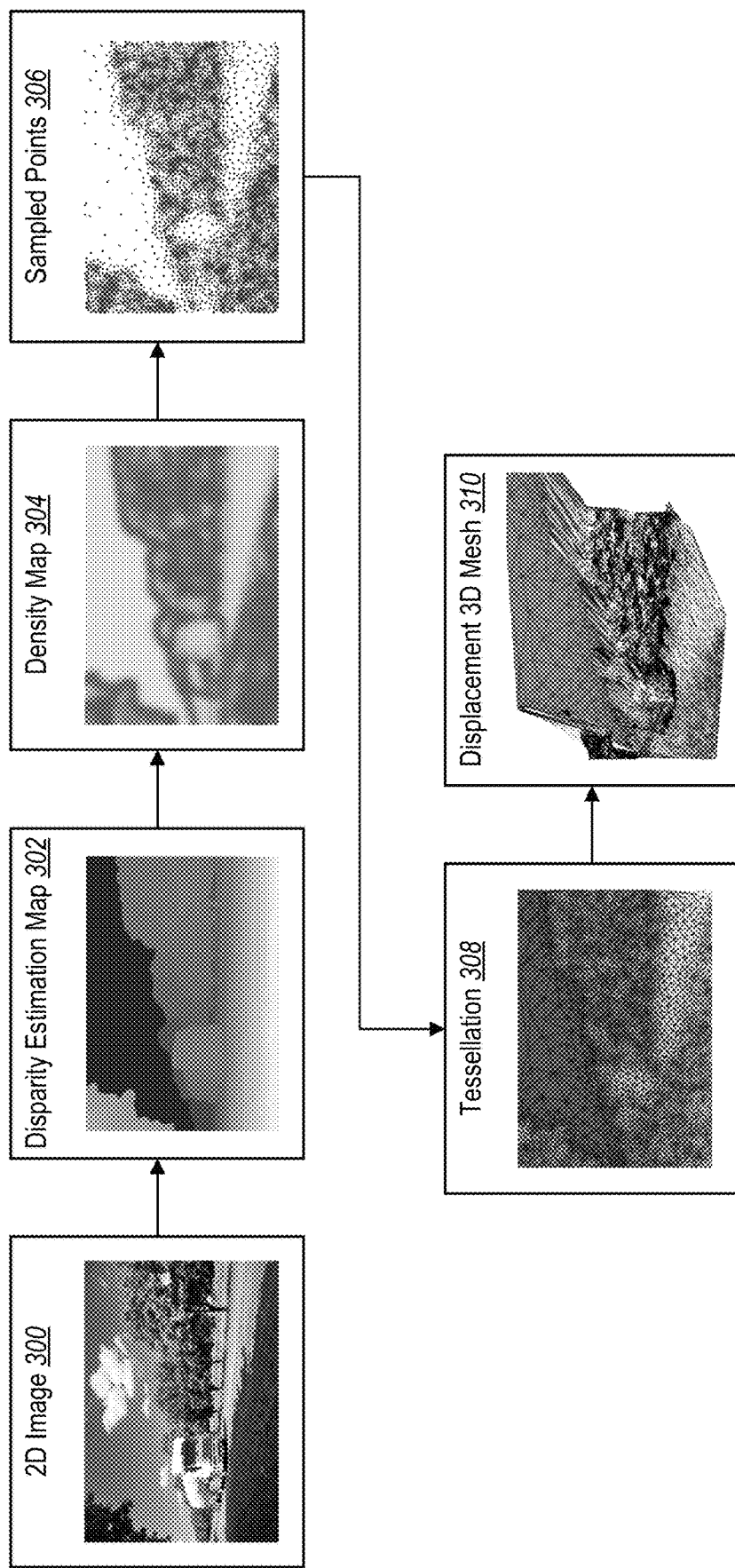
FIG. 3 illustrates a diagram of an overview of the depth displacement system generating a displacement three-dimensional mesh representing a two-dimensional image in accordance with one or more implementations.

FIG. 3 illustrates a diagram of the depth displacement system 102 generating a three-dimensional mesh that includes depth displacement information from a two-dimensional image. Specifically, the depth displacement system 102 generates the three-dimensional mesh by extracting depth information associated with objects in a two-dimensional image 300. Additionally, the depth displacement system 102 extracts displacement information indicating relative positioning of the objects in the two-dimensional image 300 (e.g., according to estimated camera parameters associated with a viewpoint of the two-dimensional image 300). As illustrated in FIG. 3, the depth displacement system 102 utilizes the depth information and displacement information to generate a three-dimensional mesh representing the two-dimensional image 300.

In one or more embodiments, the depth displacement system 102 determines a disparity estimation map 302 based on the two-dimensional image 300. For example, the depth displacement system 102 utilizes one or more neural networks to determine disparity estimation values corresponding to the pixels in the two-dimensional image 300. To illustrate, the depth displacement system 102 utilizes a disparity estimation neural network (or other depth estimation neural network) to estimate depth values corresponding to pixels of the two-dimensional image 300. More specifically, the depth values indicate a relative distance from a camera viewpoint associated with an image for each pixel in the image. In one or more embodiments, the depth values include (or are based on) disparity estimation values for the pixels of the depth displacement system 102.

In particular, the depth displacement system 102 utilizes the neural network(s) to estimate the depth value for each pixel according to objects within the two-dimensional image 300 given the placement of each object in a scene (e.g., how far in the foreground/background each pixel is positioned). The depth displacement system 102 can utilize a variety of depth estimation models to estimate a depth value for each pixel. For example, in one or more embodiments, the depth displacement system 102 utilizes a depth estimation neural network as described in U.S. application Ser. No. 17/186,436, filed Feb. 26, 2021, titled "GENERATING DEPTH IMAGES UTILIZING A MACHINE-LEARNING MODEL BUILT FROM MIXED DIGITAL IMAGE SOURCES AND MULTIPLE LOSS FUNCTION SETS," which is herein incorporated by reference in its entirety. The depth displacement system 102 alternatively utilizes one or more other neural networks to estimate depth values associated with the pixels of the two-dimensional image 300.

As illustrated in FIG. 3, in one or more embodiments, the depth displacement system 102 also determines a density map 304 based on the disparity estimation map 302. In particular, the depth displacement system 102 utilizes a set of filters to extract the density map 304 from the disparity estimation map 302. For example, the depth displacement system 102 utilizes the set of filters to determine a change in the change in depth (e.g., the second derivative) of the disparity estimation map 302 to determine the instantaneous rate of change in depth at each pixel of the two-dimensional image 300. Accordingly, the density map 304 includes information indicating the density of detail in the two-dimensional image 300, with the highest density of information typically being at edges of objects and other regions where the depth changes the fastest and lower density of information in planar regions without significant detail (e.g., a sky or road).

FIG. 3 also illustrates that the depth displacement system 102 determines sampled points 306 for the two-dimensional image 300 based on the density map 304. For instance, the depth displacement system 102 determines a set of points to sample in connection with the two-dimensional image 300 based on the density values in the density map 304. To illustrate, the depth displacement system 102 utilizes a sampling model that samples a higher density of points in higher density locations indicated by the density map 304 (e.g., samples using a probability function that reflects point density). The depth displacement system 102 thus samples a higher number of points in locations where the two-dimensional image 300 includes the greatest amount of depth information.

In response to determining the sampled points 306, the depth displacement system 102 generates a tessellation 308. Specifically, the depth displacement system 102 generates an initial three-dimensional mesh based on the sampled points 306. For example, the depth displacement system 102 utilizes Delaunay triangulation to generate the tessellation 308 according to Voronoi cells corresponding to the sampled points 306. Thus, the depth displacement system 102 generates a flat three-dimensional mesh including vertices and faces with greater density at portions with a higher density of sampled points.

As illustrated in FIG. 3, the depth displacement system 102 also generates a displacement three-dimensional mesh 310 based on the tessellation 308 for the two-dimensional image 300. In particular, the depth displacement system 102 utilizes one or more neural networks to determine a perspective or viewpoint associated with the two-dimensional image 300. The depth displacement system 102 generates the displacement three-dimensional mesh 310 by incorporating depth displacement information indicating relative position of objects in the two-dimensional image 300 according to the perspective/viewpoint extracted from the two-dimensional image 300. Thus, the depth displacement system 102 converts the flat three-dimensional mesh into a displacement three-dimensional mesh by modifying positions of vertices in the mesh.

Figure 4:
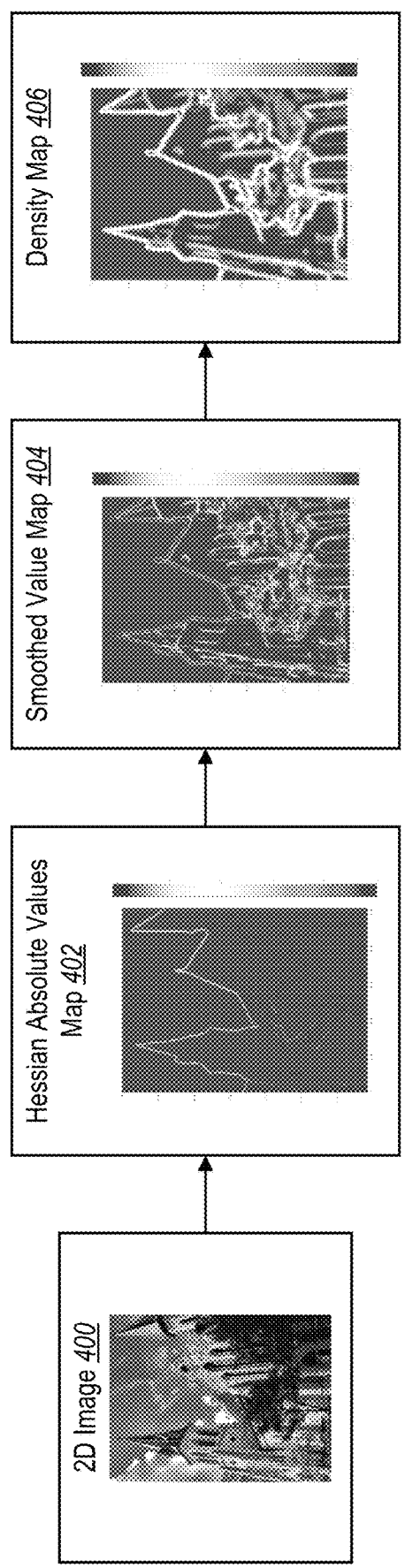
FIG. 4 illustrates a diagram of the depth displacement system determining density values of a two-dimensional image in accordance with one or more implementations.

FIG. 4 illustrates additional detail associated with determining a density map associated with a two-dimensional image. Specifically, FIG. 4 illustrates that the depth displacement system 102 applies a plurality of filters in connection with depth values extracted from a two-dimensional image 400. For instance, the depth displacement system 102 applies the filters to a disparity estimation map associated with the two-dimensional image 400. Alternatively, the depth displacement system 102 applies the filters to other depth values associated with the two-dimensional image 400.

As illustrated in FIG. 4, the depth displacement system 102 utilizes a first filter to determine a Hessian absolute value map 402 based on the disparity estimation map of the two-dimensional image 400. In particular, the depth displacement system 102 utilizes a filter to generate a Hessian matrix based on the disparity estimation values. For example, the depth displacement system 102 generates the Hessian absolute value map 402 from the Hessian matrix indicating a second derivative of the disparity estimation values indicating the change in change (e.g., the rate of change) in depth information from the two-dimensional image 400. To illustrate, the depth displacement system 102 generates the Hessian absolute value map 402 by determining absolute values of the diagonals of the Hessian matrix.

Furthermore, as illustrated in FIG. 4, the depth displacement system 102 applies a second filter to the Hessian absolute value map 402 to determine a smoothed value map 404. For instance, the depth displacement system 102 modifies the absolute values in the Hessian absolute value map 402 by smoothing the absolute values. To illustrate, the depth displacement system 102 utilizes a convolution operation to generate the smoothed value map 404 including smoothed values from the Hessian absolute value map 402. In some embodiments, by smoothing the values from the Hessian absolute value map 402, the depth displacement system 102 removes noise that may be introduced by determining the Hessian matrix.

In one or more embodiments, the depth displacement system 102 further modifies the smoothed value map 404 to determine a density map 406. In particular, as illustrated in FIG. 4, the depth displacement system 102 generates the density map 406 by truncating (or clipping) the values in the smoothed value map 404 according to a predetermined threshold. For example, the depth displacement system 102 clips the values in the smoothed value map 404 to a predetermined proportion of a standard deviation of values (e.g., to 0.5 times the standard deviation). By truncating the values, the depth displacement system 102 prevents large local changes in disparity from dominating the density of values in the density map 406.

According to one or more embodiments, as illustrated, the density map 406 includes higher density values at object boundaries of the two-dimensional image 400 and lower density values within the object boundaries. Additionally, the density map 406 includes high density values for pixels within objects indicating sharp transitions in depth (e.g., at edges of windows of the buildings of FIG. 4), while limiting density values at other areas without sharp transitions in depth (e.g., between individual leaves or clusters of leaves in the trees of FIG. 4). The depth displacement system 102 thus generates the density map 406 to indicate regions of the two-dimensional image 400 for sampling points so that the sampled points indicate regions according to the rate of change of transition of depth information.

In one or more embodiments, the depth displacement system 102 utilizes a plurality of filters with customizable parameters to determine the density map 406. For example, the filters may include parameters that provide manually customizable density regions, such as edges of an image, to provide higher sampling of points at the indicated regions. In one or more additional embodiments, the depth displacement system 102 customizes the clipping threshold to include regions with higher or lower density of information, as may serve a particular implementation.

Figure 5:
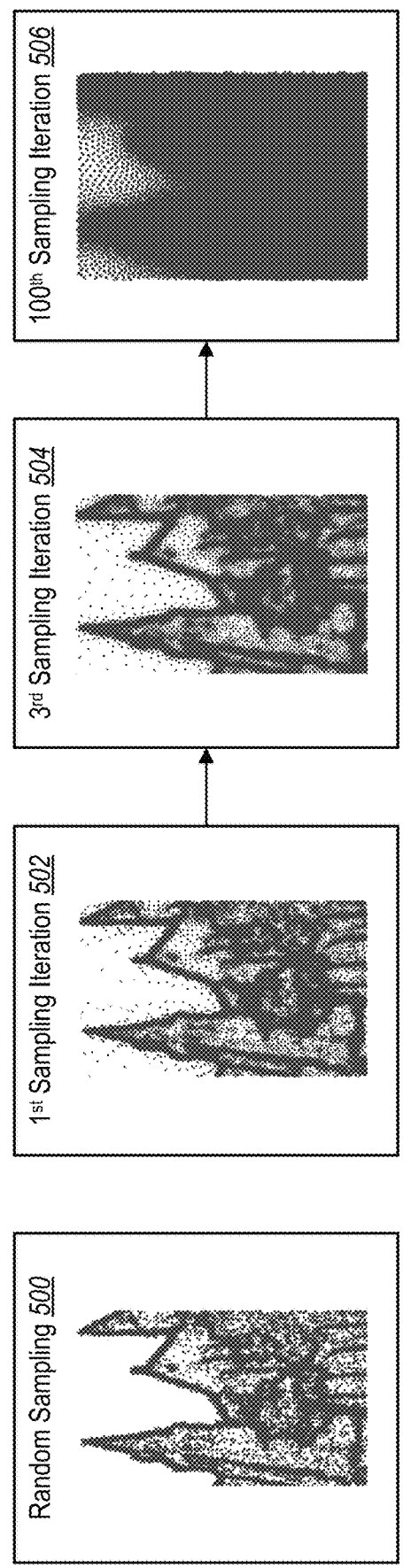
FIG. 5 illustrates a diagram of the depth displacement system determining sampling points for a two-dimensional image in one or more sampling iterations in accordance with one or more implementations.

In one or more embodiments, the depth displacement system 102 samples points for a two-dimensional image based on density values corresponding to pixels in the two-dimensional image. Specifically, as illustrated in FIG. 5, the depth displacement system samples points according to the density values to sample greater numbers of points in dense regions and fewer numbers of points in lower density regions. According to one or more embodiments, the depth displacement system 102 utilizes a sampling model that determines a random sampling 500 according to the density values in the density map (e.g., by utilizing the density map as a probability distribution for sampling). To illustrate, the depth displacement system 102 randomly samples a plurality of points utilizing the density map, resulting in randomly sampled points with higher density of sampled points in the high density regions of the two-dimensional image.

In one or more alternative embodiments, the depth displacement system 102 utilizes a sampling model that utilizes the density map as a probability distribution in an iterative sampling process. In particular, rather than randomly sampling points according to the density values, the depth displacement system 102 utilizes a sampling model that provides iterative movement of the samples towards positions that result in more uniform/better formed triangulation in a three-dimensional mesh generated based on the sampled points. For instance, the depth displacement system 102 utilizes a sampling model with a relaxation model to iteratively move sampled points toward the center of corresponding Voronoi cells in connection with Delaunay triangulation. To illustrate, the depth displacement system 102 utilizes a sampling model with Voronoi iteration/relaxation (e.g., "Lloyd's algorithm") that generates a centroidal Voronoi tessellation in which a seed point for each Voronoi cell/region is also its centroid. More specifically, the depth displacement system 102 repeatedly moves each sampled point for a corresponding Voronoi cell toward the center of mass of the corresponding Voronoi cell.

Accordingly, in one or more embodiments, the depth displacement system 102 determines a first sampling iteration 502 including a plurality of sampled points according to a density map of a two-dimensional image. Additionally, in one or more embodiments, the depth displacement system 102 performs a plurality of iterations to further improve the regularity of the sampling according to the density map for the two-dimensional image. FIG. 5 also illustrates that the depth displacement system 102 determines a third sampling iteration 504 including a plurality of sampled points after three sampling iterations. A three-dimensional mesh generated from the third sampling iteration 504 includes more vertices and planes based on points sampled according to the density map.

FIG. 5 further illustrates a 100th sampling iteration 506 after 100 sampling iterations. As shown, continuing to perform sampling iterations after a certain point may reduce the connection between the sampled points (and resulting three-dimensional mesh) and the density map. Thus, in one or more embodiments, the depth displacement system 102 determines a number of iterations based on a distance of the sampled points from the density map. Furthermore, in some embodiments, the depth displacement system 102 determines the number of iterations based on a resource/time budget or the resolution of the two-dimensional image. To illustrate, the depth displacement system 102 determines that two or three iterations provide a plurality of sampled points that result in a three-dimensional mesh that preserves the boundaries of the objects of the two-dimensional image while remaining consistent with the density map.

In one or more embodiments, the depth displacement system 102 also utilizes image-aware sampling to ensure that the depth displacement system 102 samples all portions of a two-dimensional image for generating a three-dimensional mesh. For example, the depth displacement system 102 accounts for portions with very little or no detail at the edges or corners of a two-dimensional image to ensure that the resulting three-dimensional mesh includes the edges/corners in the three-dimensional mesh. To illustrate, the depth displacement system 102 provides instructions to a sampling model to sample at least some points along edges of the two-dimensional image based on the dimensions/coordinates of the two-dimensional image (e.g., by adding density to the image borders). Alternatively, the depth displacement system 102 provides a tool for a user to manually indicate points for sampling during generation of a three-dimensional mesh representing a two-dimensional image.

Figure 6:
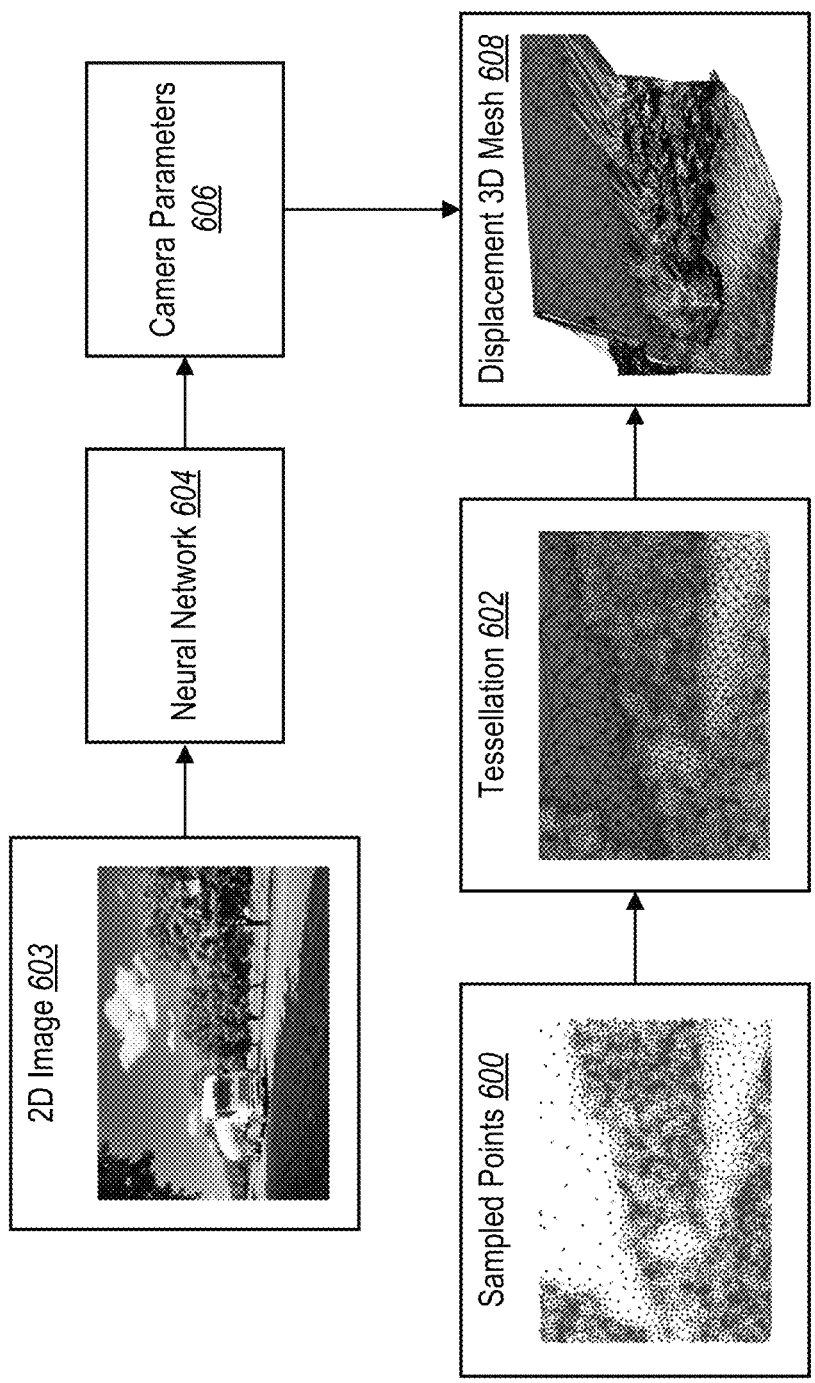
FIG. 6 illustrates a diagram of the depth displacement system generating a displacement three-dimensional mesh based on sampled points of a two-dimensional image in accordance with one or more implementations.

FIG. 6 illustrates the depth displacement system 102 generating a three-dimensional mesh including depth displacement information for content of a two-dimensional image. In particular, FIG. 6 illustrates that the depth displacement system 102 determines sampled points 600 (e.g., as described in FIG. 5). Furthermore, FIG. 6 illustrates that the depth displacement system 102 generates a tessellation 602 based on the sampled points 600. To illustrate, the depth displacement system 102 determines the sampled points 600 and generates the tessellation 602 in an iterative process utilizing Voronoi relaxation and Delaunay triangulation.

In one or more embodiments, the depth displacement system 102 modifies the tessellation 602, which includes a flat mesh of vertices and faces, to include displacement information based on a viewpoint in a two-dimensional image. For instance, the depth displacement system 102 determines a perspective associated with the two-dimensional image 603 (e.g., based on a camera that captured the two-dimensional image). By determining a viewpoint of the depth displacement system 102 and determining displacement, the depth displacement system 102 incorporates depth information into a three-dimensional mesh representing the two-dimensional image.

According to one or more embodiments, the depth displacement system 102 utilizes a neural network 604 to estimate camera parameters 606 associated with the viewpoint based on the two-dimensional image 603. For example, the depth displacement system 102 utilizes a camera parameter estimation neural network to generate an estimated position, an estimated direction, and/or an estimated focal length associated with the two-dimensional image 603. To illustrate, the depth displacement system 102 utilizes a neural network as described in U.S. Pat. No. 11,094,083, filed Jan. 25, 2019, titled "UTILIZING A CRITICAL EDGE DETECTION NEURAL NETWORK AND A GEOMETRIC MODEL TO DETERMINE CAMERA PARAMETERS FROM A SINGLE DIGITAL IMAGE," which is herein incorporated by reference in its entirety. In additional embodiments, the depth displacement system 102 extracts one or more camera parameters from metadata associated with the two-dimensional image 603.

As illustrated in FIG. 6, the depth displacement system 102 utilizes the camera parameters 606 to generate the displacement three-dimensional mesh 608. In particular, the depth displacement system 102 utilizes the camera parameters 606 to estimate positions of vertices from the tessellation 602 according to the depth values of corresponding pixels of the two-dimensional image in connection with the position of the camera, the focal length of the camera, and/or the direction of the camera. To illustrate, the depth displacement system 102 modifies three-dimensional positions of a plurality of vertices and faces in three-dimensional space based on the relative positioning of the objects in the two-dimensional image.

Furthermore, in one or more embodiments, the depth displacement system 102 utilizes additional information to further modify a three-dimensional mesh of a two-dimensional image. Specifically, the depth displacement system 102 utilizes additional information from the two-dimensional image to determine positions of vertices in the three-dimensional mesh. For example, as illustrated in FIGS. 7A-7B, the depth displacement system 102 utilizes additional edge information to modify a three-dimensional mesh of a two-dimensional image.

Figure 7B:
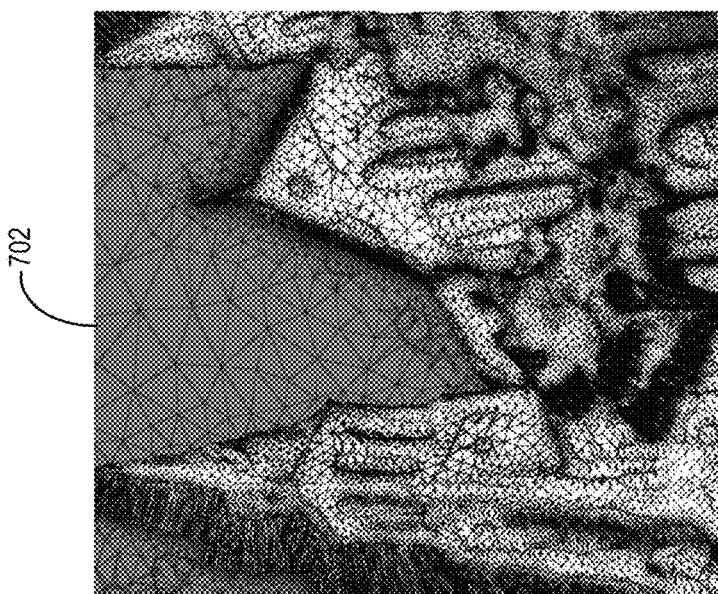
FIGS. 7A-7B illustrate a plurality of different displacement three-dimensional meshes for a two-dimensional image in accordance with one or more implementations.
Figure 7B:
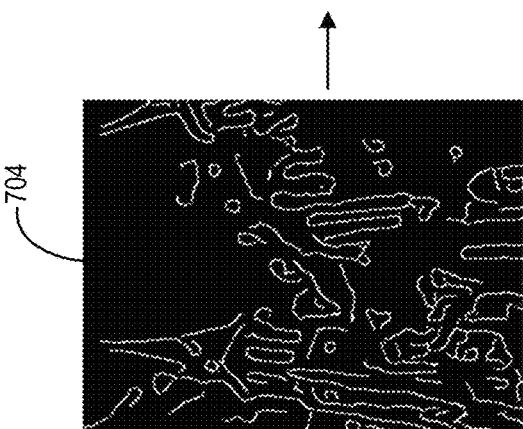
Figure 7A:
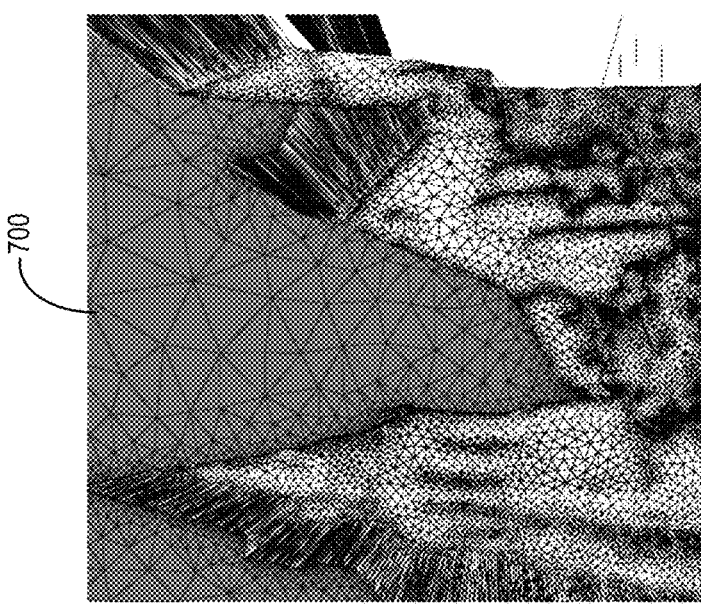

For example, FIG. 7A illustrates that the depth displacement system 102 generates a displacement three-dimensional mesh 700 for a two-dimensional image utilizing the process as described above in relation to FIG. 6. As illustrated, the displacement three-dimensional mesh 700 includes displacement information based on a viewpoint of the two-dimensional image, which can result in long/deformed portions of the three-dimensional mesh at edges of objects. To illustrate, certain edges of objects in the displacement three-dimensional mesh 700 may lack detail due to having insufficient polygons to accurately represent the detail.

In one or more embodiments, the depth displacement system 102 adds additional detail to a three-dimensional mesh (e.g., via additional vertices and faces). For instance, the depth displacement system 102 utilizes color values (e.g., RGB values) from a two-dimensional image into a neural network that generates a displacement three-dimensional mesh based on depth values and/or camera parameters. Specifically, the depth displacement system 102 utilizes the color values to further increase the density of polygons at edges of the three-dimensional mesh to reduce artifacts and/or to remove long polygons. FIG. 7B illustrates that the depth displacement system 102 generates an additional displacement three-dimensional mesh 702 based on the additional information. As shown, the additional information allows the depth displacement system 102 to provide a higher quality displacement three-dimensional mesh with more accurate details at the edges of the objects.

As illustrated in FIG. 7B, the depth displacement system 102 utilizes an edge map 704 including additional information about the edges within a two-dimensional image. For example, the edge map 704 includes edges based on an initial edge detection process that highlights specific edges that may not correspond to high density areas. To illustrate, the depth displacement system 102 determines a filter that mimics a human drawing of edges in the two-dimensional image, utilizes a neural network to automatically detect certain edges, a canny edge detector model to detect edges, semantic segmentation, or user input to determine corners/edges of a room, edges of a flat object such as a paper, or another object for identifying additional edges to sample during the mesh generation process. By utilizing the edge map 704 to guide displacement of vertices in the displacement three-dimensional mesh 702, the depth displacement system 102 provides more accurate edge details in the displacement three-dimensional mesh 702 via additional vertices at the indicated edges. In additional embodiments, the depth displacement system 102 further performs an edge detection operation on a disparity estimation map corresponding to a two-dimensional image for determining sampling locations in a two-dimensional image. Such a process allows the depth displacement system 102 to arbitrarily add additional detail into the displacement three-dimensional mesh 702 according to the additional information provided in connection with generating the displacement three-dimensional mesh 702.

Figure 8:
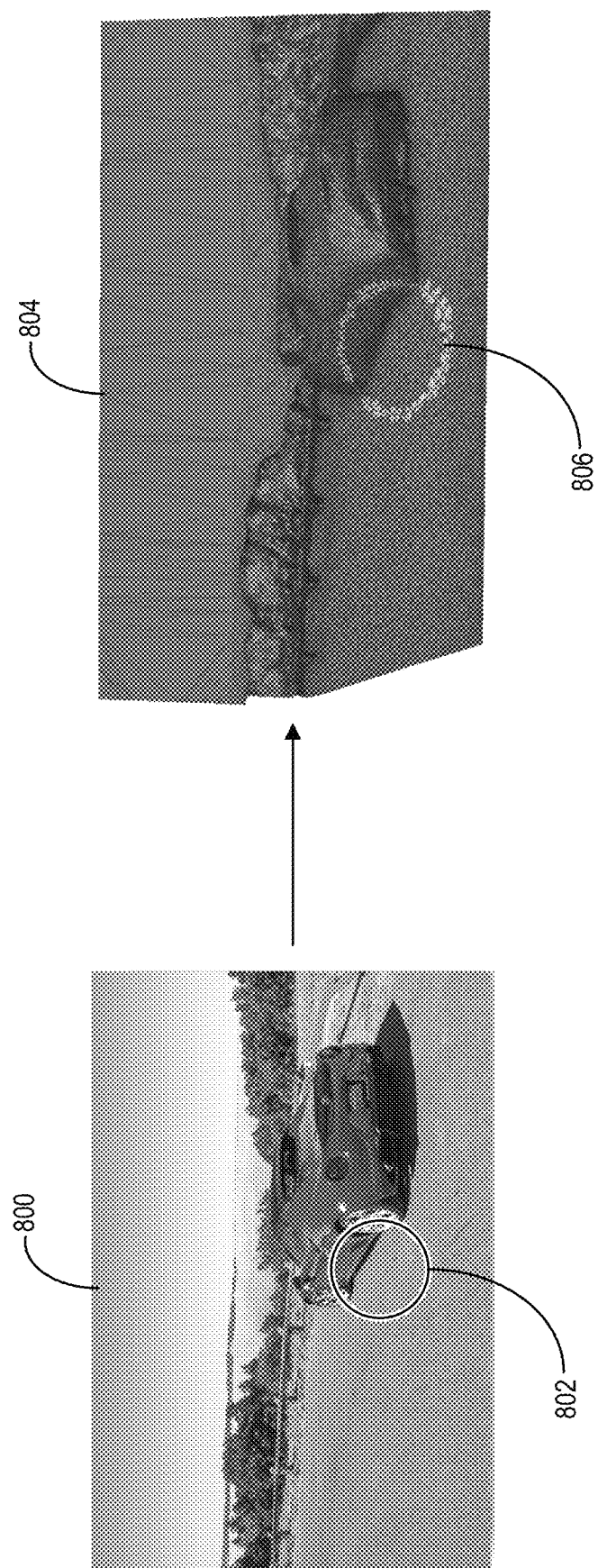
FIG. 8 illustrates the depth displacement system generating a displacement three-dimensional mesh for a two-dimensional image based on an additional input in accordance with one or more implementations.

FIG. 8 also illustrates that the depth displacement system 102 provides additional detail for generating a displacement three-dimensional mesh for a two-dimensional image. For instance, the depth displacement system 102 provides one or more tools for a user to indicate additional information to add to a three-dimensional mesh representing the two-dimensional image. In particular, FIG. 8 illustrates a two-dimensional image 800 include an image of a car parked on a road against a scenic overlook.

FIG. 8 further illustrates that a user input has indicated a circle 802 on the two-dimensional image 800 for adding additional information into a displacement three-dimensional mesh 804 representing the two-dimensional image 800. To illustrate, in response to the user input indicating the circle 802 on the two-dimensional image 800, the depth displacement system 102 adds the circle into the displacement three-dimensional mesh 804. For example, the depth displacement system 102 adds additional vertices/faces into the displacement three-dimensional mesh 804 at a location 806 of the displacement three-dimensional mesh 804 corresponding to the circle 802.

By adding additional information into the displacement three-dimensional mesh 804, the depth displacement system 102 provides additional flexibility in modifying the two-dimensional image 800. For instance, because the depth displacement system 102 added the additional vertices/faces into the displacement three-dimensional mesh 804 at the location 806, the depth displacement system 102 provides the ability to modify the selected portion without compromising the integrity of the surrounding portions of the displacement three-dimensional mesh 804. To illustrate, in response to a request to delete the portion of the two-dimensional image 800 within the circle 802, the depth displacement system 102 removes the corresponding portion of the displacement three-dimensional mesh 804 at the location 806 of the displacement three-dimensional mesh 804. The depth displacement system 102 also provides additional options, such as deforming the portion within the circle 802 without compromising the geometry of the portions of the displacement three-dimensional mesh 804 outside the location 806 or texturing the portion within the circle 802 separately from other portions of the two-dimensional image 800.

In one or more additional embodiments, the depth displacement system 102 utilizes the adaptive tessellation process described above to provide three-dimensional geometries for a variety of operations. To illustrate, the depth displacement system 102 utilizes a displacement three-dimensional mesh generated via the processes described in FIGS. 3-8 to determine shading/shadows in a two-dimensional image based on the displacement three-dimensional mesh. In additional embodiments, the depth displacement system 102 utilizes a displacement three-dimensional mesh to provide intelligent object removal/modification/replacement with accurate contextual data (e.g., shadows/relative positioning/depth values).

Figure 9:
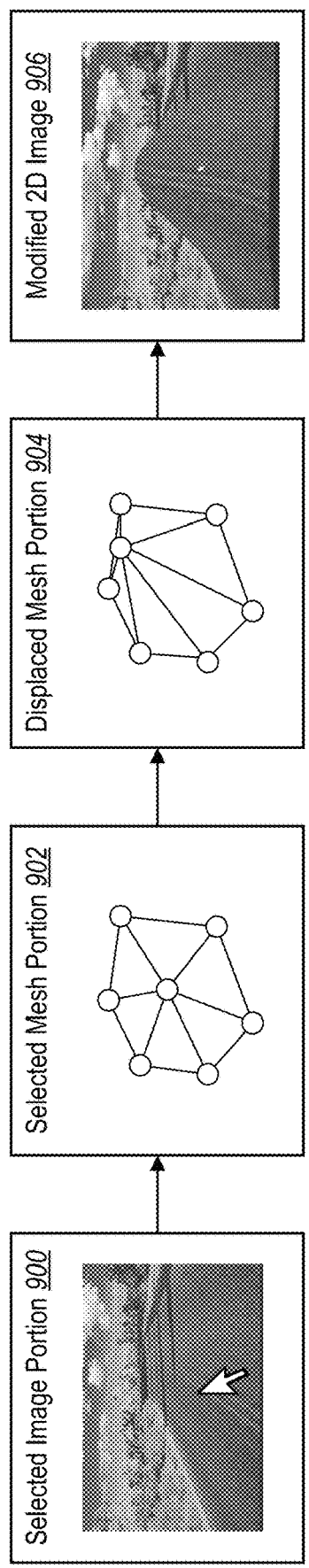
FIG. 9 illustrates an overview of the depth displacement system generating a modified two-dimensional image based on a displacement input for a portion of a two-dimensional image in accordance with one or more implementations.

As mentioned, in one or more embodiments, the depth displacement system 102 provides tools for modifying two-dimensional images utilizing representative three-dimensional meshes. FIG. 9 illustrates an overview of a process in which the depth displacement system 102 modifies a two-dimensional image based on a three-dimensional mesh including depth displacement information associated with the two-dimensional image. Specifically, FIG. 9 illustrates that the depth displacement system modifies a portion of a three-dimensional mesh based on a displacement input relative to a two-dimensional image and generates an updated two-dimensional image based on the modified three-dimensional mesh.

As illustrated in FIG. 9, the depth displacement system 102 determines a selected image portion 900 of a two-dimensional image. For example, the depth displacement system 102 determines a position of a displacement input relative to a two-dimensional image to determine the selected image portion 900. FIGS. 10A-10H and the corresponding description provide additional detail with respect to determining a selected portion of a two-dimensional image based on a displacement input.

FIG. 9 illustrates that the depth displacement system 102 determines a selected mesh portion 902 based on the selected image portion 900. In particular, the depth displacement system 102 determines the selected mesh portion 902 based on a mapping between the two-dimensional image and a three-dimensional mesh generated for the two-dimensional image. FIGS. 10A-10H and the corresponding description provide additional detail with respect to determining a selected portion of a three-dimensional mesh based on a selected portion of a two-dimensional image.

As illustrated in FIG. 9, the depth displacement system 102 also determines a displaced mesh portion 904 based on a displacement input to modify the selected image portion 900. Specifically, the depth displacement system 102 modifies the selected mesh portion 902 according to the displacement input. For example, the depth displacement system 102 modifies one or more vertices in the three-dimensional mesh in one or more displacement directions according to the displacement input. FIGS. 10A-10H and the corresponding description provide additional detail with respect to modifying a portion of a three-dimensional mesh.

In one or more embodiments, the depth displacement system 102 generates a modified two-dimensional image 906 based on the displaced mesh portion 904. For instance, the depth displacement system 102 utilizes the mapping between the two-dimensional image and the three-dimensional mesh to determine one or more modifications to the two-dimensional image according to the displacement input. To illustrate, the depth displacement system 102 re-renders the selected image portion 900 of the two-dimensional image based on the displaced mesh portion 904 to generate the modified two-dimensional image 906. FIGS. 10A-10H and the corresponding description provide additional detail with respect to generating a modified two-dimensional image via a three-dimensional mesh representing a two-dimensional image.

FIGS. 10A-10H illustrate a plurality of graphical user interfaces and three-dimensional meshes in connection with utilizing a displacement input to modify a two-dimensional image. Specifically, FIGS. 10A-10H illustrate that the depth displacement system 102 generates a three-dimensional mesh in connection with a displacement tool for modifying portions of the two-dimensional image. Additionally, FIGS. 10A-10H illustrate modifications to three-dimensional meshes based on displacement inputs utilizing the displacement tool.

Figure 10A:
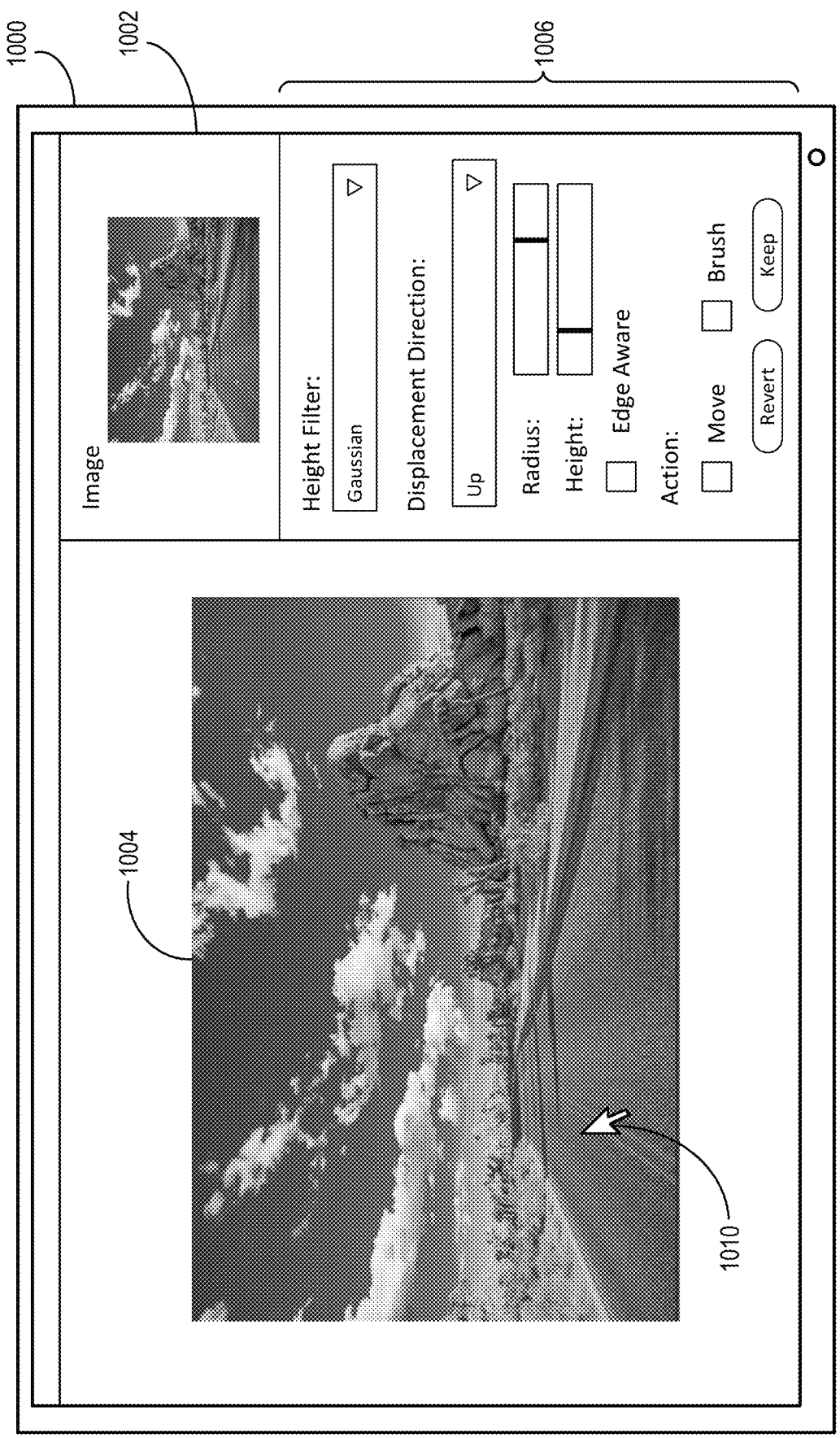
FIGS. 10A-10H illustrate a plurality of graphical user interfaces and three-dimensional meshes in connection with modifying a two-dimensional image via displacement inputs in accordance with one or more implementations.

For example, FIG. 10A illustrates a graphical user interface of a client device 1000 including an image editing application 1002 for editing digital images. Specifically, the client device 1000 includes, or is part of, a laptop computing device, a desktop computing device, or a handheld device (e.g., a smartphone). Additionally, the image editing application 1002 includes a plurality of tools for editing two-dimensional digital images (e.g., raster images), such as digital photographs or digital images generated via a computing device.

In one or more embodiments, as illustrated in FIG. 10A, the client device 1000 displays a two-dimensional image 1004 for editing within the image editing application 1002. In particular, the client device 1000 displays a displacement tool 1006 including one or more settings for displacing a portion of the two-dimensional image 1004. For instance, the displacement tool 1006 includes one or more settings for determining a shape of a displacement, a displacement direction, or other attributes for displacing a portion of the two-dimensional image 1004.

To illustrate, the displacement tool 1006 includes an option (e.g., a dropdown menu) to set a height filter that determines a shape associated with displacing a portion of the two-dimensional image 1004. In response to selecting the height filter, displacement of a portion of the two-dimensional image 1004 causes the modified portion to displace according to the corresponding shape. For example, as illustrated, the height filter includes an option to select a Gaussian filter for displacing a portion of the two-dimensional image 1004 according to a Gaussian distribution.

In additional embodiments, the displacement tool 1006 includes one or more options to select a predefined displacement direction in connection with displacing a portion of the two-dimensional image 1004. For instance, as illustrated in FIG. 10A, the displacement tool 1006 includes a dropdown menu that causes the displacement of a selected portion of the two-dimensional image 1004 in a vertical direction (e.g., "up," "right"). In some embodiments, the displacement tool 1006 includes an option to displace a selected portion of the two-dimensional image 1004 in a horizontal or other direction. In alternative embodiments, the depth displacement system 102 provides options for automatically detecting a direction of displacement or for freeform displacement of a portion of a two-dimensional image.

According to one or more embodiments, the displacement tool 1006 includes options to set a height and/or a radius of a displacement operation. For example, the client device 1000 displays a plurality of sliders that determine a radius value and a height value for displacing a portion of the two-dimensional image 1004. To illustrate, the height value indicates a maximum displacement distance or a degree of displacement to apply during a displacement operation to a selected portion of the two-dimensional image 1004. Additionally, the radius value indicates a width (or perpendicular distance) relative to the displacement direction for applying the displacement to a portion of a three-dimensional mesh based on a displacement input. For example, the radius value indicates a maximum radius of displacement, a radius of displacement at a specific distance (or proportional distance) from a selected point, or a radius of a standard deviation corresponding to the selected height filter.

In one or more embodiments, the displacement tool 1006 also includes an option to indicate whether the displacement is edge aware with respect to an edge of the two-dimensional image 1004 or edges of objects within the two-dimensional image 1004. For example, in response to selecting the edge aware option, the depth displacement system 102 takes edges (of the two-dimensional image 1004 or object(s)) into account when displacing a selected portion of the two-dimensional image 1004. Alternatively, deselecting the edge aware option causes the depth displacement system 102 to ignore edges when displacing a portion of the two-dimensional image 1004.

Furthermore, in some embodiments, the displacement tool 1006 includes options to determine whether a specific attribute of a displacement input moves a displaced portion to a new portion based on movement of the displacement input or brushes along a path corresponding to the movement of the displacement input. For instance, in response to selection of an option to move the displaced portion, the depth displacement system reverts displacement to an initially selected portion and applies the displacement to a newly selected portion. Alternatively, in response to selection of an option to brush the displacement along a path of a displacement input, the depth displacement system 102 applies the displacement to each portion of the two-dimensional image 1004 along the path of movement of the displacement input from the initially selected portion to the newly selected portion.

In one or more embodiments, a displacement input includes an input to apply a displacement to the two-dimensional image 1004 utilizing the displacement tool 1006. For example, the displacement input to modify the two-dimensional image 1004 includes a mouse cursor indicating a position within the graphical user interface in connection with the displacement tool 1006. In alternative embodiments, the displacement input includes a touchscreen input on a touch device indicating a position within the graphical user interface.

Figure 10B:
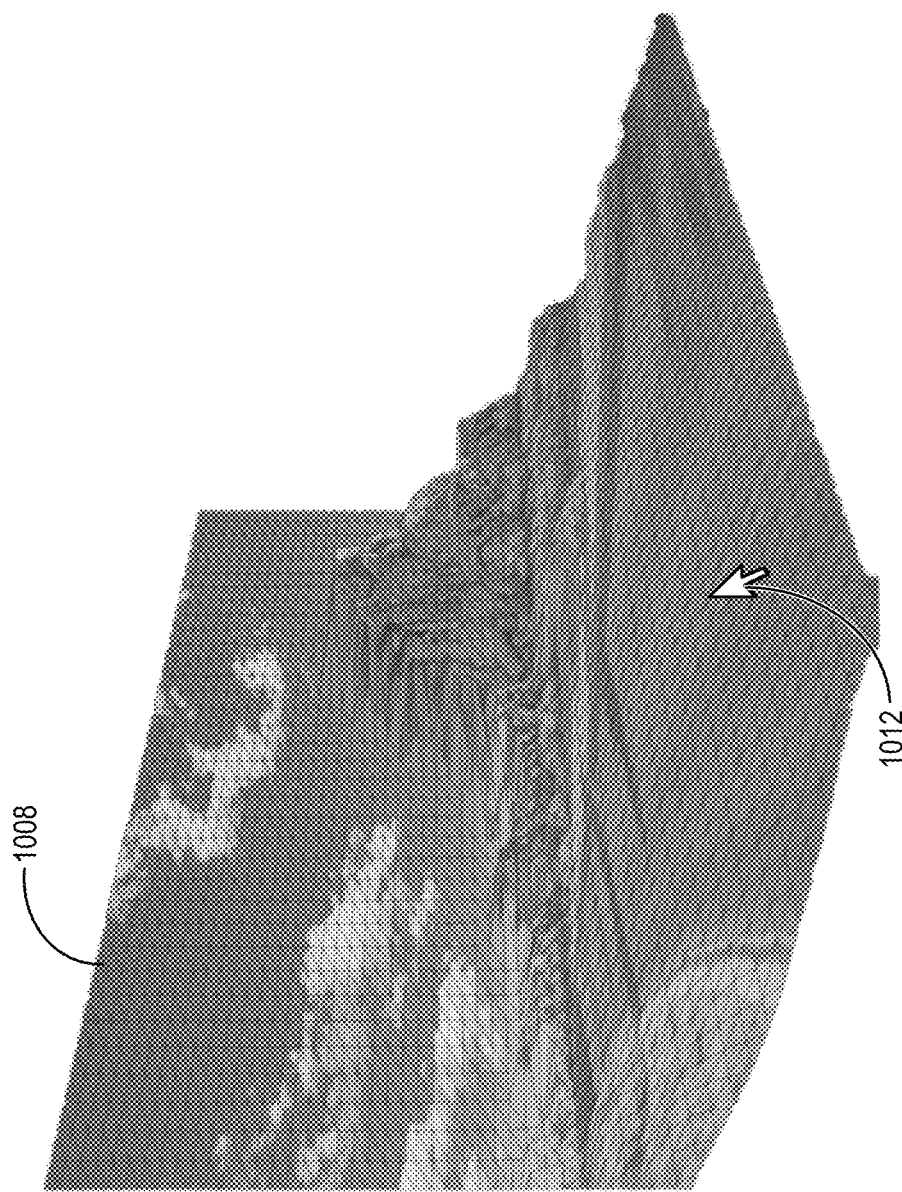

FIG. 10B illustrates a three-dimensional mesh 1008 including displacement information associated with the two-dimensional image 1004 of FIG. 10A. In particular, as previously described, the depth displacement system 102 generates the three-dimensional mesh 1008 to include a plurality of vertices and faces that form a structure representing the content of the two-dimensional image 1004. For example, the depth displacement system 102 generates the three-dimensional mesh 1008 to include a three-dimensional representation of a desert scene, including displacement of vertices corresponding to the estimated depth values of the two-dimensional image 1004. In one or more embodiments, the depth displacement system 102 generates the three-dimensional mesh 1008 utilizing the adaptive tessellation process, as described above with respect to FIGS. 3-8.

In alternative embodiments, the depth displacement system 102 generates the three-dimensional mesh 1008 via uniform tessellation by determining positions of vertices in the three-dimensional mesh 1008 according to estimated pixel depth values and estimated camera parameters. For example, the depth displacement system 102 determines estimates the pixel depth values by utilizing a neural network that determines pixel depth disparity (e.g., as described above). Furthermore, the depth displacement system 102 utilizes an additional neural network to estimate the camera parameters. The depth displacement system 102 generates the three-dimensional mesh 1008 by estimating positions of vertices of an initial mesh representing the two-dimensional image 1004 according to the estimated pixel depth values and the estimated camera parameters.

In one or more embodiments, in response to a displacement input, the depth displacement system 102 determines positions of the displacement input in the two-dimensional image 1004 and the three-dimensional mesh 1008. Specifically, the depth displacement system 102 determines a two-dimensional position 1010 of the displacement input relative to the two-dimensional image 1004 via the graphical user interface based on a projection of the two-dimensional image 1004 onto the three-dimensional mesh 1008. To illustrate, the depth displacement system 102 determines the two-dimensional position 1010 based on a coordinate system associated with the two-dimensional image 1004. Accordingly, the depth displacement system 102 determines the two-dimensional position 1010 as an (x, y) coordinate position generated in connection with the two-dimensional image 1004 or as a pixel coordinate corresponding to the two-dimensional image 1004.

In additional embodiments, the depth displacement system 102 determines a three-dimensional position 1012 of the displacement within a three-dimensional space of the three-dimensional mesh 1008 based on the two-dimensional position 1010. In particular, the depth displacement system 102 determines a mapping between the two-dimensional image 1004 and the three-dimensional mesh 1008 by projecting the two-dimensional image 1004 onto the three-dimensional mesh 1008. For example, the depth displacement system 102 determines a texture mapping that indicates a position of each pixel of the two-dimensional image 1004 on the three-dimensional mesh 1008 within the three-dimensional space according to rays projected from an estimated camera position onto the three-dimensional mesh 1008. Accordingly, to determine the three-dimensional position 1012, the depth displacement system 102 utilizes the mapping/projection to determine a selected portion of the three-dimensional mesh 1008 based on a selected portion of the two-dimensional image 1004.

To illustrate, the depth displacement system 102 utilizes an estimated camera position to project a plurality of rays from the two-dimensional image 1004 into a three-dimensional space including the three-dimensional mesh 1008. Specifically, the depth displacement system 102 projects a ray in connection with each pixel of the two-dimensional image 1004 in a direction based on the estimated camera position onto a corresponding location of the three-dimensional mesh 1008. The depth displacement system 102 generates a mapping to indicate which portion (e.g., one or more vertices/faces) of the three-dimensional mesh 1008 each pixel corresponds to based on a corresponding projected ray.

Figure 10C:
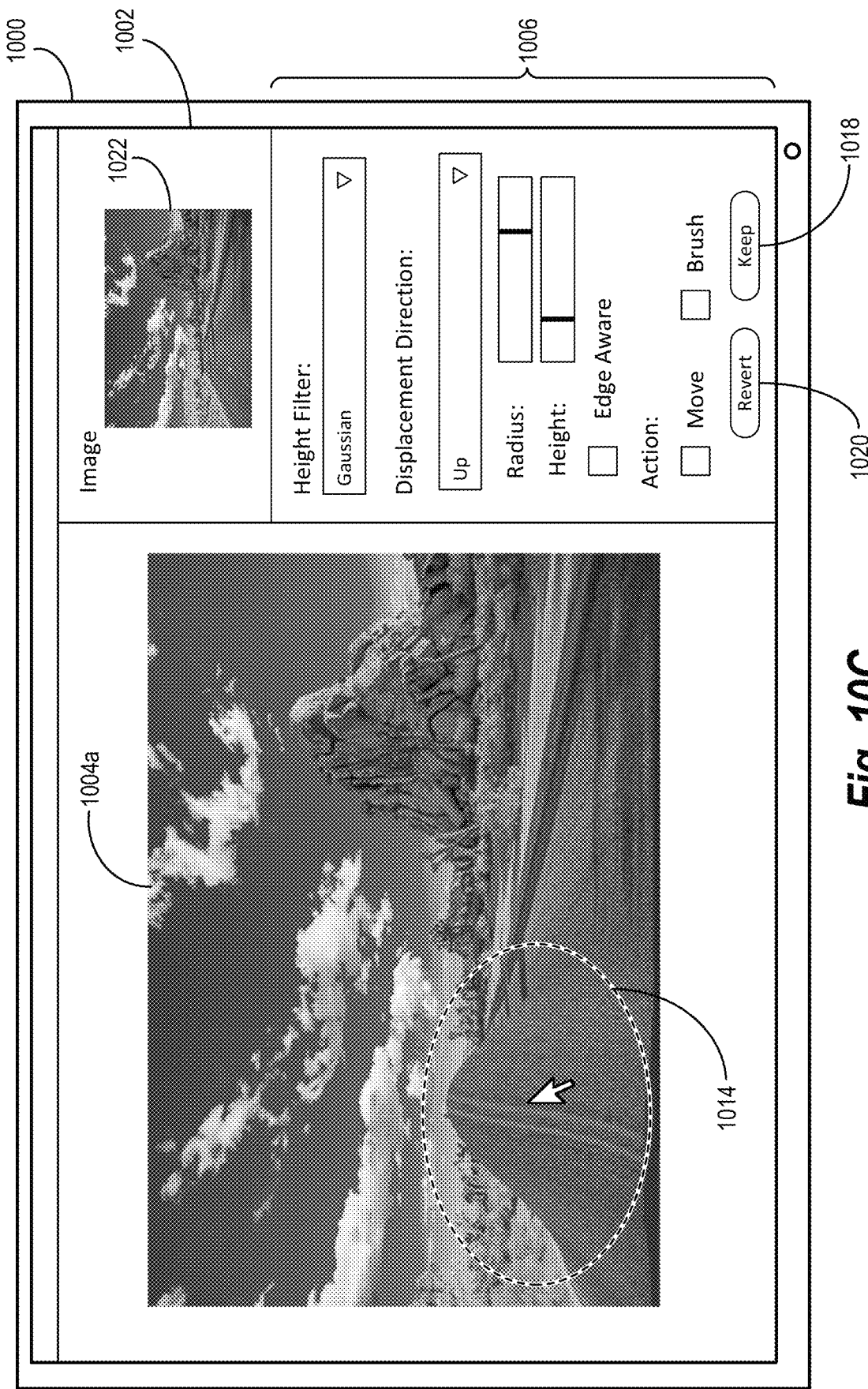

In one or more embodiments, the depth displacement system 102 modifies a three-dimensional mesh corresponding to a two-dimensional image based on a displacement input. FIG. 10C illustrates the client device 1000 displaying a two-dimensional image 1004a after modifying the two-dimensional image 1004 of FIG. 10A in response to a displacement input. For example, the depth displacement system 102 determines that the displacement input includes a plurality of settings utilizing the displacement tool 1006 to displace a selected portion 1014 of the two-dimensional image 1004a. As illustrated, the depth displacement system 102 pushes the selected portion upward with a Gaussian shape according to displacement input (e.g., a position of the displacement input moving vertically) and the settings of the displacement tool 1006.

Figure 10D:
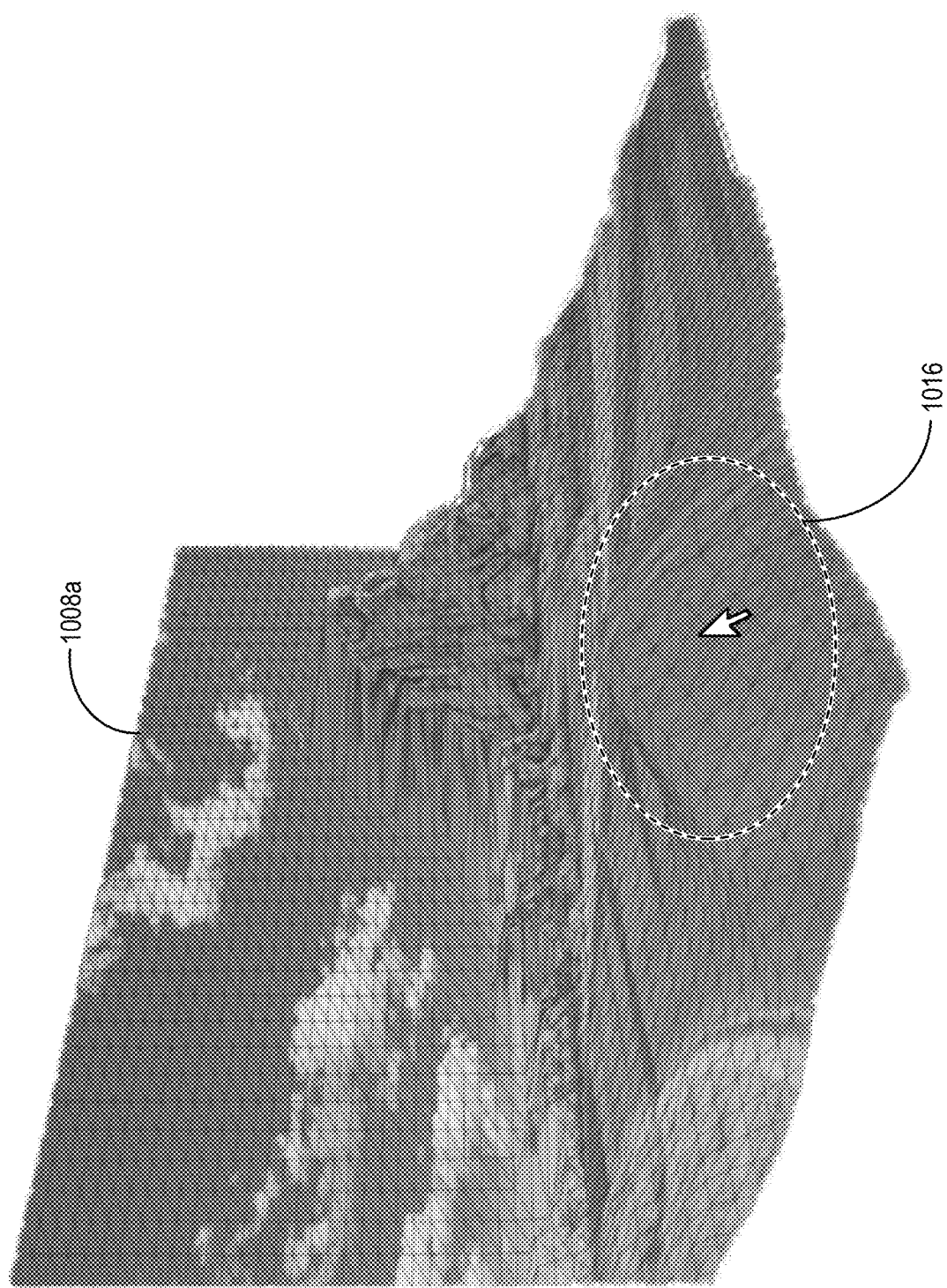

Furthermore, as illustrated, the depth displacement system 102 modifies the selected portion 1014 of the two-dimensional image 1004a consistent with a three-dimensional structure of the two-dimensional image 1004a. In particular, FIG. 10D illustrates a three-dimensional mesh 1008a generated by the depth displacement system 102 to represent the two-dimensional image 1004a. The depth displacement system 102 determines a selected portion 1016 of the three-dimensional mesh 1008a based on the selected portion 1014 of the two-dimensional image 1004a and the mapping between the two-dimensional image 1004a and the three-dimensional mesh 1008a (e.g., generated initially as described above with respect to FIGS. 10A-10B).

In one or more embodiments, in response to the displacement input, the depth displacement system 102 utilizes the settings of the displacement tool 1006 to determine a displacement of the selected portion 1016 of the three-dimensional mesh 1008a. Specifically, the depth displacement system 102 utilizes the displacement tool to move a selected set of vertices in one or more displacement directions (e.g., "up") by one or more displacement amounts determined by the height filter. For example, as shown, the depth displacement system 102 moves a vertex at a point corresponding to the displacement input by a first amount, adjacent vertices by a second amount, etc.

In response to modifying the three-dimensional mesh 1008a (e.g., by displacing a portion of the three-dimensional mesh 1008a), the depth displacement system 102 modifies the two-dimensional image 1004a according to the displaced portion. For example, the depth displacement system 102 utilizes a mapping between the two-dimensional image 1004a and the three-dimensional mesh 1008a to convert the modifications to the three-dimensional mesh 1008a to a two-dimensional space of the two-dimensional image 1004a. To illustrate, the depth displacement system 102 utilizes camera parameters to re-render the two-dimensional image 1004a based on the updated positions of vertices in the three-dimensional mesh 1008a. To illustrate, the depth displacement system 102 to determine where rays from the estimated camera position intersect with the three-dimensional mesh 1008a and corresponding pixels in two-dimensional space (e.g., associated with pixels of the two-dimensional image 1004a). Thus, the depth displacement system 102 modifies a portion of the two-dimensional image 1004a in a manner that is consistent with the three-dimensional environment representing the two-dimensional image 1004a (e.g., by displacing a portion of the road in the desert scene without modifying portions behind the road such as the sky). In one or more embodiments, as illustrated in FIG. 10C, the client device 1000 displays a preview 1022 of the two-dimensional image 1004 without the changes to allow the user to compare the changes during real-time editing of the two-dimensional image 1004a within the image editing application 1002.

In one or more embodiments, the depth displacement system 102 provides tools for applying and reverting displacements in a preview of the modifications. Specifically, the depth displacement system 102 provides a live preview of the two-dimensional image 1004a including the modifications based on the displacement input. Additionally, the depth displacement system 102 provides an option to commit the displacement to the two-dimensional image 1004a and save any deformations made to the content of the two-dimensional image 1004a. FIG. 10C illustrates that the client device 1000 displays a keep option 1018 to commit the displacement (e.g., save the displacement) to the two-dimensional image 1004a.

The client device 1000 also displays a revert option 1020 to revert the displacement and restore the two-dimensional image 1004a to a previous state (e.g., without requiring the use of a separate undo button). In some instances, the depth displacement system 102 provides additional methods for committing or reverting displacements. For example, in response to detecting a key press (e.g., an escape key), the depth displacement system 102 reverts the changes and does not commit the displacement. Alternatively, in response to detecting a separate key press (e.g., a space bar or enter key), the depth displacement system 102 commits the changes and stores the two-dimensional image 1004a with the displacement.

Figure 10E:
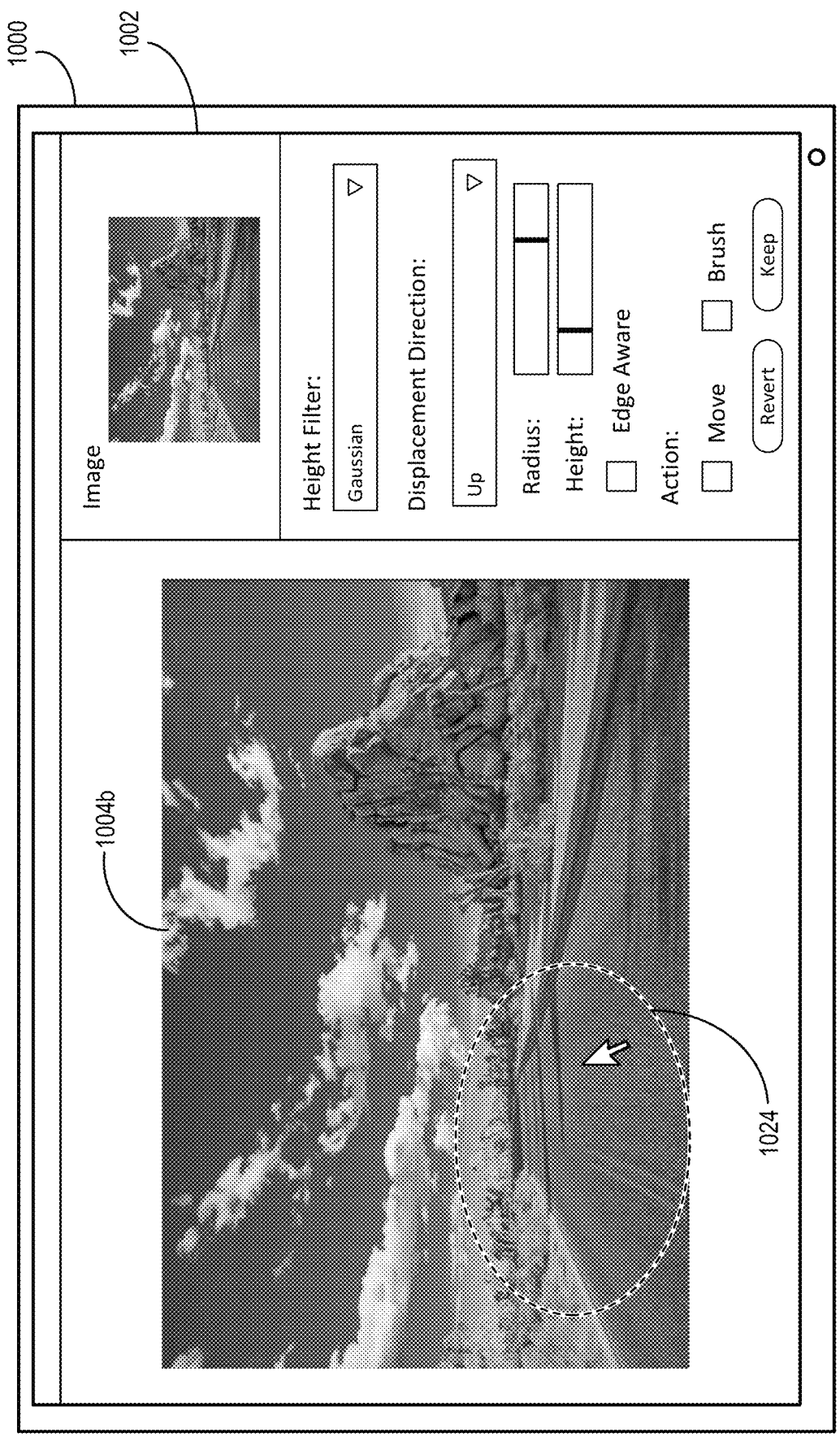

In one or more embodiments, the client device 1000 detects an additional input in connection with the displacement input. For example, in response to an additional mouse click, touchscreen input, or other input in connection with the displacement input, the depth displacement system 102 changes a position of the displacement within a two-dimensional image and the corresponding three-dimensional mesh. FIG. 10E illustrates that the client device 1000 displays a two-dimensional image 1004b including a selected portion 1024 associated with a displacement input. In one or more embodiments, in response to receiving the additional input (e.g., a middle mouse click), the depth displacement system 102 changes a position of the displacement to a new position within the two-dimensional image 1004b while reverting the changes to the original portion of the two-dimensional image 1004b to a previous state.

Figure 10F:
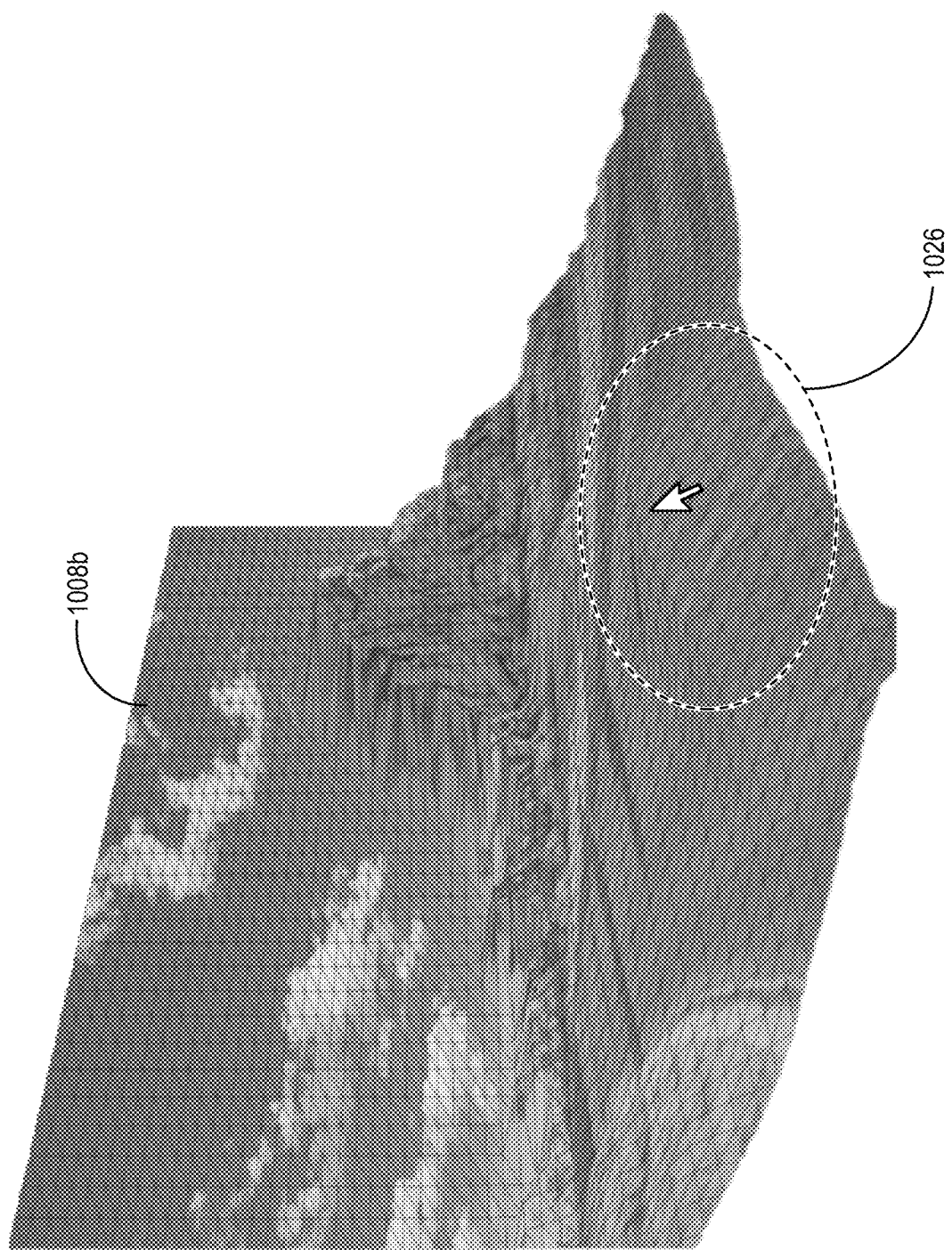

FIG. 10F illustrates a three-dimensional mesh 1008b corresponding to the two-dimensional image 1004b of FIG. 10E. In response to the additional input with the displacement input, the depth displacement system 102 changes a position of the displaced portion to a selected portion 1026 of the three-dimensional mesh 1008b. Furthermore, in response to moving the modified portion to the new position, the depth displacement system 102 also updates the preview of the two-dimensional image 1004b displayed at the client device 1000 to reflect the changes to the three-dimensional mesh 1008b.

In alternative embodiments, instead of changing the position of the displacement to a new position and reverting the displacement at the original position, the depth displacement system 102, the depth displacement system 102 applies the displacement to all areas of the three-dimensional mesh 1008b and the two-dimensional image 1004b along a path of movement of the displacement input. To illustrate, the depth displacement system 102 determines whether to move the displacement or apply the displacement along a path based on a selected setting associated with the displacement tool 1006. Accordingly, the depth displacement system 102 applies the displacement similar to a brushstroke along the path based on a selected setting of the displacement tool 1006.

Figure 10G:
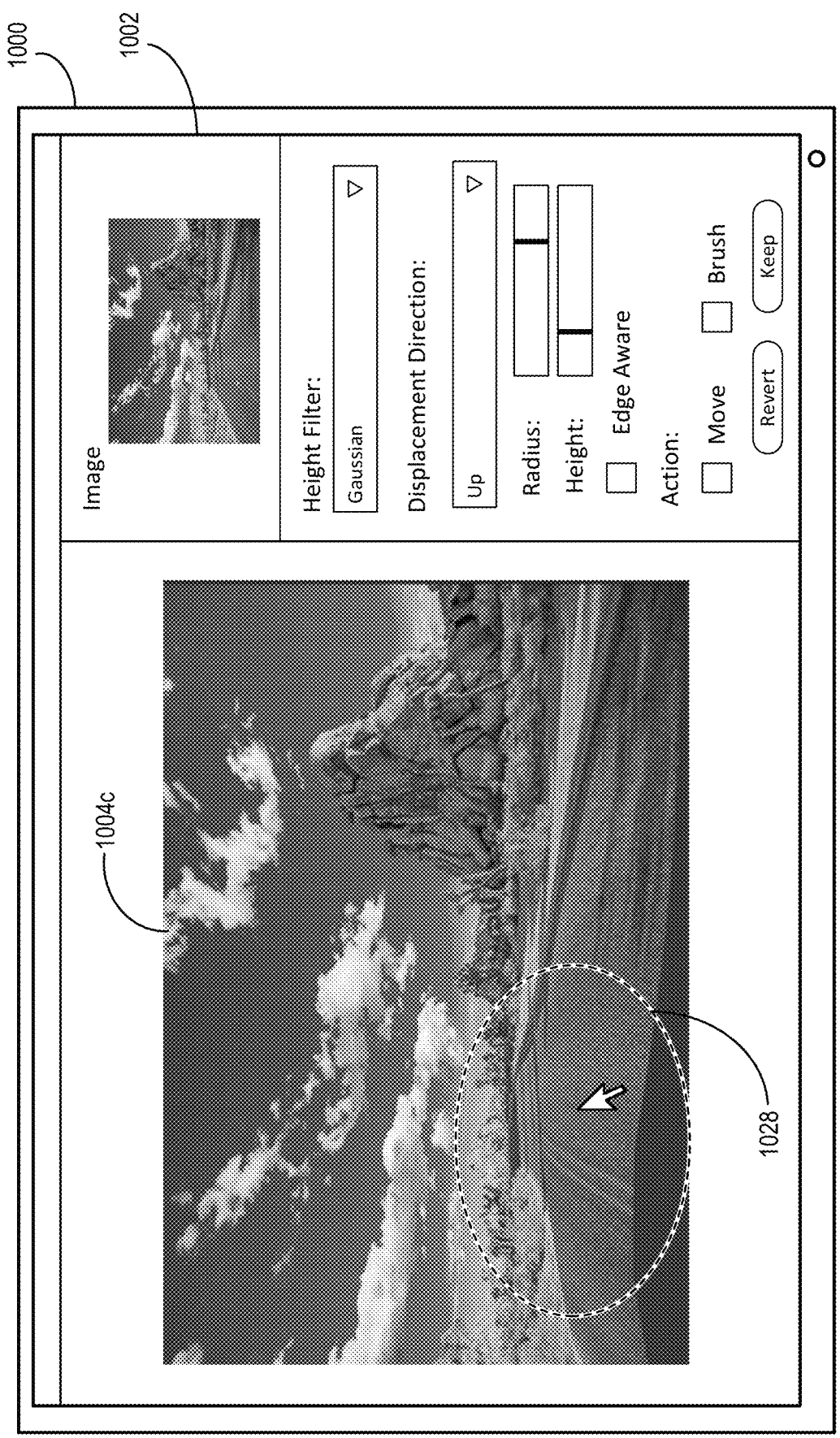

As mentioned, the depth displacement system 102 also provides a displacement tool with additional attributes that allow for greater control over the shape and/or displacement associated with a displacement input. FIG. 10G illustrates the client device 1000 displaying a two-dimensional image 1004c in response to an additional attribute associated with the displacement input. For instance, the depth displacement system 102 determines that the displacement input moves in an additional direction to modify a selected portion 1028 of the two-dimensional image 1004c. To illustrate, in response to a horizontal movement of the displacement input (e.g., a perpendicular movement to the original movement), the depth displacement system 102 modifies a radius or shape associated with the displacement input.

Figure 10H:
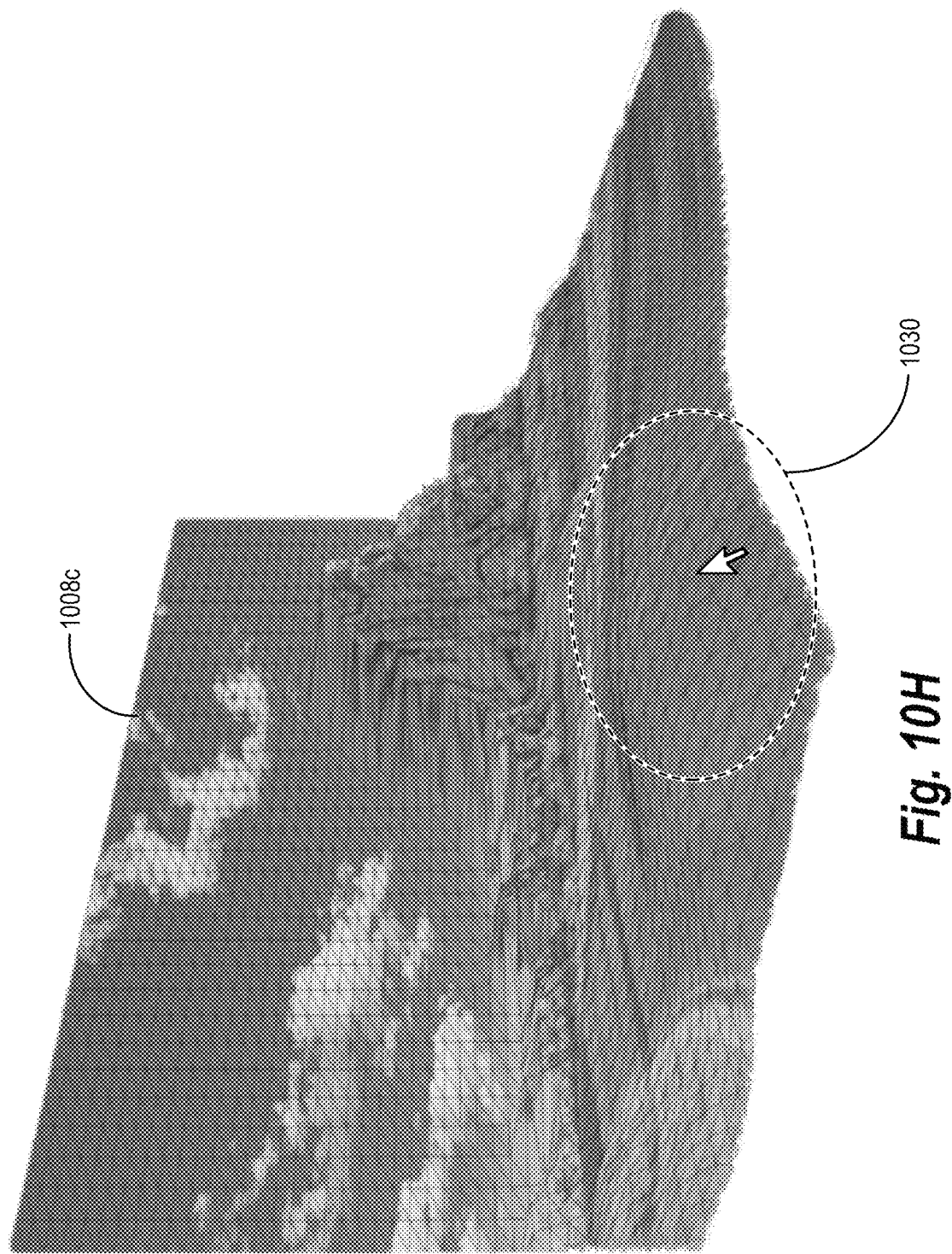

In connection with the additional attribute associated with the displacement input, FIG. 10H illustrates a three-dimensional mesh 1008c corresponding to the two-dimensional image 1004c. In particular, based on the additional attribute of the displacement input, the depth displacement system 102 determines a selected portion 1030 of the three-dimensional mesh 1008c corresponding to the selected portion 1028 of the two-dimensional image 1004c. In one or more embodiments, the depth displacement system 102 modifies a radius, shape, or other attribute of the displaced portion according to the additional attribute of the displacement input. To illustrate, the depth displacement system 102 flattens the displaced portion while displacing a greater selection of vertices of the three-dimensional mesh 1008c. As shown in FIG. 10G, the client device 1000 displays the two-dimensional image 1004c with modifications based on the displaced portion of the three-dimensional mesh 1008c.

Figure 11A:
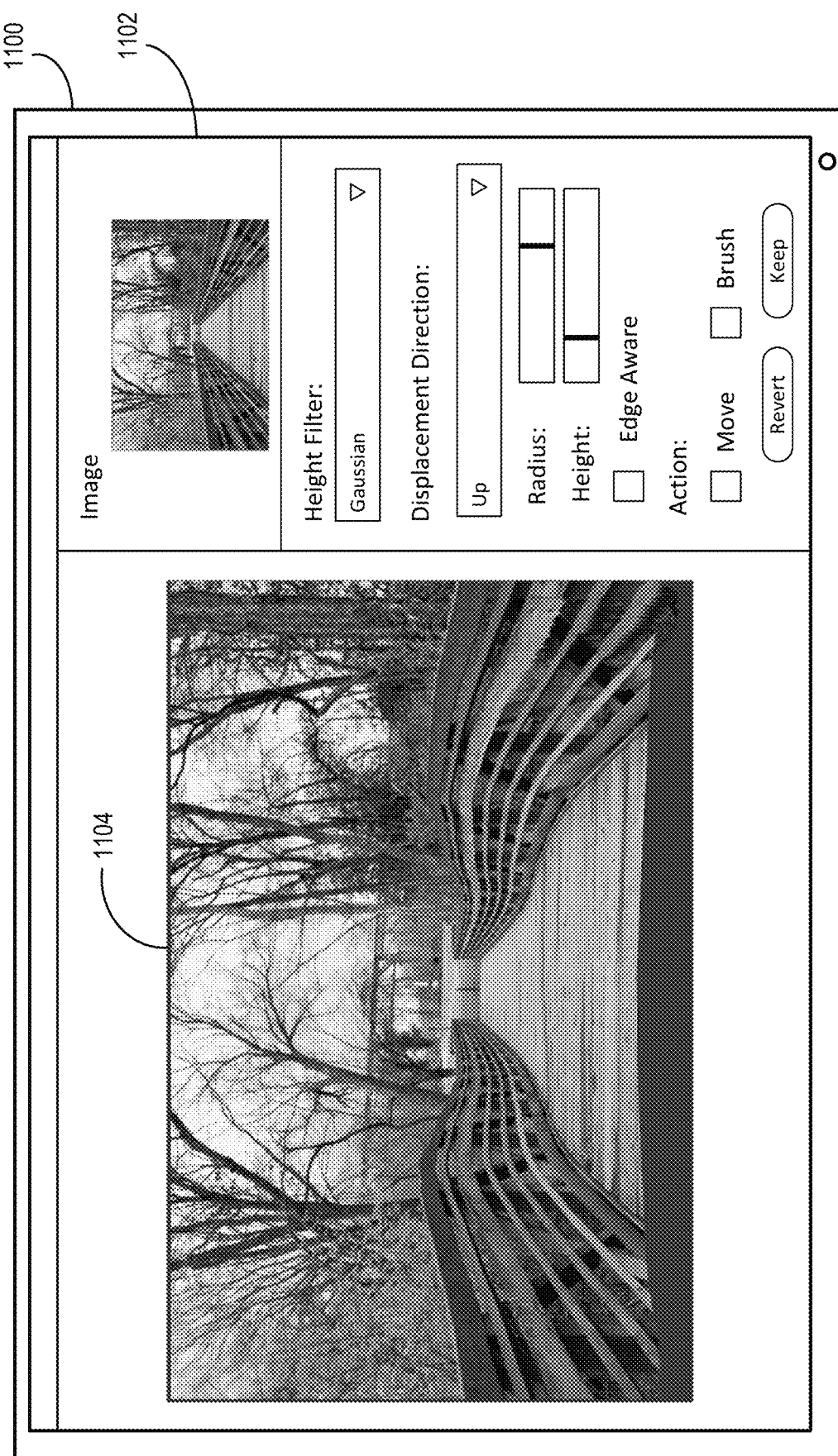
FIGS. 11A-11C illustrate a plurality of graphical user interfaces for generating an animation in connection with modifying a two-dimensional image via a corresponding three-dimensional mesh in accordance with one or more implementations.
Figure 11B:
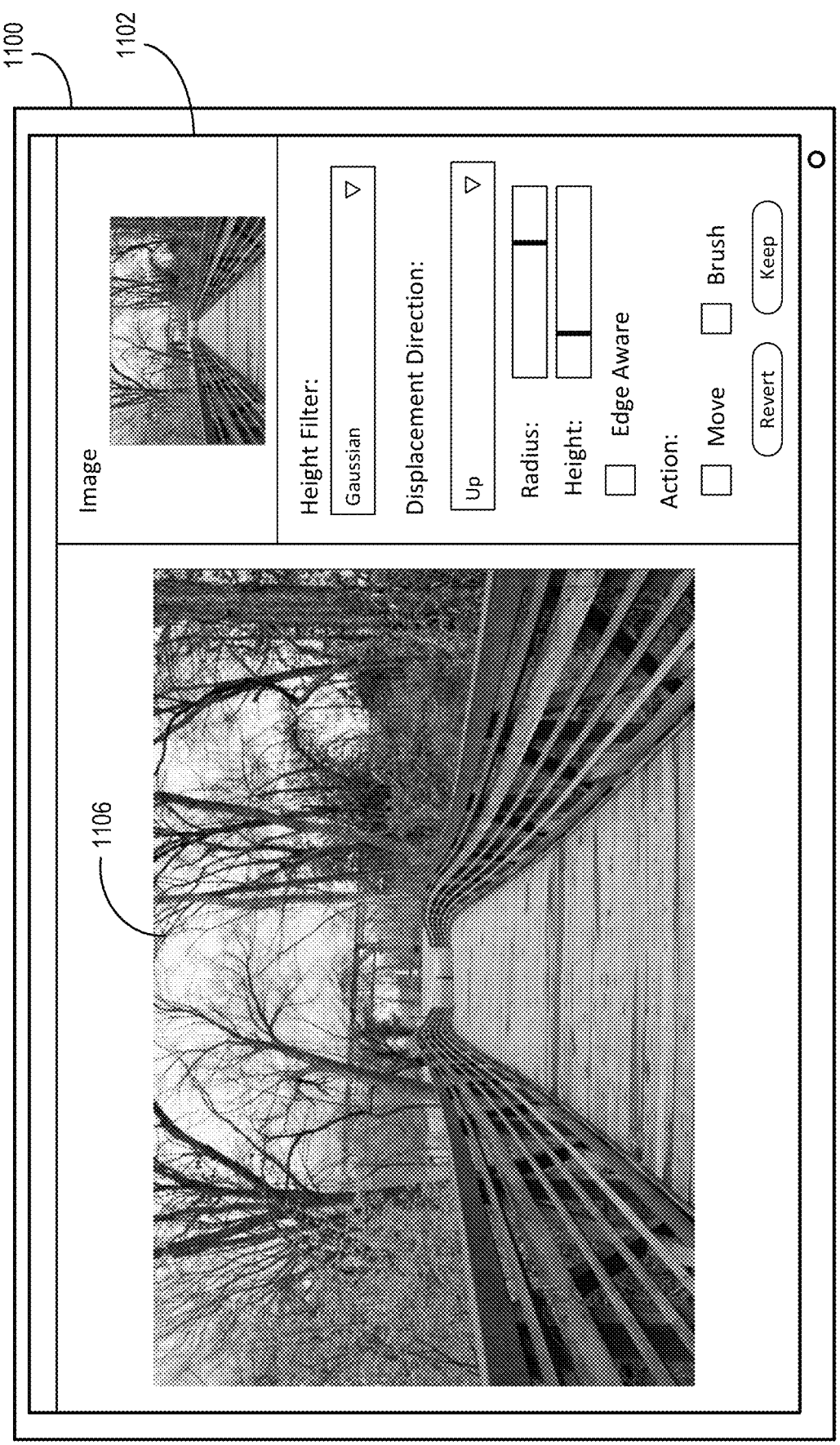
Figure 11C:
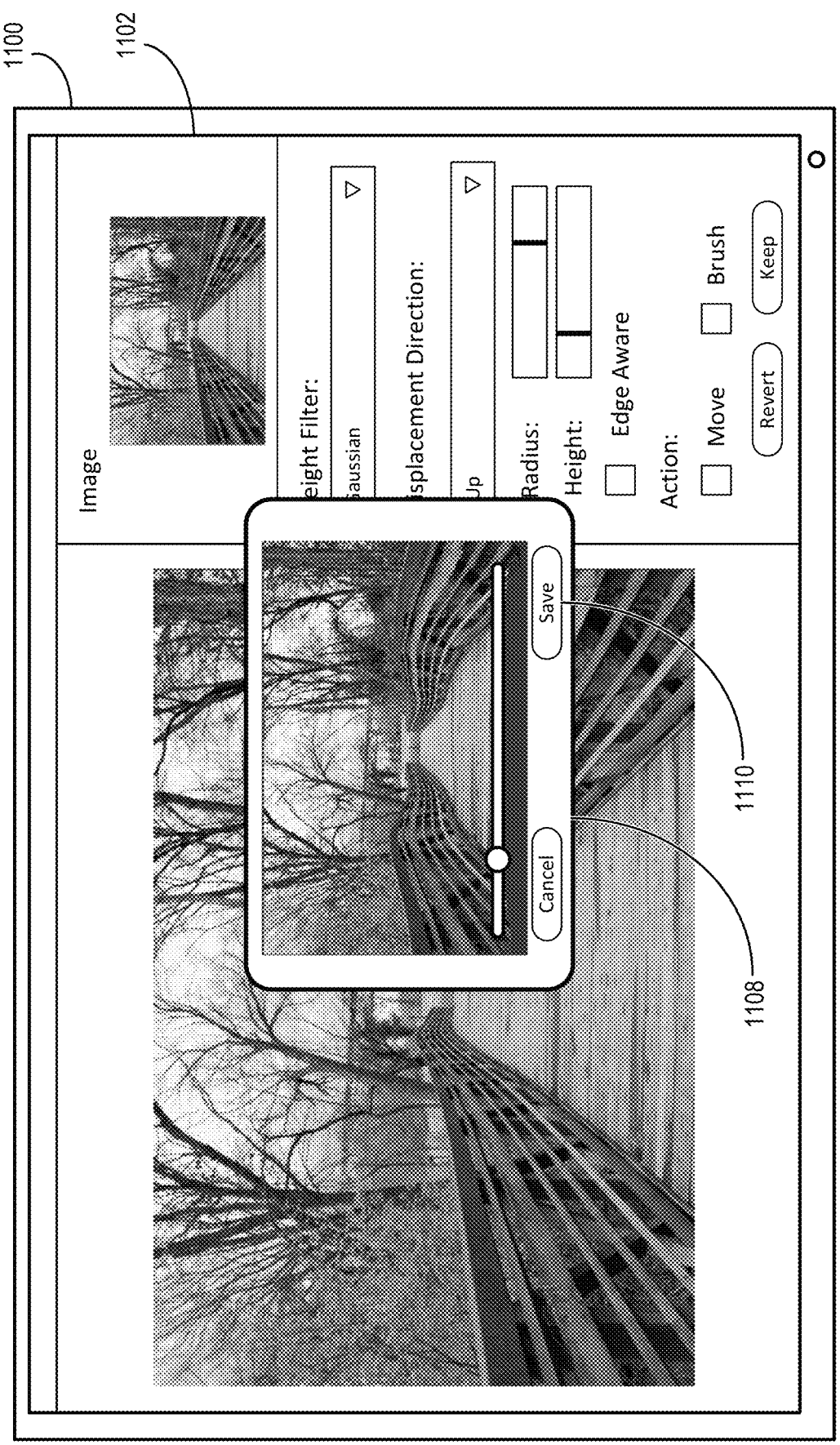

In one or more embodiments, the depth displacement system 102 also provides tools for generating animations via a displacement tool. FIGS. 11A-11C illustrate graphical user interfaces for generating an animation of displacement operations in connection with a two-dimensional image. Specifically, as illustrated in FIGS. 11A-11C, the depth displacement system 102 determines one or more displacement inputs to displace one or more portions of a two-dimensional image and generates an animation from the one or more displacement inputs.

FIG. 11A illustrates a graphical user interface of a client device 1100 including an image editing application 1102. For example, as illustrated, the client device 1100 displays a first two-dimensional image 1104 including a modified portion based on a displacement input. In particular, the depth displacement system 102 displaces/warps a portion of a bridge within the first two-dimensional image 1104 based on displacement settings associated with a displacement input. FIG. 11B illustrates the client device 1100 displaying a second two-dimensional image 1106 including a different modified portion based on the same displacement input or a different displacement input.

In one or more embodiments, the depth displacement system 102 generates an animation based on the first two-dimensional image 1104 and the second two-dimensional image 1106. For instance, the depth displacement system 102 generates an animation including a plurality of video frames to show how the first two-dimensional image 1104 changes into the second two-dimensional image 1106. According to one or more embodiments, the depth displacement system 102 records (e.g., as individual video frames) movement of a displaced portion from the position of the first two-dimensional image 1104 to the position of the second two-dimensional image 1106, resulting in a digital video that shows a ripple effect across the bridge in the images.

In alternative embodiments, the depth displacement system 102 utilizes the first two-dimensional image 1104 and the second two-dimensional image 1106 to predict a plurality of images between the two images. Specifically, rather than recording a plurality of displacement modifications, the depth displacement system 102 utilizes the underlying three-dimensional mesh to interpolate a plurality of displaced portions. For example, the depth displacement system 102 utilizes a first displaced portion and a second displaced portion of a three-dimensional mesh to generate estimated positions of a plurality of displaced portions between the first displaced portion and the second displaced portion.

As an example, the depth displacement system 102 utilizes the first displaced portion of the first two-dimensional image 1104 and the second displaced portion of the second two-dimensional image 1106 to interpolate a plurality of displaced portions between the first displaced portion and the second displaced portion. To illustrate, the depth displacement system 102 determines a plurality of displaced portions of the three-dimensional mesh corresponding to the bridge based on the settings of the displacement input and the positions of the first and second portions. Accordingly, the depth displacement system 102 automatically generates an animation including the indicated displaced portions and the estimated displaced portions. In some instances, the depth displacement system 102 also provides options to modify the animation by automatically changing attributes of the indicated portions and the estimated portions without requiring additional displacement inputs (e.g., by computationally generating the displacements based on the selected settings and the three-dimensional mesh).

FIG. 11C illustrates that the client device 1100 displays an animation generated based on the first two-dimensional image 1104 and the second two-dimensional image 1106. For instance, the client device 1100 displays a window 1108 including a digital video generated by the depth displacement system 102 based on the animation. Additionally, as illustrated in FIG. 11C, the client device 1100 provides a save option 1110 for saving the digital video including the animation.

Figure 12A:
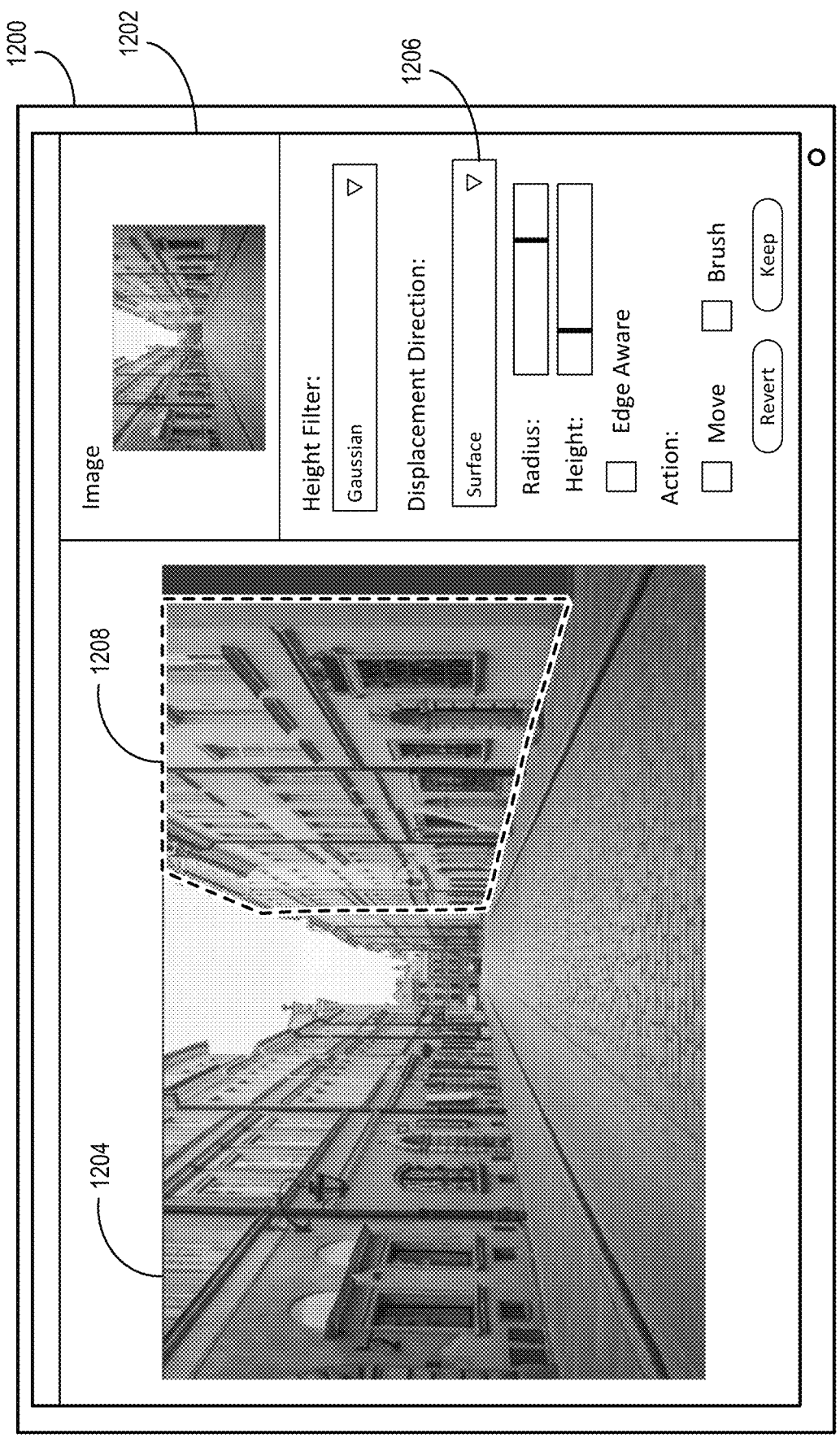
FIGS. 12A-12C illustrate a graphical user interface and diagrams in connection with the depth displacement system determining a displacement direction for a portion of a two-dimensional image in accordance with one or more implementations.
Figure 12C:
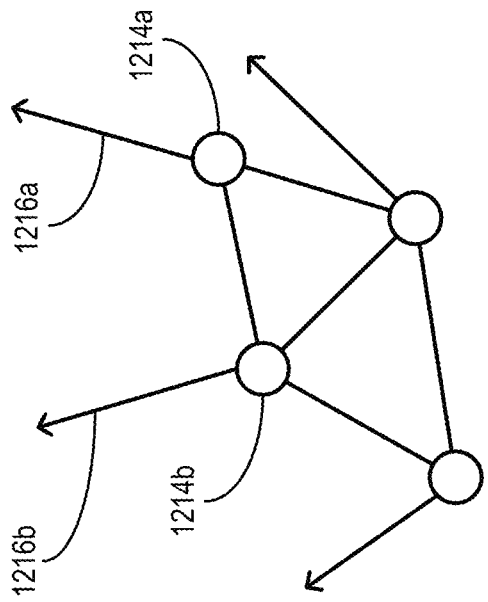
Figure 12B:
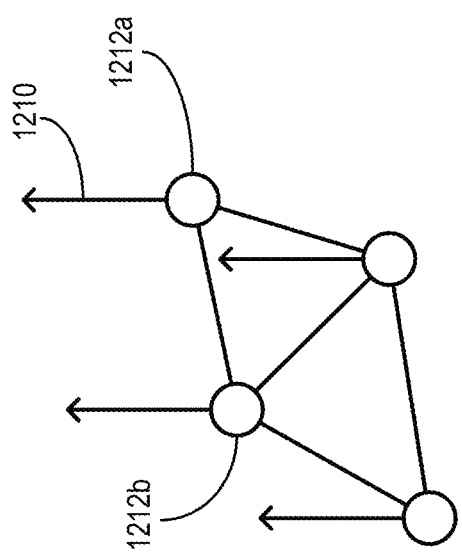

In one or more embodiments, the depth displacement system 102 determines a displacement direction of a displacement input according to one or more settings of a displacement tool. FIGS. 12A-12C illustrate embodiments in which the depth displacement system 102 determines a displacement direction based on one or more attributes of a displacement input and/or based on a geometry of a three-dimensional mesh representing a two-dimensional image. Specifically, FIG. 12A illustrates a graphical user interface in connection with automatically determining a displacement direction. FIGS. 12B-12C illustrate determining one or more displacement directions relative to vertices of a three-dimensional mesh.

As mentioned, in one or more embodiments, the depth displacement system 102 determines a displacement direction based on a selected setting associated with a displacement tool. For example, FIG. 12A illustrates a graphical user interface of a client device 1200 including an image editing application 1202 for modifying a two-dimensional image 1204. In particular, the client device 1200 displays a direction setting 1206 for selecting a predetermined direction of a displacement operation. As illustrated in FIG. 12A, the depth displacement system 102 dynamically determines a displacement direction based on the direction setting 1206 according to a selected surface.

More specifically, the depth displacement system 102 determines a direction to displace a selected portion of a two-dimensional image based on a surface associated with the selected portion. In one or more embodiments, the depth displacement system 102 determines a displacement direction based on a normal of a selected surface. For example, as FIG. 12A illustrates, the depth displacement system 102 determines a displacement direction based on a surface of a selected portion 1208 of the two-dimensional image 1204. To illustrate, the depth displacement system 102 determines that the selected portion 1208 includes a surface with an overall normal pointing in a particular direction (e.g., based on the selected portion 1208 including a plurality of building faces). For example, in one or more embodiments, the depth displacement system 102 determines the overall normal of the surface based on an average normal position of polygons of the corresponding three-dimensional mesh pointing in a specific direction.

As mentioned, in one or more embodiments, the depth displacement system 102 determines displacement directions according to a single predetermined direction. FIG. 12B illustrates a plurality of connected vertices in a selected portion of a three-dimensional mesh. As illustrated in FIG. 12B, the depth displacement system 102 determines a displacement direction 1210 for each of the vertices based on a setting indicating the displacement direction 1210 and/or based on an overall surface to which each vertex belongs (e.g., as in FIG. 12A). Accordingly, the depth displacement system 102 displaces each of the vertices (e.g., a first vertex 1212a and a second vertex 1212b) in the displacement direction 1210 according to a displacement input. Furthermore, in one or more embodiments, the depth displacement system 102 determines a displacement distance to modify the vertices according to a selected height filter, shape, radius, and/or height of the displacement input and/or based on a distance of each vertex to an initial displacement input point.

In one or more alternative embodiments, the depth displacement system 102 dynamically determines a specific displacement direction for each vertex a selected portion of a three-dimensional mesh. For example, FIG. 12C illustrates that the depth displacement system 102 determines a plurality of different displacement directions for a plurality of vertices in a selected portion of a three-dimensional mesh. To illustrate, the depth displacement system 102 determines a normal for each vertex in the selected portion and determines the displacement direction for the vertex based on the normal. In particular, FIG. 12C illustrates that the selected portion includes a first vertex 1214a and a second vertex 1214b. The depth displacement system 102 determines the displacement directions based on a normal for each vertex, resulting in a first displacement direction 1216a for the first vertex 1214a and a second displacement direction 1216b for the second vertex 1214b.

By determining displacement directions based on predetermined directions, vertex normals, or surface directions, the depth displacement system 102 provides flexible and dynamic displacement of two-dimensional images. For example, the depth displacement system 102 provides displacement of selected portions of two-dimensional images by raising, lowering, flattening, inflating/deflating, or otherwise modifying objects within two-dimensional images by displacing individual vertices of the corresponding three-dimensional mesh. Additionally, the depth displacement system 102 thus provides a variety of different ways to interact with/modify objects within a two-dimensional image in a way that is consistent with a three-dimensional representation of the two-dimensional image.

Figure 13:
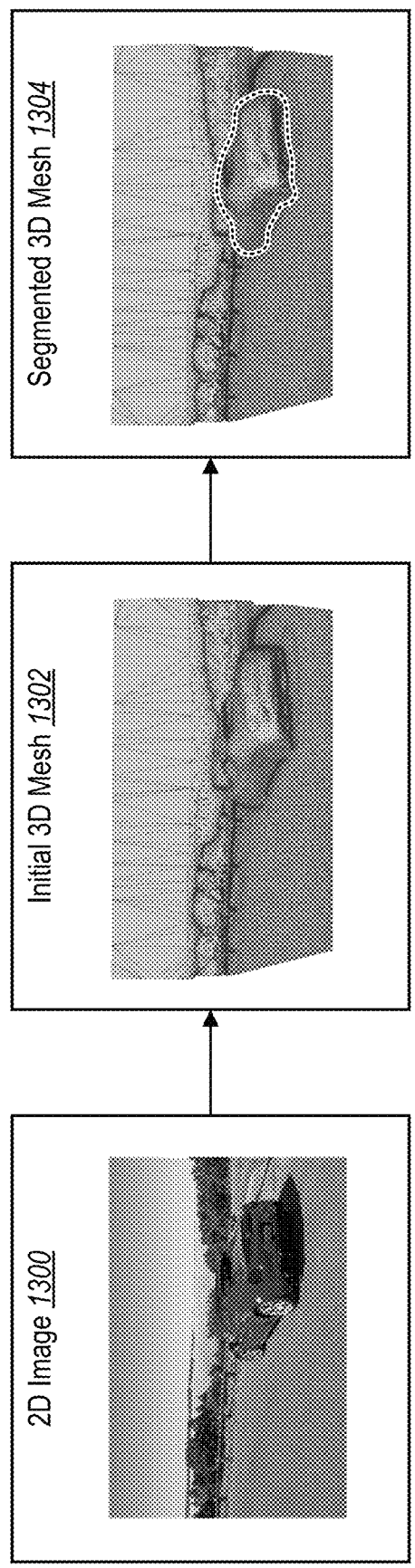
FIG. 13 illustrates a diagram of the depth displacement system segmenting a three-dimensional mesh of a two-dimensional image in accordance with one or more implementations.

In one or more embodiments, the depth displacement system 102 also provides segmentation of a three-dimensional mesh corresponding to a two-dimensional image based on objects in the two-dimensional image. In particular, the depth displacement system 102 detects one or more objects in a two-dimensional image and segments a three-dimensional mesh based on the detected object(s). FIG. 13 illustrates an overview of the depth displacement system 102 generating and segmenting a three-dimensional mesh representing a two-dimensional image based on objects in the two-dimensional image.

As illustrated in FIG. 13, the depth displacement system 102 determines a two-dimensional image 1300. For example, the two-dimensional image 1300 includes a plurality of objects—e.g., one or more objects in a foreground region and/or one or more objects in a background region. In one or more embodiments, the depth displacement system 102 also generates an initial three-dimensional mesh 1302 for the two-dimensional image 1300 utilizing the adaptive tessellation operations described above. Accordingly, the initial three-dimensional mesh 1302 includes a connected tessellation of polygons representing the objects in the two-dimensional image 1300.

Figure 14:
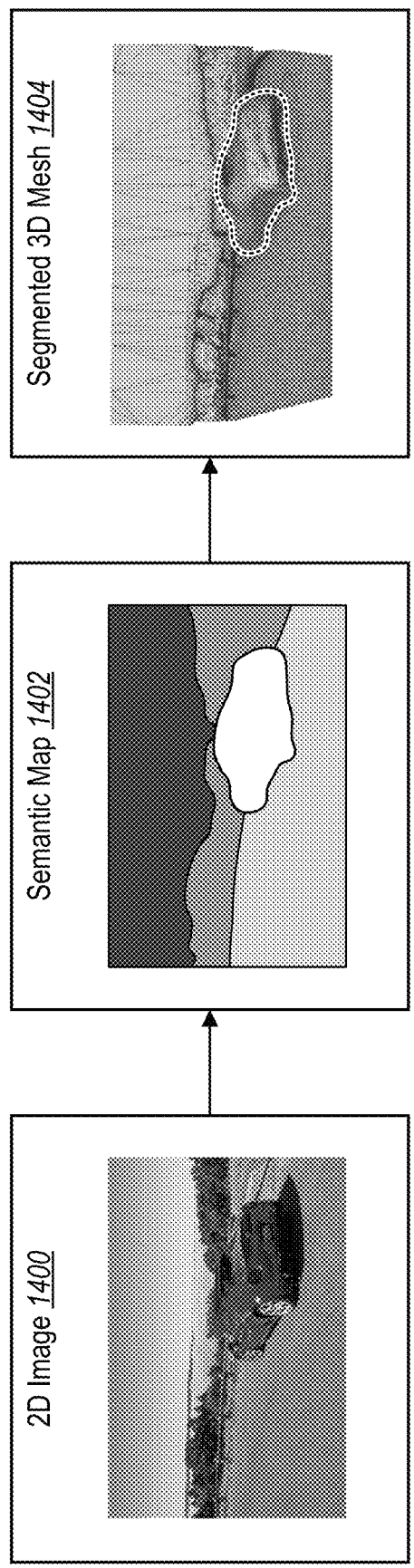
FIG. 14 illustrates a diagram of the depth displacement system segmenting a three-dimensional mesh according to a semantic map of a two-dimensional image in accordance with one or more implementations.
Figure 15:
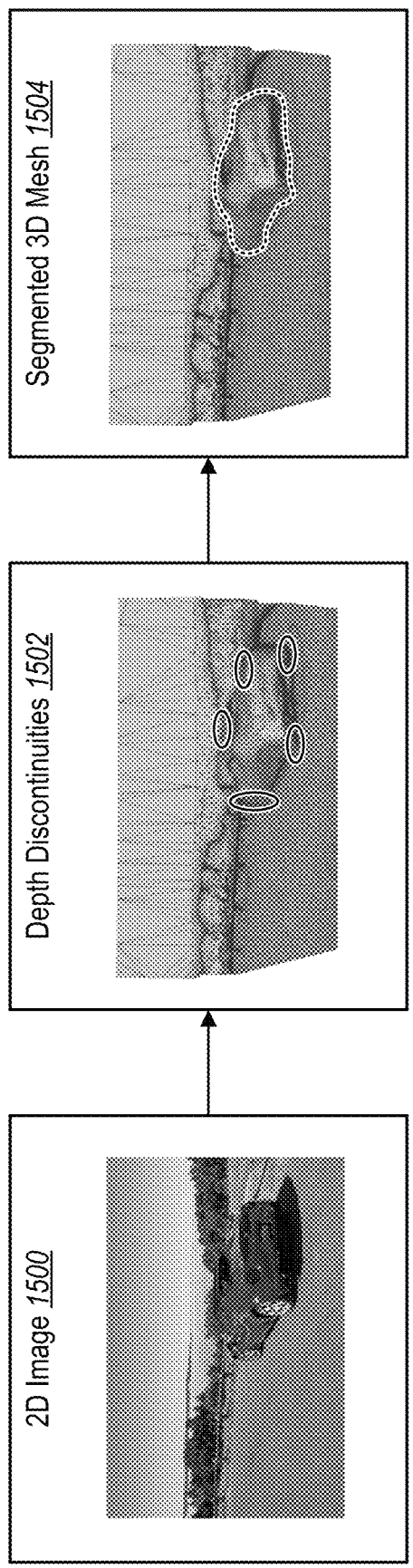
FIG. 15 illustrates a diagram of the depth displacement system segmenting a three-dimensional mesh according to depth discontinuities of a two-dimensional image in accordance with one or more implementations.

In one or more embodiments, the depth displacement system 102 generates a segmented three-dimensional mesh 1304. Specifically, the depth displacement system 102 utilizes information about the objects to segment the initial three-dimensional mesh 1302 into a plurality of separate three-dimensional object meshes corresponding to the objects. FIGS. 14-15 and the corresponding description provide additional detail with respect to segmenting a three-dimensional mesh representing a two-dimensional image. Additionally, FIGS. 16A-16B and the corresponding description provide additional detail with respect to modifying/displacing portions of a two-dimensional image based on a segmented three-dimensional mesh.

According to one or more embodiments, the depth displacement system 102 detects objects or object boundaries in a two-dimensional image for generating a three-dimensional mesh. FIG. 14 illustrates an embodiment in which the depth displacement system 102 utilizes a semantic map to segment a three-dimensional mesh. In particular, the depth displacement system 102 determines the semantic map to indicate separate objects within a two-dimensional image for generating separate three-dimensional object meshes in a corresponding three-dimensional mesh.

As illustrated in FIG. 14, the depth displacement system 102 determines a two-dimensional image 1400 including a plurality of separate objects. To illustrate, the two-dimensional image 1400 includes the image of a car parked on a road against a scenic overlook. In one or more embodiments, the depth displacement system 102 generates a semantic map 1402 based on the two-dimensional image 1400. For example, the depth displacement system 102 utilizes a semantic segmentation neural network (e.g., an object detection model, a deep learning model) to automatically label pixels of the two-dimensional image 1400 into object classifications based on the detected objects in the two-dimensional image 1400. The depth displacement system 102 can utilize a variety of models or architectures to determine object classifications and image segmentations. To illustrate, the depth displacement system 102 utilizes a segmentation neural network as described in U.S. Pat. No. 10,460,214, filed Oct. 31, 2017, titled "Deep salient content neural networks for efficient digital object segmentation," which is herein incorporated by reference in its entirety. Additionally, the depth displacement system 102 generates the semantic map 1402 including the object classifications of the pixels of the two-dimensional image 1400.

In one or more embodiments, the depth displacement system 102 utilizes the semantic map 1402 to generate a segmented three-dimensional mesh 1404. Specifically, the depth displacement system 102 utilizes the object classifications of the pixels in the two-dimensional image 1400 to determine portions of a three-dimensional mesh that correspond to the objects in the two-dimensional image 1400. For example, the depth displacement system 102 utilizes a mapping between the two-dimensional image 1400 and the three-dimensional mesh representing the two-dimensional image 1400 to determine object classifications of portions of the three-dimensional mesh. To illustrate, the depth displacement system 102 determines specific vertices of the three-dimensional mesh that correspond to a specific object detected in the two-dimensional image 1400 based on the mapping between the two-dimensional image 1400 and the two-dimensional image.

In one or more embodiments, in response to determining that different portions of a three-dimensional mesh associated with a two-dimensional image correspond to different objects, the depth displacement system 102 segments the three-dimensional mesh. In particular, the depth displacement system 102 utilizes the object classification information associated with portions of the three-dimensional mesh to separate the three-dimensional mesh into a plurality of separate three-dimensional object meshes. For instance, the depth displacement system 102 determines that a portion of the three-dimensional mesh corresponds to the car in the two-dimensional image 1400 and separates the portion of the three-dimensional mesh corresponding to the car from the rest of the three-dimensional mesh.

Accordingly, in one or more embodiments, the depth displacement system 102 segments a three-dimensional mesh into two or more separate meshes corresponding to a two-dimensional image. To illustrate, the depth displacement system 102 generates the segmented three-dimensional mesh 1404 by separating the two-dimensional image 1400 into a plurality of separate three-dimensional object meshes in the scene. For example, the depth displacement system 102 generates a three-dimensional object mesh corresponding to the car, a three-dimensional object mesh corresponding to the road, one or more three-dimensional object meshes corresponding to the one or more groups of trees, etc.

In additional embodiments, the depth displacement system 102 segments a three-dimensional mesh based on a subset of objects in a two-dimensional image. To illustrate, the depth displacement system 102 determines one or more objects in the two-dimensional image 1400 for segmenting the three-dimensional mesh. For example, the depth displacement system 102 determines one or more objects in a foreground of the two-dimensional image 1400 for generating separate three-dimensional object meshes. In some embodiments, the depth displacement system 102 determines a prominence (e.g., proportional size) of the objects for generating separate three-dimensional object meshes. In one or more embodiments, the depth displacement system 102 determines one or more objects in response to a selection of one or more objects (e.g., a manual selection of the car in the two-dimensional image 1400 via a graphical user interface displaying the two-dimensional image).

According to one or more embodiments, the depth displacement system 102 segments a three-dimensional mesh based on discontinuities of depth in a two-dimensional image and/or in the three-dimensional mesh. FIG. 15 illustrates that the depth displacement system 102 determines a two-dimensional image 1500 including a plurality of separate objects. In connection with the two-dimensional image 1500, the depth displacement system 102 generates a three-dimensional mesh representing the objects in the two-dimensional image 1500.

Furthermore, in one or more embodiments, the depth displacement system 102 determines depth discontinuities 1502 based on differences in depth in the two-dimensional image 1500 and/or the three-dimensional mesh. Specifically, the depth displacement system 102 determines one or more portions of a three-dimensional mesh that indicate sharp changes in depth. For instance, the depth displacement system 102 determines that edges of the car in the three-dimensional mesh have depth discontinuities relative to the sky, road, and/or other background elements.

In one or more embodiments, the depth displacement system 102 generates a segmented three-dimensional mesh 1504 based on the depth discontinuities 1502. In response to detecting the depth discontinuities 1502, the depth displacement system 102 determines that the depth discontinuities 1502 indicate separate objects. To illustrate, the depth displacement system 102 detects separate objects based on depth discontinuities that exceed a specific threshold. More specifically, the depth displacement system 102 generates the segmented three-dimensional mesh 1504 by separating/slicing the three-dimensional mesh at the locations with the depth discontinuities 1502 into a plurality of separate three-dimensional object meshes.

In one or more embodiments, in addition to generating separate three-dimensional object meshes for separate objects in a three-dimensional mesh that represents a two-dimensional image, the depth displacement system 102 utilizes a neural network to fill in portions of the three-dimensional mesh created by slicing the three-dimensional mesh. For example, in response to generating the segmented three-dimensional mesh 1504 by separating the portion of the three-dimensional mesh corresponding to the car from the rest of the three-dimensional mesh, the depth displacement system 102 fills in a portion of the rest of the three-dimensional mesh resulting from segmenting the three-dimensional mesh. To illustrate, the depth displacement system 102 inserts a plurality of vertices to connect the missing portions, such as by interpolating or otherwise generating surfaces in the missing portions (e.g., via content-aware filling).

In additional embodiments, the depth displacement system 102 utilizes information about object classes corresponding to segmented portions to fill connect one or more portions of a three-dimensional object mesh. For example, the depth displacement system 102 determines that a three-dimensional object mesh segmented from a three-dimensional mesh corresponds to a human or a body part of a human. The depth displacement system 102 utilizes information associated with the detected class of object (e.g., human or arm) to complete the three-dimensional object mesh for areas of the three-dimensional object mesh not visible in the two-dimensional image (e.g., by connecting a front portion of a mesh representing an arm through a backside of an arm not visible in the two-dimensional image).

Figure 16A:
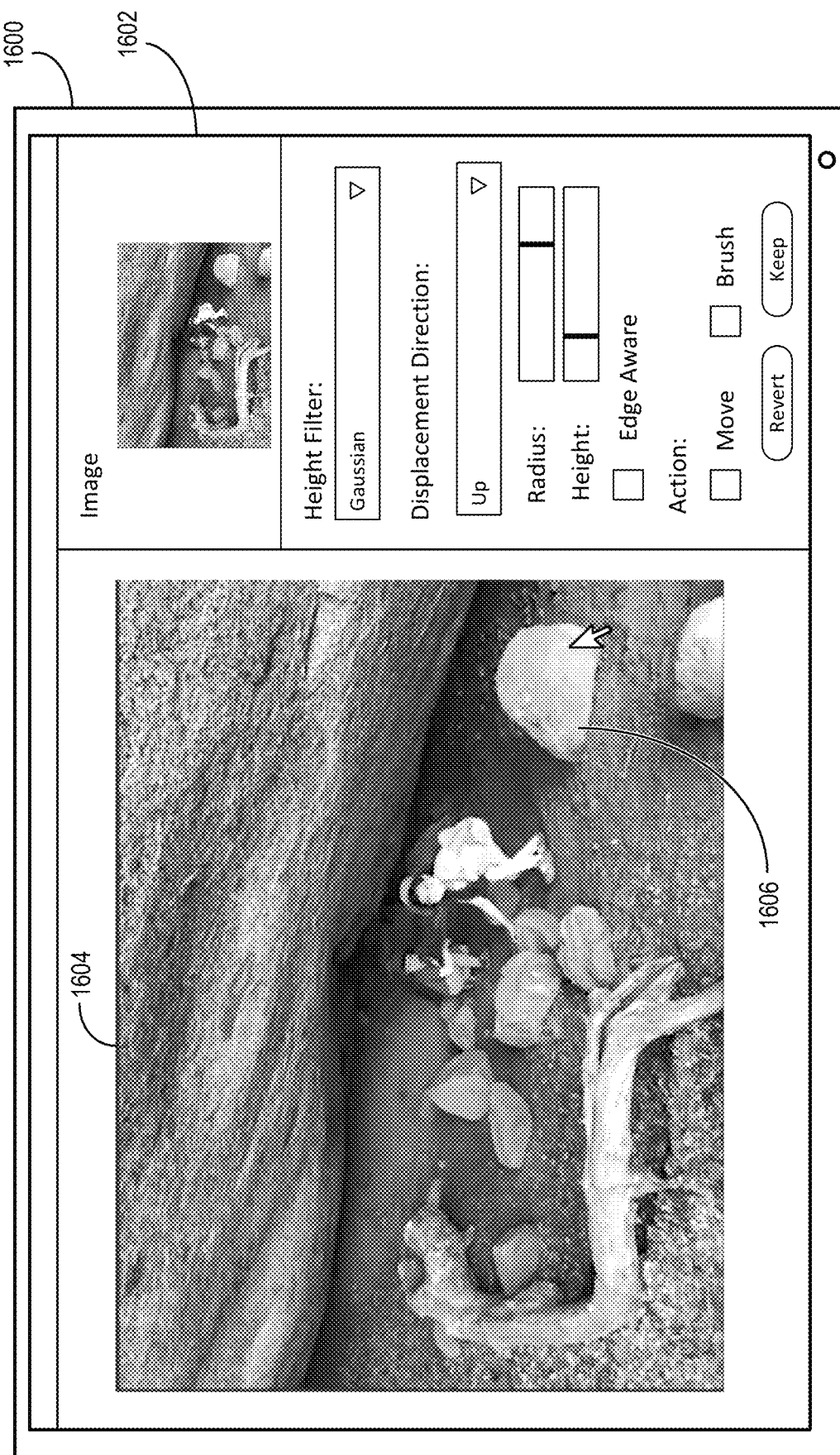
FIGS. 16A-16B illustrate graphical user interfaces for displacing specific portions of a two-dimensional image based on a segmented three-dimensional mesh in accordance with one or more implementation.
Figure 16B:
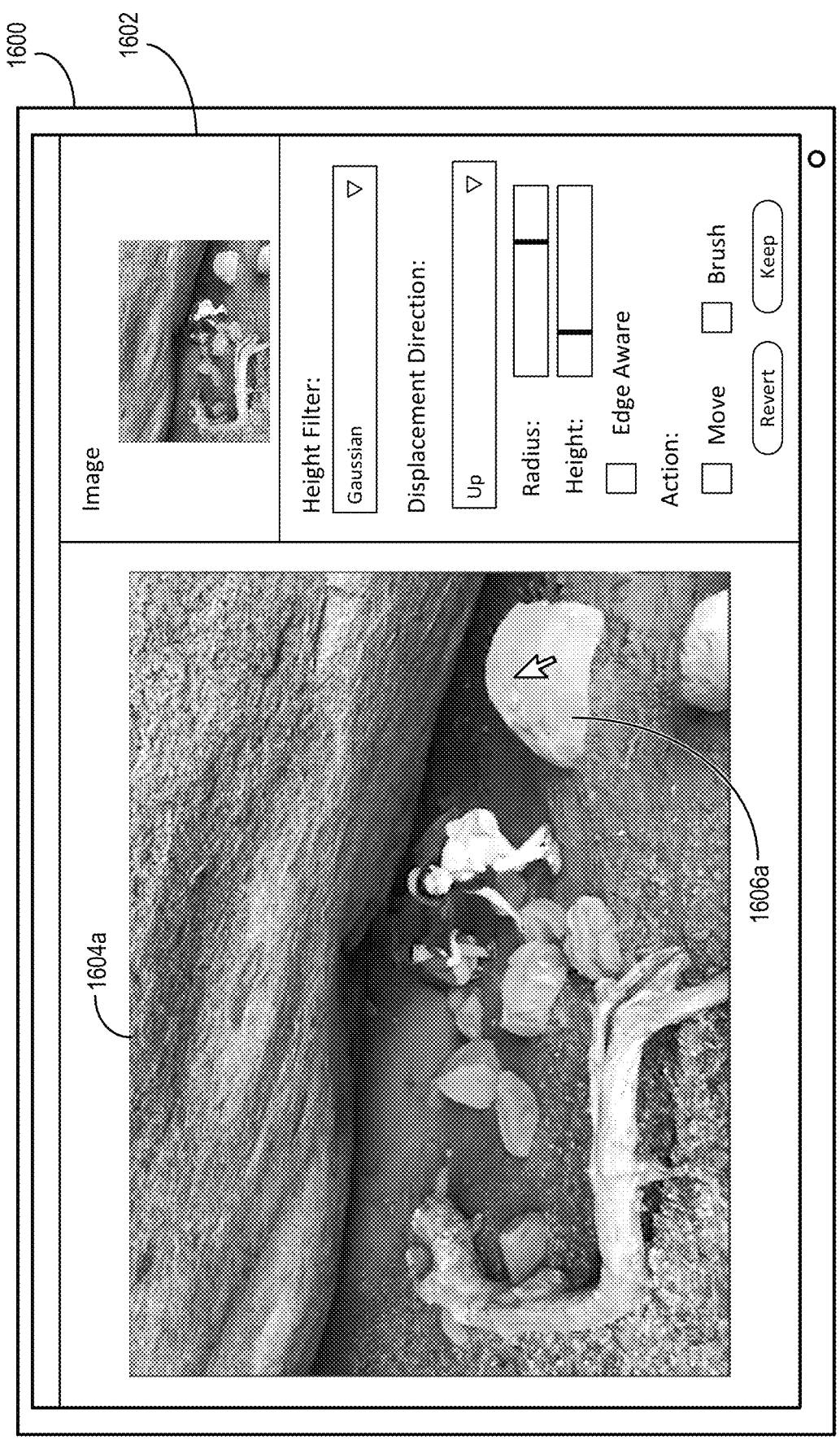

FIGS. 16A-16B illustrate a plurality of graphical user interfaces of a client device 1600 including an image editing application 1602. As illustrated in FIGS. 16A-16B, the depth displacement system 102 provides tools for modifying individual objects in a two-dimensional image 1604 according to a displacement three-dimensional mesh representing the two-dimensional image 1604. More specifically, the depth displacement system 102 automatically segments the three-dimensional mesh based on objects in the two-dimensional image 1604. Accordingly, the depth displacement system 102 provides tools for modifying individual objects by segmenting the three-dimensional mesh into a plurality of three-dimensional object meshes.

For example, FIG. 16A illustrates that the client device 1600 displays the two-dimensional image 1604 including a plurality of objects for editing via a displacement tool. In one or more embodiments, the depth displacement system 102 generates a three-dimensional mesh including one or more three-dimensional object meshes corresponding to one or more of the objects in the two-dimensional image 1604. For example, the depth displacement system 102 segments the three-dimensional mesh corresponding to the two-dimensional image 1604 by generating a separate three-dimensional object mesh for the rock 1606 in the two-dimensional image 1604. To illustrate, the depth displacement system 102 generates a three-dimensional object mesh representing the rock in three-dimensional space by separating the corresponding portion from the initial three-dimensional mesh generated for the two-dimensional image 1604.

In one or more embodiments, the client device 1600 detects a displacement input to displace the rock 1606 (or a portion of the rock 1606) without modifying the other portions of the two-dimensional image 1604. As illustrated in FIG. 16B, the depth displacement system 102 determines attributes of the displacement input (e.g., based on the position and/or other settings associated with the displacement input). In response to modifying the selected portion, the client device 1600 displays a modified two-dimensional image 1604a including a modified rock 1606a based on the displacement input. For example, the depth displacement system 102 displaces portions of the modified rock 1606a in one or more directions associated with the displacement input and/or based on vertices of the three-dimensional object mesh corresponding to the modified rock 1606a. Thus, the client device 1600 displays that the depth displacement system 102 generates the modified rock 1606a in the modified two-dimensional image 1604a according to modifications of the three-dimensional object mesh representing the rock.

Figure 17:
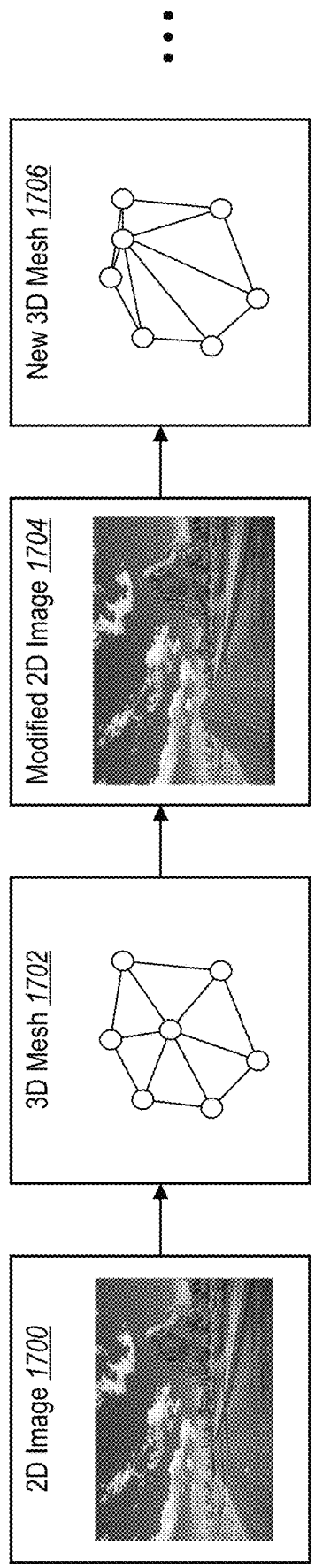
FIG. 17 illustrates a diagram of an overview of the depth displacement system utilizing an iterative tessellation process to modify a two-dimensional image in accordance with one or more implementations.

In additional embodiments, as mentioned, the depth displacement system 102 provides iterative modification and tessellation of a two-dimensional image. FIG. 17 illustrates an embodiment of the depth displacement system 102 iteratively modifying and tessellating a two-dimensional image. Specifically, the depth displacement system 102 generates a new tessellation representing a two-dimensional image in response to modifying the two-dimensional image.

In one or more embodiments, as illustrated in FIG. 17, the depth displacement system 102 determines a two-dimensional image 1700 including one or more objects for modifying via a displacement tool. For example, in response to (or otherwise in connection with) detecting a displacement input to displace a portion of the two-dimensional image 1700, the depth displacement system generates a three-dimensional mesh 1702 including depth data associated with the objects in the two-dimensional image 1700. In one or more embodiments, the depth displacement system 102 generates the three-dimensional mesh 1702 in an initial tessellation operation prior to applying any modifications to the two-dimensional image 1700.

According to one or more embodiments, in response to a displacement input to modify the two-dimensional image 1700 utilizing the three-dimensional mesh 1702, the depth displacement system 102 generates a modified two-dimensional image 1704. For example, the depth displacement system 102 determines a selected portion of the three-dimensional mesh 1702 based on a selected portion of the two-dimensional image 1700. The depth displacement system 102 also modifies the selected portion according to the attributes of the displacement input. Furthermore, the depth displacement system 102 generates the modified two-dimensional image 1704 according to the modified portion of the three-dimensional mesh 1702 given a mapping between the two-dimensional image 1700 and the three-dimensional mesh 1702.

In one or more embodiments, as illustrated in FIG. 17, the depth displacement system 102 generates a new three-dimensional mesh 1706 representing the modified two-dimensional image 1704. Specifically, the depth displacement system 102 generates the new three-dimensional mesh 1706 by performing the tessellation process again. For instance, the depth displacement system 102 determines density values of pixels of the modified two-dimensional image 1704, generates a tessellation based on the pixel density values, and generates the new three-dimensional mesh 1706 by modifying the tessellation to include displacement according to pixel depth values and estimated camera parameters for the modified two-dimensional image 1704. Accordingly, the depth displacement system 102 generates the new three-dimensional mesh 1706 to accurately represent the modified two-dimensional image 1704.

In one or more embodiments, by generating a new three-dimensional mesh in response to modifying a corresponding two-dimensional image, the depth displacement system 102 provides an updated tessellation that reduces artifacts in connection with further modifying the two-dimensional image. For example, displacement operations that introduce sharp transitions between vertices of a three-dimensional mesh result in elongated polygons. Applying further modifications to the two-dimensional image involving previously modified portions of a three-dimensional mesh (e.g., the portions including the elongated polygons) may result in artifacts and incorrect distortions of the geometry corresponding to the portions of the two-dimensional image. Thus, by iteratively updating a three-dimensional mesh representing a two-dimensional image after one or more displacement operations, the depth displacement system 102 improves the tessellations in modified regions to reduce or eliminate artifacts in future displacement operations.

Figure 18A:
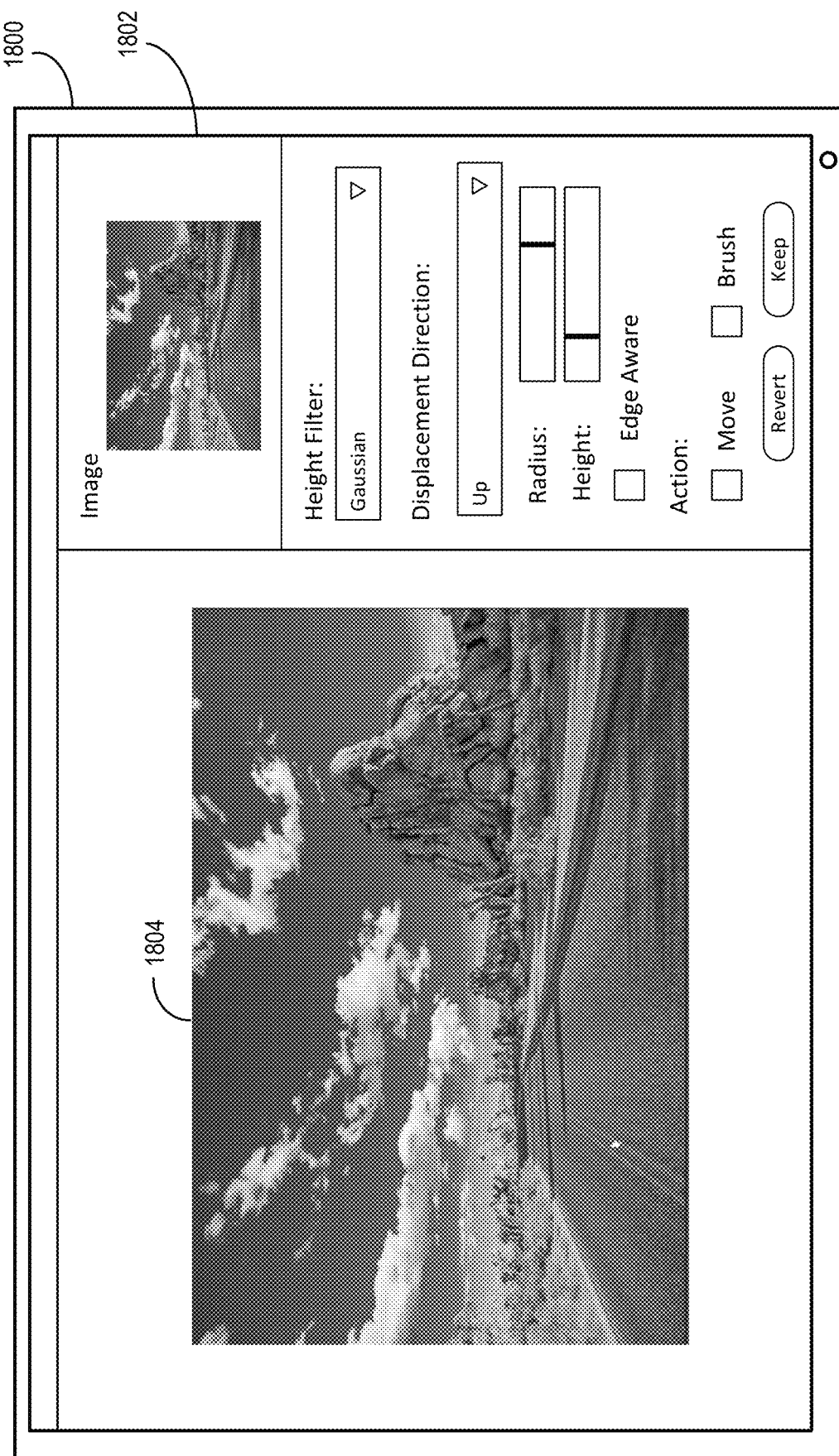
FIGS. 18A-18D illustrate graphical user interfaces for iteratively modifying a two-dimensional image utilizing iterative tessellation of the two-dimensional image in accordance with one or more implementations.

FIGS. 18A-18D illustrate a plurality of graphical user interfaces and three-dimensional meshes in connection with an iterative tessellation process based on a displacement input modifying a two-dimensional image. Specifically, FIG. 18A illustrates a graphical user interface of a client device 1800 including an image editing application 1802 for editing digital images. For example, as illustrated in FIG. 18A, the client device 1800 displays a two-dimensional image 1804 including a plurality of objects in a scene (e.g., a desert scene).

Figure 18B:
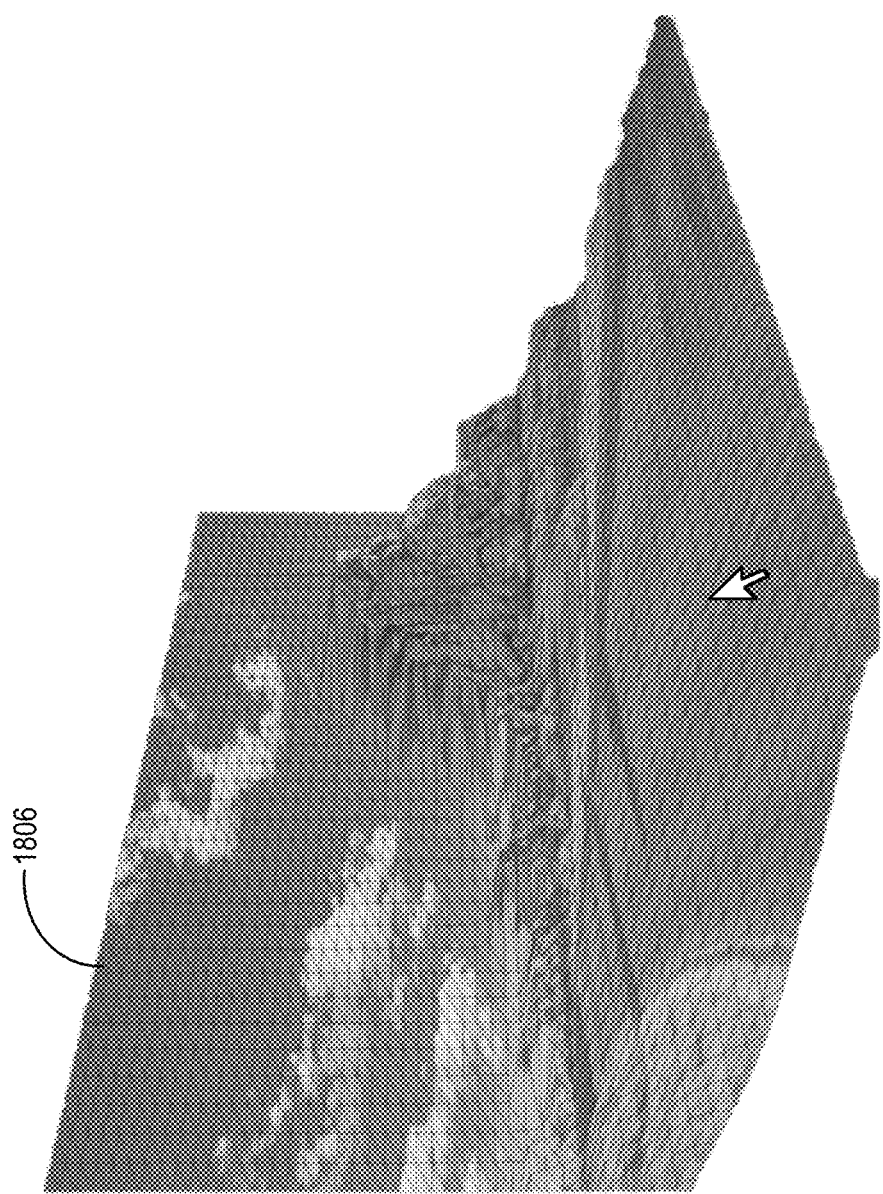

In one or more embodiments, in connection with a displacement operation to modify the two-dimensional image 1804, the depth displacement system 102 generates a three-dimensional mesh. FIG. 18B illustrates a first three-dimensional mesh 1806 that the depth displacement system 102 generates for the two-dimensional image 1804. To illustrate, the first three-dimensional mesh 1806 includes a tessellation of the objects in the two-dimensional image 1804 including displacement information of objects based for vertices in the tessellation based on the depth values according to a viewpoint associated with the two-dimensional image 1804.

Figure 18C:
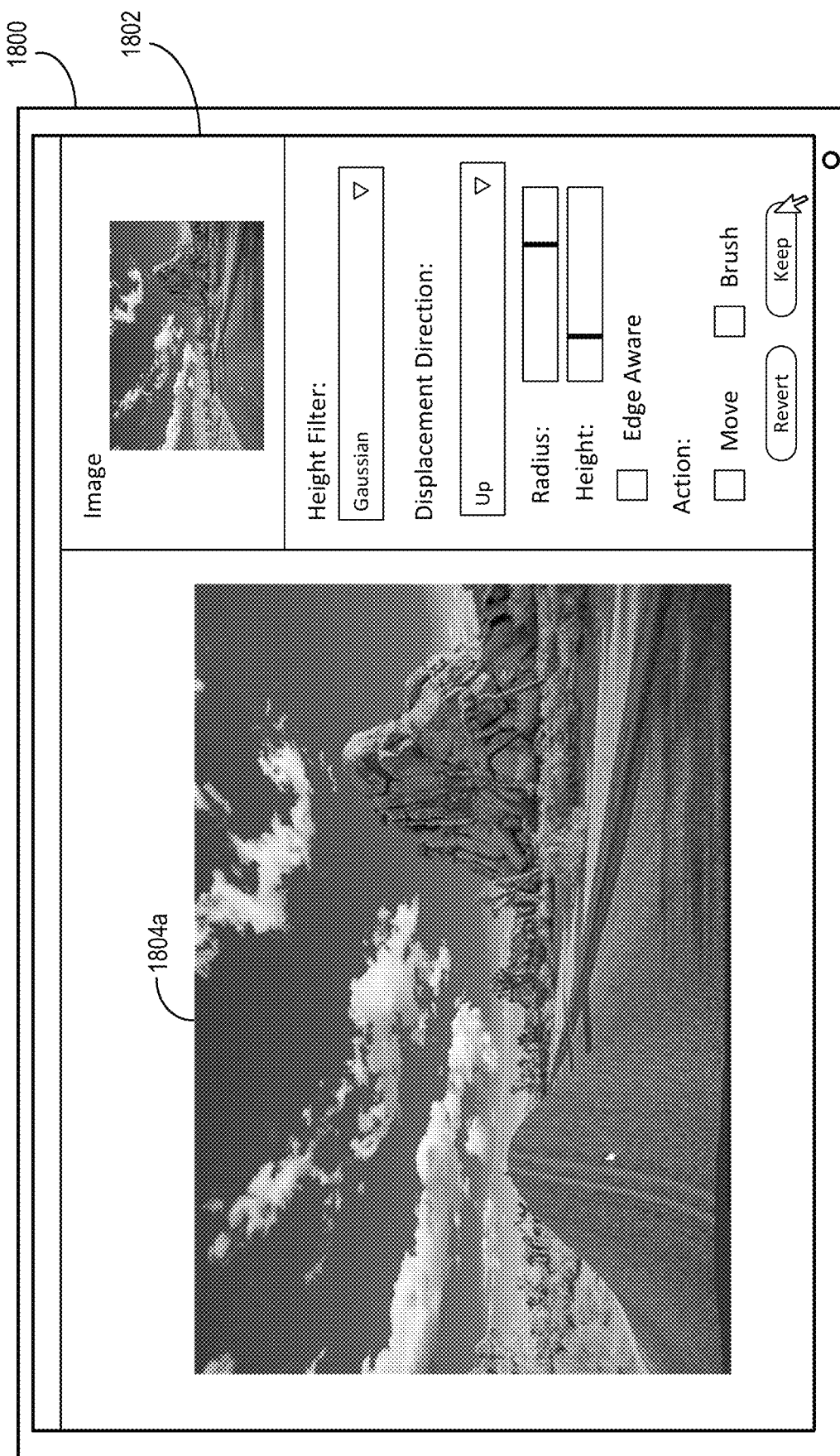

In response to a displacement input to modify a portion of the two-dimensional image 1804, the depth displacement system 102 modifies a corresponding portion of the first three-dimensional mesh 1806. For example, FIG. 18C illustrates that the client device 1800 displays a modified two-dimensional image 1804a based on a displacement input. To illustrate, the depth displacement system 102 generates a modified portion of the modified two-dimensional image 1804a based on the modified portion of the first three-dimensional mesh 1806.

Figure 18D:
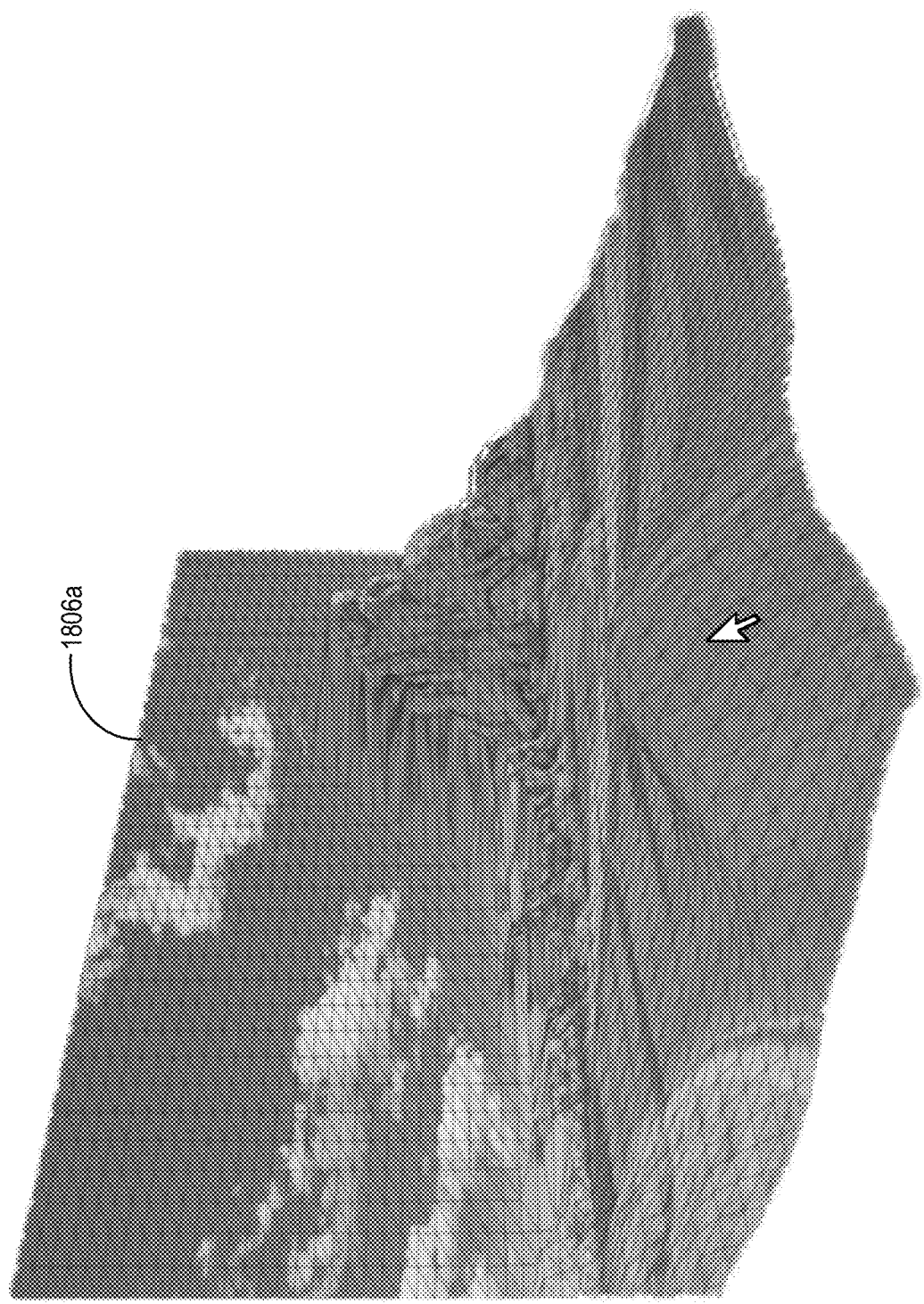

In additional embodiments, the depth displacement system 102 generates an updated tessellation based on the modified two-dimensional image 1804a. In particular, FIG. 18D illustrates a second three-dimensional mesh 1806a that the depth displacement system 102 generates for the modified two-dimensional image 1804a. For instance, the second three-dimensional mesh 1806a includes a tessellation of the objects in the modified two-dimensional image 1804a including displacement information for objects in the modified two-dimensional image 1804a based on new depth values according to the viewpoint associated with the two-dimensional image 1804 and the modified two-dimensional image 1804a.

In one or more embodiments, the depth displacement system 102 generates the second three-dimensional mesh 1806a by utilizing a new tessellation process (e.g., as described above). To illustrate, the depth displacement system 102 determines new density values for pixels of the modified two-dimensional image 1804a and samples points based on the new density values. Furthermore, the depth displacement system 102 generates a new tessellation based on the sampled points according to the new density values and modifies the new tessellation to include depth information according to the viewpoint of the modified two-dimensional image 1804a.

In one or more alternative embodiments, the depth displacement system 102 generates the second three-dimensional mesh 1806a by interpolating data based on the first three-dimensional mesh 1806. For example, the depth displacement system 102 determines one or more regions of the first three-dimensional mesh 1806 that include elongated polygons or other artifacts (e.g., texture artifacts) introduced based on the displacement to the two-dimensional image 1804. The depth displacement system 102 utilizes the new positions of vertices in the first three-dimensional mesh 1806 to insert a plurality of vertices and reduce the size of polygons in the tessellation by interpolating one or more surfaces of the first three-dimensional mesh 1806. By inserting the new vertices into the tessellation, the depth displacement system 102 generates the second three-dimensional mesh 1806a to include more accurate geometry and prevent artifacts in further modifications while also retaining information in the second three-dimensional mesh 1806a that become obscured relative to the viewpoint of the modified two-dimensional image 1804a in response to a displacement of a portion of the first three-dimensional mesh 1806.

Figure 19B:
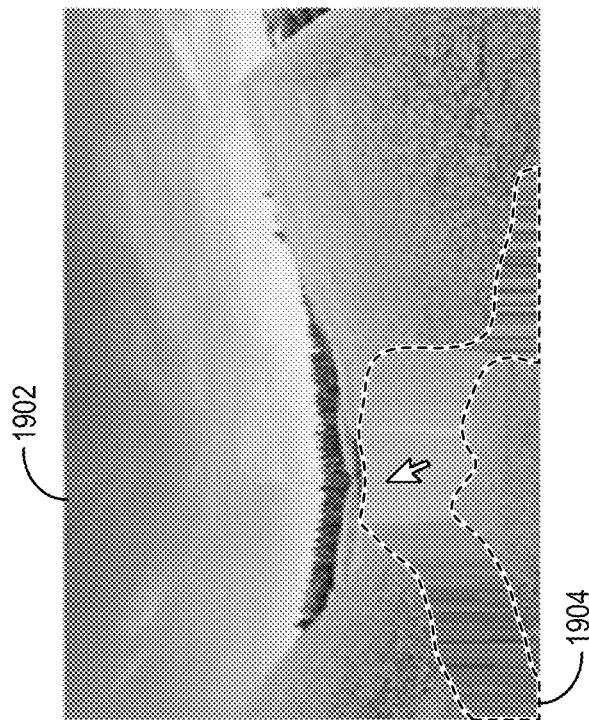
FIGS. 19A-19B illustrate images of the depth displacement system utilizing iterative tessellation and inpainting to modify a two-dimensional image in accordance with one or more implementations.
Figure 19A:
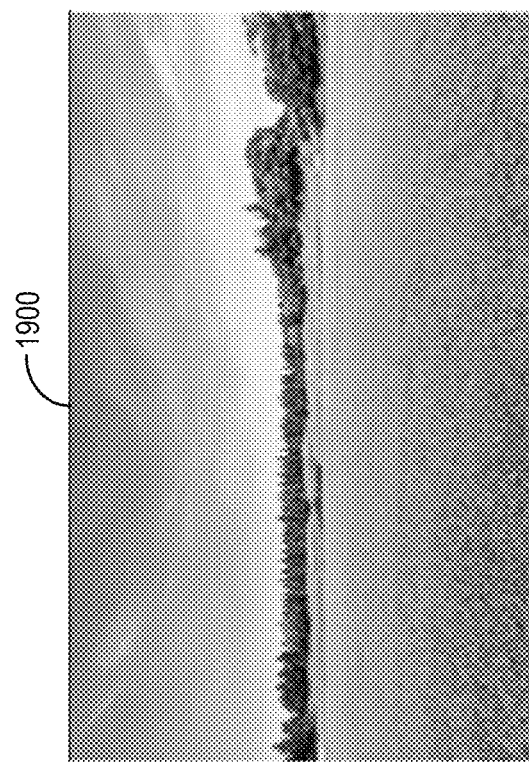

FIGS. 19A-19B illustrate images in connection with a displacement operation to modify a digital image. Specifically, FIG. 19A illustrates a two-dimensional image 1900 including a scene with a plurality of objects (e.g., a ground, trees). In one or more embodiments, the depth displacement system 102 generates a three-dimensional mesh representing the two-dimensional image 1900 for modifying the two-dimensional image 1900 via a displacement tool. FIG. 19B illustrates a modified two-dimensional image 1902 including a plurality of hills created by displacing one or more portions of the two-dimensional image 1900 including a displaced portion 1904. To illustrate, the displaced portion 1904 includes a displacement of a ground to introduce details that were not previously included in the two-dimensional image 1900.

In one or more embodiments, in response to a displacement input to generate the displaced portion 1904, the depth displacement system 102 generates a new three-dimensional mesh representing the modified two-dimensional image 1902. For example, the depth displacement system 102 generates the new three-dimensional mesh to insert additional vertices into a tessellation based on the original three-dimensional mesh including elongated polygons. In additional embodiments, the depth displacement system 102 generates the new three-dimensional mesh in response to determining that the displacement input introduced artifacts and/or additional image detail not previously in the two-dimensional image 1900 (e.g., the cliff faces).

According to one or more embodiments, the depth displacement system 102 also utilizes content-aware filling to modify texture data associated with the new three-dimensional mesh and/or the modified two-dimensional image 1902. For instance, the depth displacement system 102 utilizes an inpainting neural network to inpaint a portion of the modified two-dimensional image 1902. The depth displacement system 102 can utilize a variety of models or architectures to inpaint pixels of a digital image. For example, in one or more embodiments, the depth displacement system 102 utilizes an inpainting neural network as described in U.S. patent application Ser. No. 17/663,317, filed May 13, 2022, titled OBJECT CLASS INPAINTING IN DIGITAL IMAGES UTILIZING CLASS-SPECIFIC INPAINTING NEURAL NETWORKS or as described in U.S. patent application Ser. No. 17/815,409, filed Jul. 27, 2022, titled "GENERATING NEURAL NETWORK BASED PERCEPTUAL ARTIFACT SEGMENTATIONS INMODIFIED PORTIONS OF A DIGITAL IMAGE," which are herein incorporated by reference in their entirety.

To illustrate, the depth displacement system 102 utilizes the inpainting neural network to generate new image details for a new surface within the displaced portion 1904. Accordingly, the depth displacement system 102 inpaints cliff textures onto the cliff faces generated within the displaced portion 1904 according to the contextual information surrounding the displaced portion 1904.

In one or more embodiments, the depth displacement system 102 also provides iterative tessellation in response to modifications made to a two-dimensional image via two-dimensional editing tools. For example, after generating a three-dimensional mesh corresponding to a two-dimensional image, the depth displacement system 102 detects an additional input to modify the two-dimensional image via a two-dimensional editing tool (e.g., a two-dimensional image filter/warping tool). In response to determining that the two-dimensional image is modified via the two-dimensional editing tool, the depth displacement system 102 performs an additional mesh generation process to update the three-dimensional mesh corresponding to the modified two-dimensional image. Thus, the depth displacement system 102 provides iterative updating of two-dimensional images and corresponding three-dimensional meshes based on modifications made in three-dimensional space and/or in two-dimensional space.

Figure 20:
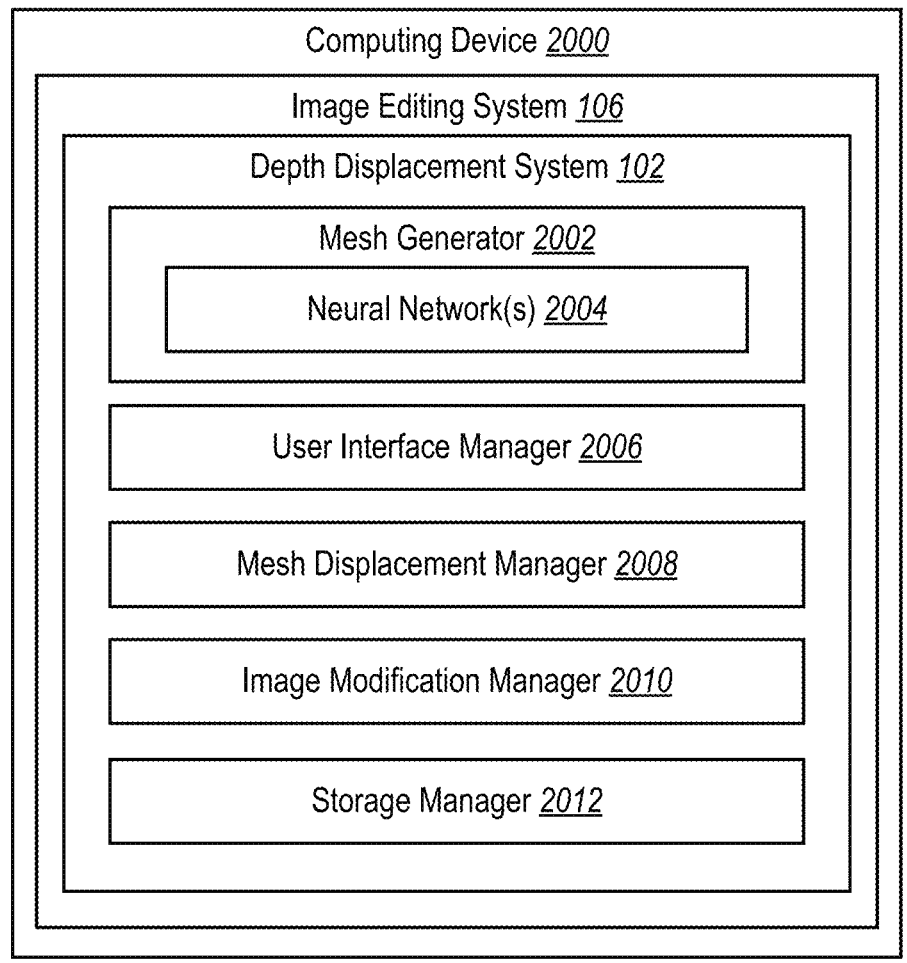
FIG. 20 illustrates a diagram of the depth displacement system of FIG. 1 in accordance with one or more implementations.

FIG. 20 illustrates a detailed schematic diagram of an embodiment of the depth displacement system 102 described above. As shown, the depth displacement system 102 is implemented in an image editing system 110 on computing device(s) 2000 (e.g., a client device and/or server device as described in FIG. 1, and as further described below in relation to FIG. 25). Additionally, the depth displacement system 102 includes, but is not limited to, a mesh generator 2002 (which includes neural network(s) 2004), a user interface manager 2006, a mesh displacement manager 2008, an image modification manager 2010, and a storage manager 2012. The depth displacement system 102 can be implemented on any number of computing devices. For example, the depth displacement system 102 can be implemented in a distributed system of server devices for digital images. The depth displacement system 102 can also be implemented within one or more additional systems. Alternatively, the depth displacement system 102 can be implemented on a single computing device such as a single client device.

In one or more embodiments, each of the components of the depth displacement system 102 is in communication with other components using any suitable communication technologies. Additionally, the components of the depth displacement system 102 are capable of being in communication with one or more other devices including other computing devices of a user, server devices (e.g., cloud storage devices), licensing servers, or other devices/systems. It will be recognized that although the components of the depth displacement system 102 are shown to be separate in FIG. 20, any of the subcomponents may be combined into fewer components, such as into a single component, or divided into more components as may serve a particular implementation. Furthermore, although the components of FIG. 20 are described in connection with the depth displacement system 102, at least some of the components for performing operations in conjunction with the depth displacement system 102 described herein may be implemented on other devices within the environment.

In some embodiments, the components of the depth displacement system 102 include software, hardware, or both. For example, the components of the depth displacement system 102 include one or more instructions stored on a computer-readable storage medium and executable by processors of one or more computing devices (e.g., the computing device(s) 2000). When executed by the one or more processors, the computer-executable instructions of the depth displacement system 102 cause the computing device(s) 2000 to perform the operations described herein. Alternatively, the components of the depth displacement system 102 include hardware, such as a special purpose processing device to perform a certain function or group of functions. Additionally, or alternatively, the components of the depth displacement system 102 include a combination of computer-executable instructions and hardware.

Furthermore, the components of the depth displacement system 102 performing the functions described herein with respect to the depth displacement system 102 may, for example, be implemented as part of a stand-alone application, as a module of an application, as a plug-in for applications, as a library function or functions that may be called by other applications, and/or as a cloud-computing model. Thus, the components of the depth displacement system 102 may be implemented as part of a stand-alone application on a personal computing device or a mobile device. Alternatively, or additionally, the components of the depth displacement system 102 may be implemented in any application that provides digital image modification.

As illustrated in FIG. 20, the depth displacement system 102 includes the mesh generator 2002 to generate three-dimensional meshes from two-dimensional images. For example, the mesh generator 2002 utilizes the neural network(s) 2004 to estimate depth values for pixels of a two-dimensional image and one or more filters to determine a density map based on the estimated depth values. Additionally, the mesh generator 2002 samples points based on the density map and generates a tessellation based on the sampled points. The mesh generator 2002 further generates (e.g., utilizing the neural network(s) 2004) a displacement three-dimensional mesh by modifying positions of vertices in the tessellation to incorporate depth and displacement information into a three-dimensional mesh representing the two-dimensional image.

The depth displacement system 102 also includes the user interface manager 2006 to manage user interactions in connection with modifying two-dimensional images via a displacement tool. For example, the user interface manager 2006 detects positions of displacement inputs relative to a two-dimensional image and translates the positions into a three-dimensional space associated with a corresponding three-dimensional mesh. The user interface manager 2006 also converts changes made to a three-dimensional mesh back to a corresponding two-dimensional image for display within a graphical user interface.

According to one or more embodiments, the depth displacement system 102 includes the mesh displacement manager 2008 to modify a three-dimensional mesh based on a displacement input in connection with a displacement tool. Specifically, the mesh displacement manager 2008 determines a displacement of a selected portion of a three-dimensional mesh corresponding to a displacement input. To illustrate, the mesh displacement manager 2008 utilizes settings associated with the displacement input to determine which vertices to displace and how to displace the vertices.

The depth displacement system 102 also includes the image modification manager 2010 to modify two-dimensional images. For instance, the image modification manager 2010 generates an updated two-dimensional image in response to detecting modifications to a corresponding three-dimensional mesh. To illustrate, the image modification manager 2010 utilizes a mapping between the two-dimensional image and the three-dimensional mesh to re-render the two-dimensional image (e.g., based on a texture mapping between the two-dimensional image and the three-dimensional mesh) according to one or more displaced portions of the three-dimensional mesh.

The depth displacement system 102 also includes a storage manager 2012 (that comprises a non-transitory computer memory/one or more memory devices) that stores and maintains data associated with modifying two-dimensional images utilizing three-dimensional meshes. For example, the storage manager 2012 stores data associated with neural networks that generate three-dimensional meshes based on depth information associated with corresponding two-dimensional images for modifying the two-dimensional images. To illustrate, the storage manager 2012 stores two-dimensional images, three-dimensional meshes, and mappings between two-dimensional images and three-dimensional meshes.

Figure 21:
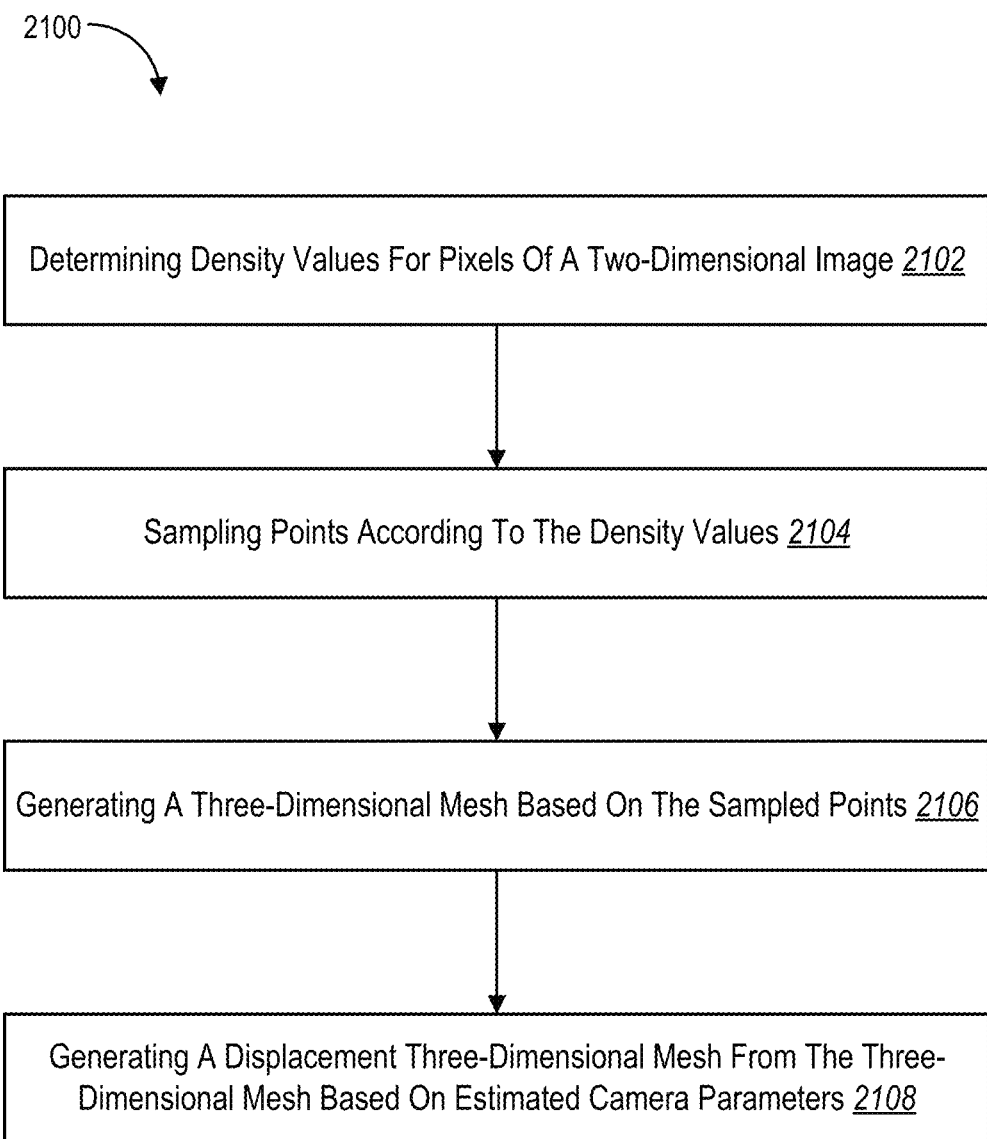
FIG. 21 illustrates a flowchart of a series of acts for generating an adaptive displacement three-dimensional mesh for a two-dimensional image in accordance with one or more implementations.

Turning now to FIG. 21, this figure shows a flowchart of a series of acts 2100 of generating an adaptive displacement three-dimensional mesh for a two-dimensional image. While FIG. 21 illustrates acts according to one embodiment, alternative embodiments may omit, add to, reorder, and/or modify any of the acts shown in FIG. 21. The acts of FIG. 21 are part of a method. Alternatively, a non-transitory computer readable medium comprises instructions, that when executed by one or more processors, cause the one or more processors to perform the acts of FIG. 21. In still further embodiments, a system includes a processor or server configured to perform the acts of FIG. 21.

As shown, the series of acts 2100 includes an act 2102 of determining density values for pixels of a two-dimensional image. For example, act 2102 involves determining density values corresponding to pixels of a two-dimensional image based on disparity estimation values, wherein the disparity estimation values are generated utilizing a first neural network. Additionally, in one or more embodiments, act 2102 involves determining density values corresponding to pixels of a two-dimensional image based on disparity estimation values generated utilizing a first neural network according to relative positions of objects in the two-dimensional image.

In one or more embodiments, act 2102 involves determining, utilizing a plurality of image filters, a second order derivative change in depth of the pixels of the two-dimensional image based on the disparity estimation values. For example, act 2102 involves determining absolute values of a matrix corresponding to the disparity estimation values of the two-dimensional image. Additionally, act 2102 involves determining the density values corresponding to the pixels of the two-dimensional image based on the absolute values of the matrix.

In one or more embodiments, act 2102 involves determining, utilizing a convolution operation, smoothed values from the absolute values of the matrix. Act 2102 also involves generating a density map by truncating the smoothed values according to a set of processing parameters.

Act 2102 can involve generating, utilizing the first neural network, the disparity estimation values indicating estimated values inversely related to distances between corresponding points in a scene of the two-dimensional image and a viewpoint of the two-dimensional image. In one or more embodiments, act 2102 involves generating, utilizing the first neural network, the disparity estimation values indicating estimated values inversely related to distances between corresponding points in a scene of the two-dimensional image and a viewpoint of the two-dimensional image. Additionally, act 2102 involves determining, utilizing one or more image filters, a second order derivative change in depth of the pixels of the two-dimensional image based on the disparity estimation values.

Furthermore, act 2102 involves determining the density values corresponding to the pixels of the two-dimensional image based on absolute values of a matrix corresponding to the disparity estimation values of the two-dimensional image. Act 2102 also involves generating a density map comprising the density values corresponding to the pixels of the two-dimensional image by smoothing and truncating the absolute values of the matrix according to a set of processing parameters.

In one or more embodiments, act 2102 involves determining a matrix representing a second-order derivative of depth values of the two-dimensional image, determining absolute values of diagonals of the matrix, generating, utilizing a convolution operation, smoothed values based on the absolute values, and truncating the smoothed values according to a predetermined threshold.

The series of acts 2100 also includes an act 2104 of sampling points according to the density values. For example, act 2104 involves sampling a plurality of points in the two-dimensional image according to the density values corresponding to the pixels of the two-dimensional image. In one or more embodiments, act 2104 involves sampling a plurality of points in the two-dimensional image according to a probability distribution indicated by the density values corresponding to the pixels of the two-dimensional image. In one or more embodiments, act 2104 involves selecting points from the two-dimensional image utilizing the density values as a probability distribution. Act 2104 can involve selecting the plurality of points utilizing the density values as the probability distribution across the two-dimensional image.

Additionally, the series of acts 2100 includes an act 2106 of generating a three-dimensional mesh based on the sampled points. For example, act 2106 involves generating a three-dimensional mesh based on the plurality of points sampled in the two-dimensional image. To illustrate, act 2106 involves generating an initial tessellation based on the plurality of points sampled in the two-dimensional image. Act 2106 can involve generating a tessellation representing content of the two-dimensional image based on the plurality of points. In one or more embodiments, act 2106 involves generating a tessellation representing content of the two-dimensional image by utilizing a relaxation model in connection with sampling points from the two-dimensional image. For example, act 2106 involves sampling the plurality of points in a plurality of iterations according to a relaxation algorithm that iteratively moves sampled points towards centers of tessellation cells based on the density values. Act 2106 can also involve generating, utilizing Delaunay triangulation, a tessellation according to the sampled points.

The series of acts 2100 further includes an act 2108 of generating a displacement three-dimensional mesh from the three-dimensional mesh based on estimated camera parameters. For example, act 2108 involves generating, utilizing a second neural network, a displacement three-dimensional mesh from the three-dimensional mesh based on estimated camera parameters of the two-dimensional image. To illustrate, act 2108 involves generating, utilizing a second neural network, a displacement three-dimensional mesh comprising an updated tessellation according to estimated camera parameters of the two-dimensional image.

In one or more embodiments, act 2108 involves determining, based on one or more inputs via one or more user-interface elements, one or more processing parameters comprising a sampling budget or a tessellation budget in connection with generating the displacement three-dimensional mesh. Act 2108 also involves generating the three-dimensional mesh based on the plurality of points sampled in the two-dimensional image according to the one or more processing parameters.

In one or more embodiments, act 2108 involves determining, utilizing the second neural network, the estimated camera parameters corresponding to a viewpoint of the two-dimensional image. Additionally, act 2108 involves determining displacement of vertices in the three-dimensional mesh based on the estimated camera parameters and pixel depth values of the two-dimensional image. Act 2108 also involves generating the updated tessellation by modifying positions of the vertices of the three-dimensional mesh according to the determined displacement of the vertices in the three-dimensional mesh. For example, act 2108 involves modifying positions of the vertices of the three-dimensional mesh to include depth displacement according to the estimated camera parameters of the three-dimensional mesh.

In one or more embodiments, the series of acts 2100 includes modifying the displacement three-dimensional mesh in response to a request to modify the two-dimensional image. Additionally, the series of acts 2100 includes generating a modified two-dimensional image in response to modifying the displacement three-dimensional mesh.

Figure 22:
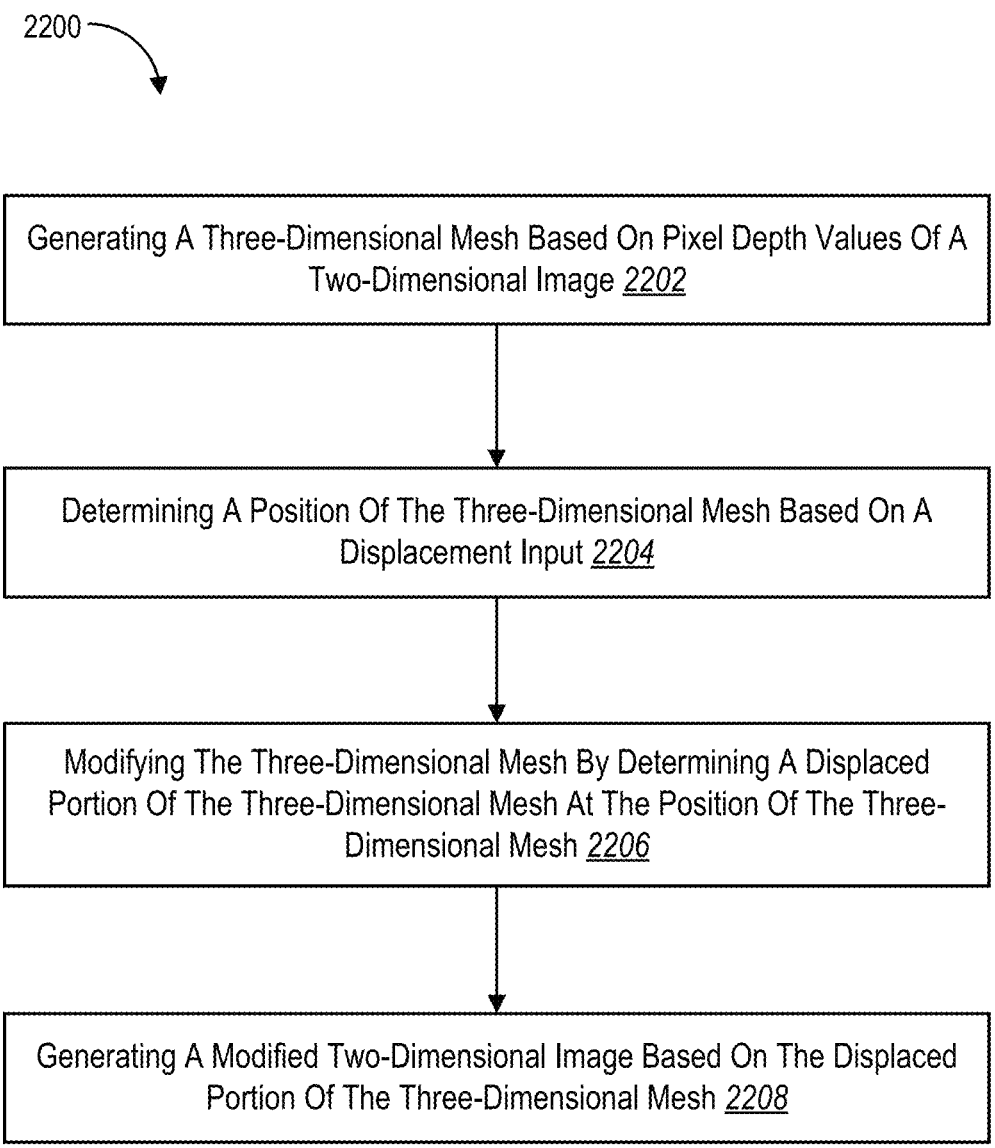
FIG. 22 illustrates a flowchart of a series of acts for modifying a two-dimensional image utilizing a displacement three-dimensional mesh in accordance with one or more implementations.

Turning now to FIG. 22, this figure shows a flowchart of a series of acts 2200 of modifying a two-dimensional image utilizing a displacement three-dimensional mesh. While FIG. 22 illustrates acts according to one embodiment, alternative embodiments may omit, add to, reorder, and/or modify any of the acts shown in FIG. 22. The acts of FIG. 22 are part of a method. Alternatively, a non-transitory computer readable medium comprises instructions, that when executed by one or more processors, cause the one or more processors to perform the acts of FIG. 22. In still further embodiments, a system includes a processor or server configured to perform the acts of FIG. 22.

As shown, the series of acts 2200 includes an act 2202 of generating a three-dimensional mesh based on pixel depth values of a two-dimensional image. For example, act 2202 involves generating, utilizing one or more neural networks, a three-dimensional mesh based on pixel depth values corresponding to objects of a two-dimensional image.

In one or more embodiments, act 2202 involves generating the three-dimensional mesh by determining displacement of vertices of a tessellation of the two-dimensional image based on the pixel depth values and estimated camera parameters. Alternatively, act 2202 involves generating the three-dimensional mesh based on a plurality of points sampled in the two-dimensional image according to density values determined from the pixel depth values of the two-dimensional image.

The series of acts 2200 also includes an act 2204 of determining a position of the three-dimensional mesh based on a displacement input. For example, act 2204 involves determining a position of the three-dimensional mesh based on a corresponding position of a displacement input within the two-dimensional image.

In one or more embodiments, act 2204 involves determining the corresponding position of the displacement input comprising a coordinate within the two-dimensional image. Act 2204 also involves determining the position of the three-dimensional mesh based on the coordinate within the two-dimensional image and a projection from the two-dimensional image onto the three-dimensional mesh.

In one or more embodiments, act 2204 involves determining a projection from the two-dimensional image onto the three-dimensional mesh. Act 2204 also involves determining, according to the projection from the two-dimensional image onto the three-dimensional mesh, a three-dimensional position of the three-dimensional mesh corresponding to the displacement input based on a position of the two-dimensional position of the two-dimensional image corresponding to the displacement input.

Additionally, the series of acts 2200 includes an act 2206 of modifying the three-dimensional mesh by determining a displaced portion of the three-dimensional mesh at the position of the three-dimensional mesh. For example, act 2206 involves modifying, in response to the displacement input, the three-dimensional mesh by determining a displaced portion of the three-dimensional mesh at the position of the three-dimensional mesh.

Act 2206 involves determining a two-dimensional position of the displacement input within the two-dimensional image. Act 2206 also involves determining a three-dimensional position of the displacement input on the three-dimensional mesh based on the two-dimensional position of the displacement input within the two-dimensional image.

Act 2206 involves determining, based on an attribute of the displacement input, that the displacement input indicates a displacement direction for a portion of the three-dimensional mesh. For instance, act 2206 involves determining a displacement direction based on a selected portion of the three-dimensional mesh. Act 2206 further involves displacing the portion of the three-dimensional mesh in the displacement direction.

In one or more embodiments, act 2206 involves determining, based on an additional attribute of the displacement input, that the displacement input indicates an additional displacement direction of the portion of the three-dimensional mesh. Act 2206 also involves displacing the portion of the three-dimensional mesh according to the additional displacement direction.

Furthermore, act 2206 involves selecting, in response to an additional input in connection with the displacement input, a new portion of the three-dimensional mesh to displace. Act 2206 also involves displacing the new portion of the three-dimensional mesh according to the displacement input in the displacement direction. Additionally, in one or more embodiments, act 2206 involves displacing, based on movement of the displacement input, one or more additional portions of the three-dimensional mesh from the portion of the three-dimensional mesh to the new portion of the three-dimensional mesh in the displacement direction.

In one or more embodiments, act 2206 involves determining a displacement filter indicating a shape associated with the displacement input. Act 2206 also involves displacing a portion of the three-dimensional mesh according to the shape of the displacement input in a direction of the displacement input.

Act 2206 can involve determining that the displacement input indicates a displacement of a portion of the three-dimensional mesh according to the position of the three-dimensional mesh. Act 2206 can also involve determining the displaced portion of the three-dimensional mesh in response to the displacement input.

In one or more embodiments, act 2206 involves determining a direction of movement of the displacement input within a graphical user interface displaying the two-dimensional image. Act 2206 also involves determining a displacement height and a displacement radius based on the direction of movement of the displacement. Act 2206 further involves determining the displaced portion of the three-dimensional mesh based on the displacement height and the displacement radius.

In one or more embodiments, act 2206 involves determining, based on the projection from the two-dimensional image onto the three-dimensional mesh, movement of the displacement input relative to the two-dimensional image and a corresponding movement of the displacement input relative to the three-dimensional mesh. Act 2206 also involves determining the displaced portion of the three-dimensional mesh based on the corresponding movement of the displacement input relative to the three-dimensional mesh.

In one or more embodiments, act 2206 involves determining one or more normal values corresponding to one or more vertices or one or more faces at the position of the three-dimensional mesh. Act 2206 also involves determining, in response to the displacement input, the displaced portion of the three-dimensional mesh in one or more directions corresponding to the one or more normal values corresponding to the one or more vertices or the one or more faces.

The series of acts 2200 further includes an act 2208 of generating a modified two-dimensional image based on the displaced portion of the three-dimensional mesh. For example, act 2208 involves generating a modified two-dimensional image comprising at least one modified portion according to the displaced portion of the three-dimensional mesh.

In one or more embodiments, act 2208 involves determining a two-dimensional position of the two-dimensional image corresponding to a three-dimensional position of the displaced portion of the three-dimensional mesh based on a mapping between the three-dimensional mesh and the two-dimensional image. Act 2208 also involves generating the modified two-dimensional image comprising the at least one modified portion at the two-dimensional position based on the three-dimensional position of the displaced portion of the three-dimensional mesh.

In one or more embodiments, act 2208 involves providing a preview two-dimensional image comprising the at least one modified portion according to the displaced portion of the three-dimensional mesh in response to the displacement input. Act 2208 also involves generating the modified two-dimensional image comprising the at least one modified portion in response to detecting an action to commit the displaced portion of the three-dimensional mesh.

In one or more embodiments, act 2208 involves determining, based on the projection from the two-dimensional image onto the three-dimensional mesh, a two-dimensional position of the two-dimensional image corresponding to the displaced portion of the three-dimensional mesh. Act 2208 can also involve generating, based on the two-dimensional position of the two-dimensional image, the modified two-dimensional image comprising the at least one modified portion according to the displaced portion of the three-dimensional mesh.

Figure 23:
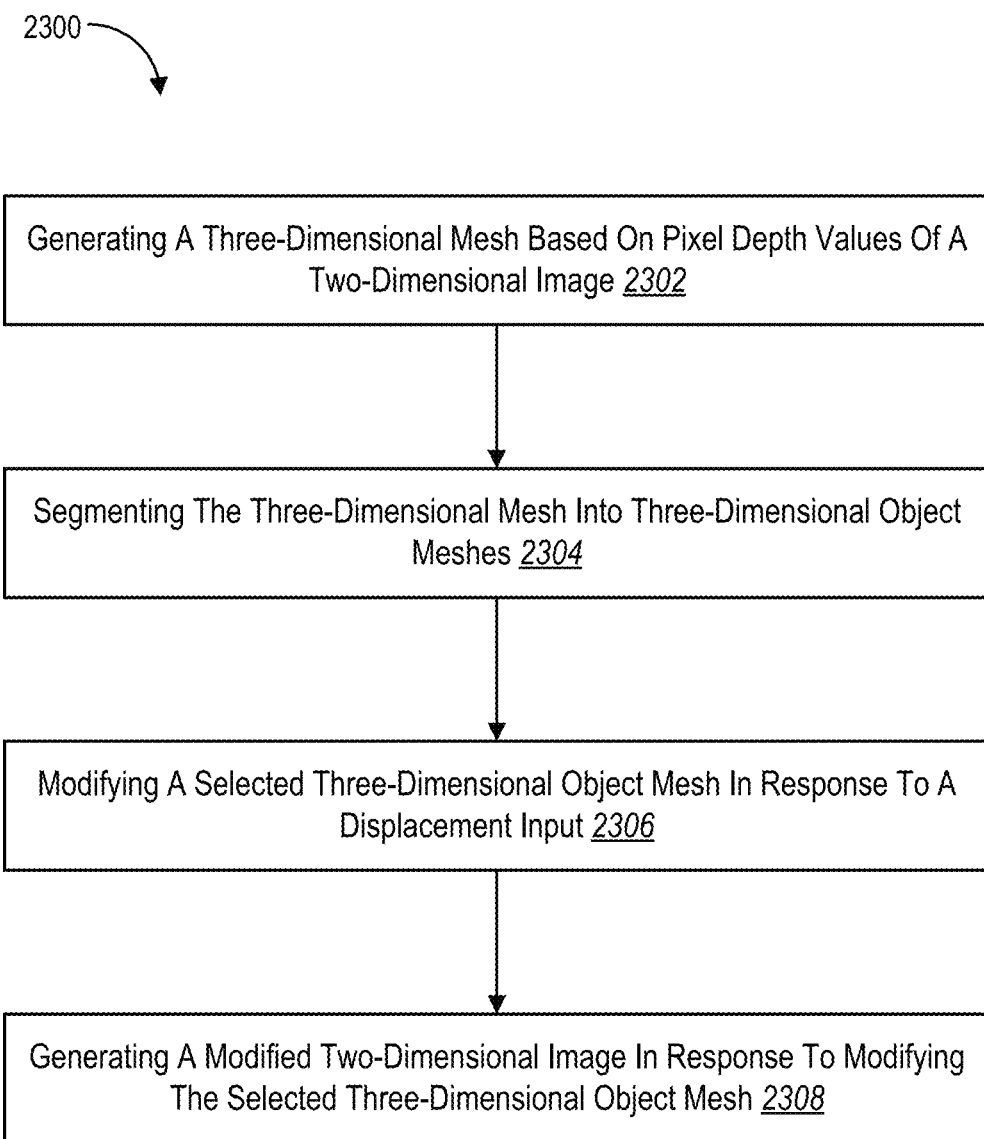
FIG. 23 illustrates a flowchart of a series of acts for modifying a two-dimensional image utilizing segmented three-dimensional object meshes in accordance with one or more implementations.

Turning now to FIG. 23, this figure shows a flowchart of a series of acts 2300 of modifying a two-dimensional image utilizing segmented three-dimensional object meshes. While FIG. 23 illustrates acts according to one embodiment, alternative embodiments may omit, add to, reorder, and/or modify any of the acts shown in FIG. 23. The acts of FIG. 23 are part of a method. Alternatively, a non-transitory computer readable medium comprises instructions, that when executed by one or more processors, cause the one or more processors to perform the acts of FIG. 23. In still further embodiments, a system includes a processor or server configured to perform the acts of FIG. 23.

As shown, the series of acts 2300 includes an act 2302 of generating a three-dimensional mesh based on pixel depth values of a two-dimensional image. For example, act 2302 involves generating, utilizing one or more neural networks, a three-dimensional mesh based on pixel depth values of a two-dimensional image.

In one or more embodiments, act 2302 involves generating the three-dimensional mesh by determining displacement of vertices of a tessellation of the two-dimensional image based on the pixel depth values and estimated camera parameters. Alternatively, act 2302 involves generating the three-dimensional mesh based on a plurality of points sampled in the two-dimensional image according to density values determined from the pixel depth values of the two-dimensional image.

The series of acts 2300 further includes an act 2304 of segmenting the three-dimensional mesh into three-dimensional object meshes. For example, act 2304 involves segmenting, utilizing the one or more neural networks, the three-dimensional mesh into a plurality of three-dimensional object meshes corresponding to objects of the two-dimensional image.

In one or more embodiments, act 2304 involves detecting, utilizing one or more object detection models, a plurality of objects of the two-dimensional image. Act 2304 can further involve segmenting, in response to detecting the plurality of objects, the three-dimensional mesh into a plurality of three-dimensional object meshes corresponding to the plurality of objects of the two-dimensional image.

For example, act 2304 involves detecting one or more objects in the two-dimensional image or in the three-dimensional mesh. Act 2304 also involves separating a first portion of the three-dimensional mesh from a second portion of the three-dimensional mesh based on the one or more objects detected in the two-dimensional image or in the three-dimensional mesh.

Act 2304 can involve generating, utilizing the one or more object detection models, a semantic map comprising labels indicating object classifications of pixels in the two-dimensional image. Act 2304 can also involve detecting the plurality of objects of the two-dimensional image based on the labels of the semantic map.

In one or more embodiments, act 2304 involves determining, based on the pixel depth values of the two-dimensional image, a portion of the two-dimensional image comprising a depth discontinuity between adjacent regions of the two-dimensional image. Act 2304 involves determining that a first region of the adjacent regions corresponds to a first object and a second region of the adjacent regions corresponds to a second object.

In one or more embodiments, act 2304 involves determining a semantic map comprising labels indicating object classifications of pixels in the two-dimensional image. Act 2304 also involves detecting the one or more objects in the two-dimensional image based on the labels of the semantic map.

In one or more embodiments, act 2304 involves determining a depth discontinuity at a portion of the three-dimensional mesh based on corresponding pixel depth values of the two-dimensional image. Act 2304 involves detecting the one or more objects in the three-dimensional mesh based on the depth discontinuity at the portion of the three-dimensional mesh.

According to one or more embodiments, act 2304 involves detecting the objects of the two-dimensional image according to: a semantic map corresponding to the two-dimensional image; or depth discontinuities based on the pixel depth values of the two-dimensional image. Act 2304 also involves separating the three-dimensional mesh into the plurality of three-dimensional object meshes in response to detecting the objects of the two-dimensional image.

The series of acts 2300 also includes an act 2306 of modifying a selected three-dimensional object mesh in response to a displacement input. For example, act 2306 involves modifying, in response to a displacement input within a graphical user interface displaying the two-dimensional image, a selected three-dimensional object mesh of the plurality of three-dimensional object meshes based on a displaced portion of the selected three-dimensional object mesh.

Act 2306 can involve determining a projection from the two-dimensional image onto the plurality of three-dimensional object meshes in a three-dimensional environment. Act 2306 also involves determining the selected three-dimensional object mesh based on a two-dimensional position of the displacement input relative to the two-dimensional image and the projection from the two-dimensional image onto the plurality of three-dimensional object meshes. For example, act 2306 involves determining a two-dimensional position of the displacement input relative to the two-dimensional image. Act 2306 also involves determining a three-dimensional position corresponding to a three-dimensional object mesh of the plurality of three-dimensional object meshes based on a mapping between the two-dimensional image and a three-dimensional environment comprising the plurality of three-dimensional object meshes.

In one or more embodiments, act 2306 involve determining that the displacement input indicates a displacement direction for a portion of the selected three-dimensional object mesh. Act 2306 also involves modifying a portion of the selected three-dimensional object mesh by displacing the portion of the selected three-dimensional object mesh according to the displacement direction.

In one or more embodiments, act 2306 involves modifying the selected three-dimensional object mesh according to the displacement input without modifying one or more additional three-dimensional object meshes adjacent to the selected three-dimensional object mesh within a three-dimensional environment.

In one or more embodiments, act 2306 involves determining, based on an attribute of the displacement input, that the displacement input indicates one or more displacement directions for a portion of the selected three-dimensional object mesh. Act 2306 also involves displacing the portion of the selected three-dimensional object mesh in the one or more displacement directions.

Additionally, the series of acts 2300 includes an act 2308 of generating a modified two-dimensional image in response to modifying the selected three-dimensional object mesh. For example, act 2308 involves generating a modified two-dimensional image comprising at least one modified portion according to the displaced portion of the selected three-dimensional object mesh.

In one or more embodiments, act 2308 involves determining a two-dimensional position of the two-dimensional image corresponding to a three-dimensional position of the displaced portion of the selected three-dimensional object mesh based on a mapping between the plurality of three-dimensional object meshes and the two-dimensional image. Act 2308 also involves generating the modified two-dimensional image comprising the at least one modified portion at the two-dimensional position based on the three-dimensional position of the displaced portion of the selected three-dimensional object mesh.

In one or more embodiments, act 2308 involves determining that the displacement input indicates a displacement direction for the selected three-dimensional object mesh, the selected three-dimensional object mesh being adjacent an additional three-dimensional object mesh. Act 2308 also involves displacing a portion of the selected three-dimensional object mesh according to the displacement direction without modifying the additional three-dimensional object mesh.

According to one or more embodiments, act 2308 involves determining, based on a mapping between the two-dimensional image and the three-dimensional mesh, a two-dimensional position of the two-dimensional image corresponding to a three-dimensional position of the displaced portion of the selected three-dimensional object mesh. Act 2308 also involves generating the modified two-dimensional image comprising the at least one modified portion at the two-dimensional position of the two-dimensional image according to the displaced portion of the selected three-dimensional object mesh.

For example, act 2308 involves determining a mapping between the two-dimensional image and the three-dimensional mesh. Act 2308 involves determining a three-dimensional position of the displaced portion of the selected three-dimensional object mesh. Act 2308 further involves generating, based on the mapping between the two-dimensional image and the three-dimensional mesh, the modified two-dimensional image comprising the at least one modified portion at a two-dimensional position of the two-dimensional image corresponding to the three-dimensional position of the displaced portion of the selected three-dimensional object mesh.

Figure 24:
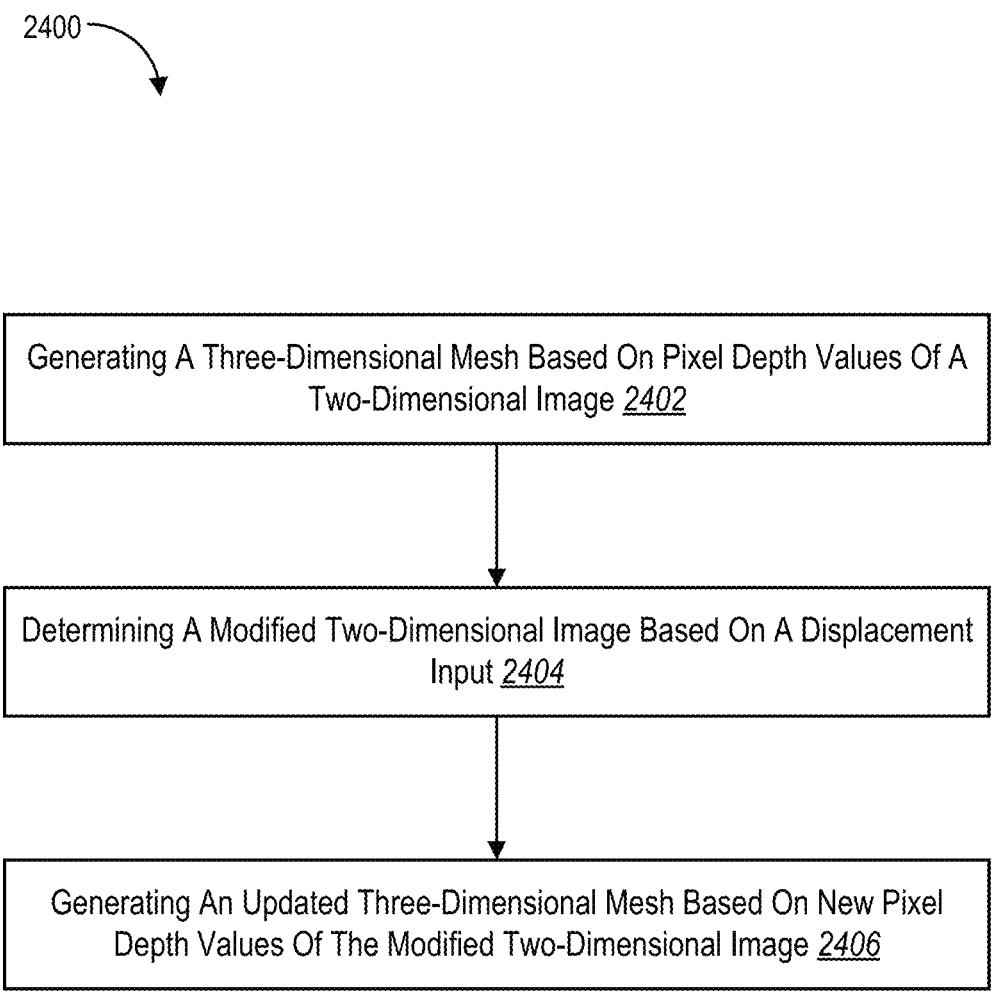
FIG. 24 illustrates a flowchart of a series of acts for modifying a two-dimensional image in an iterative tessellation process in accordance with one or more implementations.

Turning now to FIG. 24, this figure shows a flowchart of a series of acts 2400 of modifying a two-dimensional image in an iterative tessellation process. While FIG. 24 illustrates acts according to one embodiment, alternative embodiments may omit, add to, reorder, and/or modify any of the acts shown in FIG. 24. The acts of FIG. 24 are part of a method. Alternatively, a non-transitory computer readable medium comprises instructions, that when executed by one or more processors, cause the one or more processors to perform the acts of FIG. 24. In still further embodiments, a system includes a processor or server configured to perform the acts of FIG. 24.

As shown, the series of acts 2400 includes an act 2402 of generating a three-dimensional mesh based on pixel depth values of a two-dimensional image. For example, act 2402 involves generating, utilizing one or more neural networks, a three-dimensional mesh based on pixel depth values of a two-dimensional image. For example, act 2402 involves generating, utilizing one or more neural networks, a first three-dimensional mesh based on first pixel depth values of a two-dimensional image.

In one or more embodiments, act 2402 involves generating the three-dimensional mesh by determining displacement of vertices of a tessellation of the two-dimensional image based on the pixel depth values and estimated camera parameters. Act 2402 alternatively involves generating the three-dimensional mesh based on a plurality of points sampled in the two-dimensional image according to density values determined from the pixel depth values of the two-dimensional image.

Act 2402 can involve generating a first tessellation based on a first set of sampled points of the two-dimensional image. Act 2402 can involve determining, utilizing the one or more neural networks, the first pixel depth values according to estimated camera parameters corresponding to a viewpoint of the two-dimensional image.

The series of acts 2400 also includes an act 2404 of determining a modified two-dimensional image based on a displacement input. For example, act 2404 involves determining a modified two-dimensional image comprising at least one modified portion of the two-dimensional image based on a displacement input within a graphical user interface displaying the two-dimensional image. In one or more embodiments, act 2404 involves determining, based on a displacement input within a graphical user interface displaying the two-dimensional image, a modified two-dimensional image comprising at least one modified portion of the two-dimensional image according to a corresponding modified portion of the first three-dimensional mesh.

For example, act 2404 involves determining a displaced portion of the three-dimensional mesh based on the displacement input. Act 2404 also involves generating the modified two-dimensional image according to the displaced portion of the three-dimensional mesh.

Act 2404 can involve determining a two-dimensional position of the displacement input within the two-dimensional image. Act 2404 also involves determining a three-dimensional position of the displacement input on the first three-dimensional mesh based on the two-dimensional position of the displacement input within the two-dimensional image. Act 2404 further involves determining the at least one modified portion of the two-dimensional image at the two-dimensional position based on a modified portion of the first three-dimensional mesh at the three-dimensional position according to the displacement input.

Act 2404 can involve determining a displacement direction of the displacement input relative to the first three-dimensional mesh. Act 2404 can further involve determining the modified portion of the first three-dimensional mesh according to the displacement direction of the displacement input. To illustrate, act 2404 involves determining a displaced portion of the three-dimensional mesh based on one or more displacement directions of the displacement input, and determining the at least one modified portion of the two-dimensional image based on the displaced portion of the three-dimensional mesh.

Act 2404 can involve determining that the at least one modified portion of the two-dimensional image comprises an image artifact. Act 2404 also involves generating, utilizing an inpainting neural network, inpainted image content correcting the image artifact within the at least one modified portion. Act 2404 can also involve generating, utilizing an inpainting neural network, inpainted image content for the at least one modified portion of the two-dimensional image in response to detecting an artifact in the at least one modified portion of the two-dimensional image.

The series of acts 2400 further includes an act 2406 of generating an updated three-dimensional mesh based on new pixel depth values of the modified two-dimensional image. For example, act 2406 involves generating, utilizing the one or more neural networks, an updated three-dimensional mesh based on new pixel depth values for the modified two-dimensional image according to the at least one modified portion. For example, act 2406 involves generating, utilizing the one or more neural networks, a second three-dimensional mesh based on second pixel depth values for the modified two-dimensional image according to the at least one modified portion.

In one or more embodiments, act 2406 involves determining the new pixel depth values for the modified two-dimensional image in response to detecting an action to commit the at least one modified portion.

Additionally, act 2406 can involve generating the second three-dimensional mesh comprises generating a second tessellation based on a second set of sampled points of the modified two-dimensional image. Act 2406 can involve determining, utilizing the one or more neural networks, the second pixel depth values according to the estimated camera parameters corresponding to the viewpoint of the two-dimensional image.

Act 2406 involves sampling a plurality of points of the modified two-dimensional image according to density values corresponding to pixels of the modified two-dimensional image. Act 2406 further involves generating the updated three-dimensional mesh based on the plurality of points sampled in the modified two-dimensional image.

In one or more embodiments, act 2406 involves generating the second three-dimensional mesh in response to request to commit the at least one modified portion of the two-dimensional image. For example, act 2406 involves detecting an action to generate the modified two-dimensional image by committing a displacement of the at least one modified portion to the two-dimensional image. Act 2406 also involves generating the updated three-dimensional mesh in response to committing the displacement of the at least one modified portion to the two-dimensional image.

Act 2406 also involves determining that an initial position of the at least one modified portion of the two-dimensional image obscures an additional portion of the two-dimensional image. Act 2406 involves generating the updated three-dimensional mesh by interpolating vertex positions in a portion of the three-dimensional mesh corresponding to the additional portion of the two-dimensional image obscured by the initial position of the at least one modified portion of the two-dimensional image.

In one or more embodiments, act 2406 involves interpolating, in connection with the at least one modified portion of the two-dimensional image, vertex positions of a plurality of vertices in a portion of the second three-dimensional mesh corresponding to an obscured portion of the two-dimensional image.

The series of acts 2400 can also include generating, in a plurality of displacement iterations comprising a plurality of displacement inputs within the graphical user interface, a plurality of updated three-dimensional meshes corresponding to a plurality of modified two-dimensional images in connection with the modified two-dimensional image.

In one or more embodiments, act 2402 involves sampling a first set of points of the two-dimensional image according to first density values corresponding to pixels of the two-dimensional image. Act 2402 further involves generating the three-dimensional mesh based on the first set of points sampled in the two-dimensional image. Accordingly, act 2406 involves sampling a second set of points of the modified two-dimensional image according to second density values corresponding to pixels of the modified two-dimensional image. Act 2406 also involves sampling a second set of points of the modified two-dimensional image according to second density values corresponding to pixels of the modified two-dimensional image. Act 2406 further involves generating the updated three-dimensional mesh based on the second set of points sampled in the modified two-dimensional image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 25:
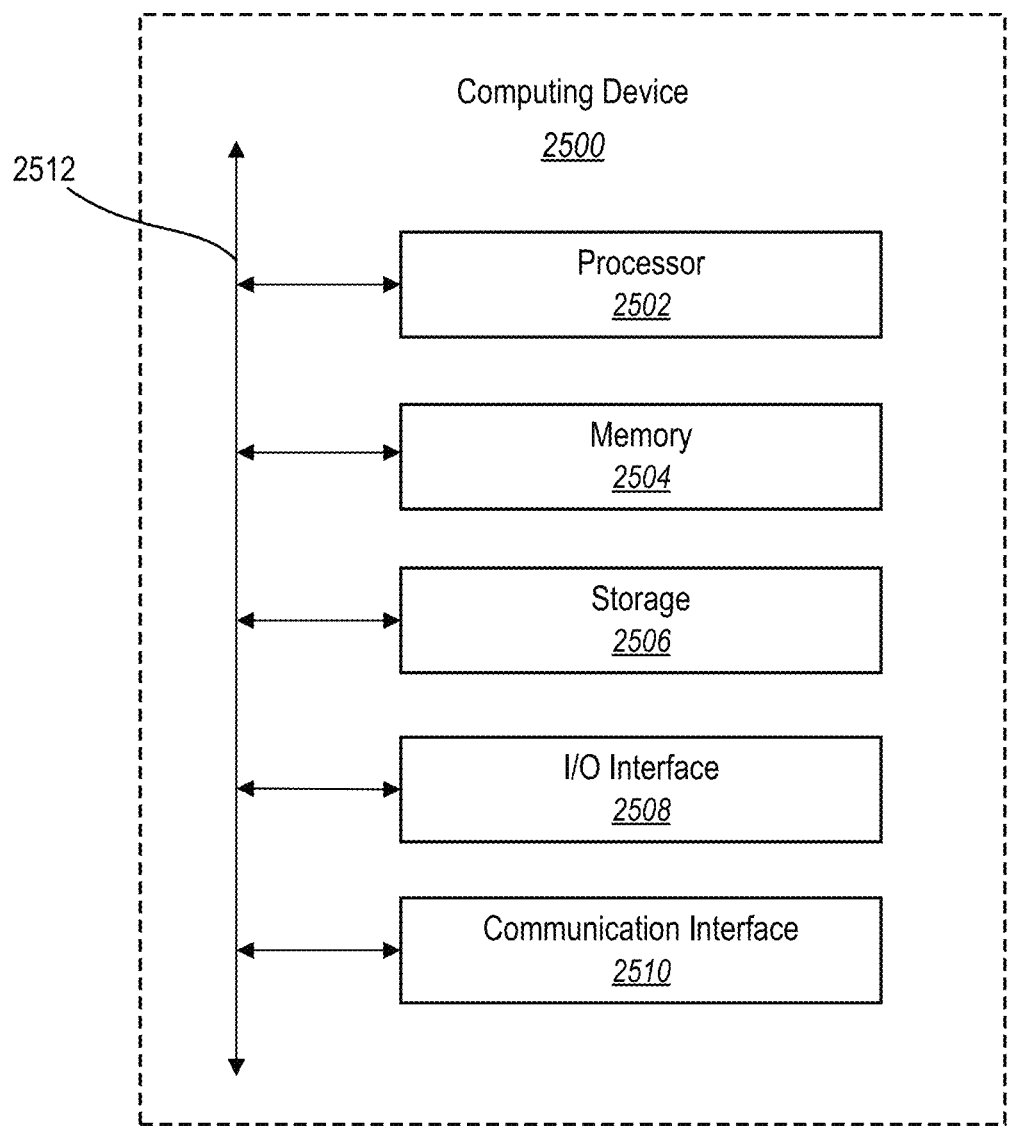
FIG. 25 illustrates a block diagram of an exemplary computing device in accordance with one or more embodiments.

FIG. 25 illustrates a block diagram of exemplary computing device 2500 that may be configured to perform one or more of the processes described above. One will appreciate that one or more computing devices such as the computing device 2500 may implement the system(s) of FIG. 1. As shown by FIG. 25, the computing device 2500 can comprise a processor 2502, a memory 2504, a storage device 2506, an I/O interface 2508, and a communication interface 2510, which may be communicatively coupled by way of a communication infrastructure 2512. In certain embodiments, the computing device 2500 can include fewer or more components than those shown in FIG. 25. Components of the computing device 2500 shown in FIG. 25 will now be described in additional detail.

In one or more embodiments, the processor 2502 includes hardware for executing instructions, such as those making up a computer program. As an example, and not by way of limitation, to execute instructions for dynamically modifying workflows, the processor 2502 may retrieve (or fetch) the instructions from an internal register, an internal cache, the memory 2504, or the storage device 2506 and decode and execute them. The memory 2504 may be a volatile or non-volatile memory used for storing data, metadata, and programs for execution by the processor(s). The storage device 2506 includes storage, such as a hard disk, flash disk drive, or other digital storage device, for storing data or instructions for performing the methods described herein.

The I/O interface 2508 allows a user to provide input to, receive output from, and otherwise transfer data to and receive data from computing device 2500. The I/O interface 2508 may include a mouse, a keypad or a keyboard, a touch screen, a camera, an optical scanner, network interface, modem, other known I/O devices or a combination of such I/O interfaces. The I/O interface 2508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 2508 is configured to provide graphical data to a display for presentation to a user. The graphical data may be representative of one or more graphical user interfaces and/or any other graphical content as may serve a particular implementation.

The communication interface 2510 can include hardware, software, or both. In any event, the communication interface 2510 can provide one or more interfaces for communication (such as, for example, packet-based communication) between the computing device 2500 and one or more other computing devices or networks. As an example, and not by way of limitation, the communication interface 2510 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 2510 may facilitate communications with various types of wired or wireless networks. The communication interface 2510 may also facilitate communications using various communication protocols. The communication infrastructure 2512 may also include hardware, software, or both that couples components of the computing device 2500 to each other. For example, the communication interface 2510 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
   generating, by at least one processor utilizing one or more neural networks, a three-dimensional mesh by determining displacement of vertices of a tessellation of a two-dimensional image based on pixel depth values of the two-dimensional image;
   segmenting, by the at least one processor utilizing the one or more neural networks, the three-dimensional mesh into a plurality of three-dimensional object meshes corresponding to a plurality of distinct objects of the two-dimensional image;
   modifying, by the at least one processor in response to a displacement input to the two-dimensional image within a graphical user interface displaying the two-dimensional image, a selected three-dimensional object mesh of the plurality of three-dimensional object meshes based on a displaced portion of the selected three-dimensional object mesh corresponding to the displacement input to the two-dimensional image; and
   generating, by the at least one processor, a modified two-dimensional image comprising at least one modified portion according to the displaced portion of the selected three-dimensional object mesh.

2. The method of claim 1, wherein generating the three-dimensional mesh comprises:
   generating the three-dimensional mesh by determining the displacement of the vertices of the tessellation of the two-dimensional image based on the pixel depth values and estimated camera parameters; or
   generating the three-dimensional mesh based on a plurality of points sampled in the two-dimensional image according to density values determined from the pixel depth values of the two-dimensional image.

3. The method of claim 1, wherein segmenting the three-dimensional mesh comprises:
   detecting one or more objects in the two-dimensional image or in the three-dimensional mesh; and
   separating a first portion of the three-dimensional mesh from a second portion of the three-dimensional mesh based on the one or more objects detected in the two-dimensional image or in the three-dimensional mesh.

4. The method of claim 3, wherein segmenting the three-dimensional mesh comprises:
   determining a semantic map comprising labels indicating object classifications of pixels in the two-dimensional image; and
   detecting the one or more objects in the two-dimensional image based on the labels of the semantic map.

5. The method of claim 3, wherein segmenting the three-dimensional mesh comprises:
   determining a depth discontinuity at a portion of the three-dimensional mesh based on corresponding pixel depth values of the two-dimensional image; and
   detecting the one or more objects in the three-dimensional mesh based on the depth discontinuity at the portion of the three-dimensional mesh.

6. The method of claim 1, wherein modifying the selected three-dimensional object mesh comprises:
   determining a projection from the two-dimensional image onto the plurality of three-dimensional object meshes in a three-dimensional environment; and
   determining the selected three-dimensional object mesh based on a two-dimensional position of the displacement input relative to the two-dimensional image and the projection from the two-dimensional image onto the plurality of three-dimensional object meshes.

7. The method of claim 1, wherein modifying the selected three-dimensional object mesh comprises:
   determining that the displacement input indicates a displacement direction for a portion of the selected three-dimensional object mesh; and
   modifying a portion of the selected three-dimensional object mesh by displacing the portion of the selected three-dimensional object mesh according to the displacement direction.

8. The method of claim 1, wherein generating the modified two-dimensional image comprises:
   determining a two-dimensional position of the two-dimensional image corresponding to a three-dimensional position of the displaced portion of the selected three-dimensional object mesh based on a mapping between the plurality of three-dimensional object meshes and the two-dimensional image; and
   generating the modified two-dimensional image comprising the at least one modified portion at the two-dimensional position based on the three-dimensional position of the displaced portion of the selected three-dimensional object mesh.

9. The method of claim 1, wherein modifying the selected three-dimensional object mesh comprises modifying the selected three-dimensional object mesh according to the displacement input without modifying one or more additional three-dimensional object meshes adjacent to the selected three-dimensional object mesh within a three-dimensional environment.

10. A system comprising:
    a memory component; and
    a processing device coupled to the memory component, the processing device to perform operations comprising:
       generating, utilizing one or more neural networks, a three-dimensional mesh by determining displacement of vertices of a tessellation of a two-dimensional image based on pixel depth values of the two-dimensional image;
       detecting, utilizing one or more object detection models, a plurality of distinct objects of the two-dimensional image;
       segmenting, in response to detecting the plurality of distinct objects, the three-dimensional mesh into a plurality of three-dimensional object meshes corresponding to the plurality of distinct objects of the two-dimensional image;
       modifying, in response to a displacement input to the two-dimensional image within a graphical user interface displaying the two-dimensional image, a selected three-dimensional object mesh of the plurality of three-dimensional object meshes based on a displaced portion of the selected three-dimensional object mesh corresponding to the displacement input to the two-dimensional image; and
       generating a modified two-dimensional image comprising at least one modified portion according to the displaced portion of the selected three-dimensional object mesh.

11. The system of claim 10, wherein detecting the plurality of distinct objects comprises:
    generating, utilizing the one or more object detection models, a semantic map comprising labels indicating object classifications of pixels in the two-dimensional image; and
    detecting the plurality of distinct objects of the two-dimensional image based on the labels of the semantic map.

12. The system of claim 10, wherein detecting the plurality of distinct objects comprises:
    determining, based on the pixel depth values of the two-dimensional image, a portion of the two-dimensional image comprising a depth discontinuity between adjacent regions of the two-dimensional image; and
    determining that a first region of the adjacent regions corresponds to a first object and a second region of the adjacent regions corresponds to a second object.

13. The system of claim 10, wherein modifying the selected three-dimensional object mesh comprises:
    determining a two-dimensional position of the displacement input relative to the two-dimensional image; and
    determining a three-dimensional position corresponding to a three-dimensional object mesh of the plurality of three-dimensional object meshes based on a mapping between the two-dimensional image and a three-dimensional environment comprising the plurality of three-dimensional object meshes.

14. The system of claim 10, wherein modifying the selected three-dimensional object mesh comprises:
    determining, based on an attribute of the displacement input, that the displacement input indicates one or more displacement directions for a portion of the selected three-dimensional object mesh; and
    displacing the portion of the selected three-dimensional object mesh in the one or more displacement directions.

15. The system of claim 10, wherein generating the modified two-dimensional image comprises:
    determining that the displacement input indicates a displacement direction for the selected three-dimensional object mesh, the selected three-dimensional object mesh being adjacent an additional three-dimensional object mesh; and
    displacing a portion of the selected three-dimensional object mesh according to the displacement direction without modifying the additional three-dimensional object mesh.

16. The system of claim 10, wherein generating the modified two-dimensional image comprises:
    determining, based on a mapping between the two-dimensional image and the three-dimensional mesh, a two-dimensional position of the two-dimensional image corresponding to a three-dimensional position of the displaced portion of the selected three-dimensional object mesh; and generating the modified two-dimensional image comprising the at least one modified portion at the two-dimensional position of the two-dimensional image according to the displaced portion of the selected three-dimensional object mesh.

17. A non-transitory computer readable medium comprising instructions, which when executed by a processing device, cause the processing device to perform operations comprising:

generating, by at least one processor utilizing one or more neural networks, a three-dimensional mesh by determining displacement of vertices of a tessellation of a two-dimensional image based on pixel depth values of the two-dimensional image;

segmenting, by the at least one processor utilizing the one or more neural networks, the three-dimensional mesh into a plurality of three-dimensional object meshes corresponding to a plurality of distinct objects of the two-dimensional image;

modifying, by the at least one processor in response to a displacement input to the two-dimensional image within a graphical user interface displaying the two-dimensional image, a selected three-dimensional object mesh of the plurality of three-dimensional object meshes based on a displaced portion of the selected three-dimensional object mesh corresponding to the displacement input to the two-dimensional image; and generating, by the at least one processor, a modified two-dimensional image comprising at least one modified portion according to the displaced portion of the selected three-dimensional object mesh.

18. The non-transitory computer readable medium of claim 17, wherein segmenting the three-dimensional mesh into the plurality of three-dimensional object meshes comprises:

detecting the plurality of distinct objects of the two-dimensional image according to: a semantic map corresponding to the two-dimensional image; or
depth discontinuities based on the pixel depth values of the two-dimensional image;
and
separating the three-dimensional mesh into the plurality of three-dimensional object meshes in response to detecting the plurality of distinct objects of the two-dimensional image.

19. The non-transitory computer readable medium of claim 17, wherein modifying the selected three-dimensional object mesh comprises displacing a portion of the selected three-dimensional object mesh according to a displacement direction of the displacement input.

20. The non-transitory computer readable medium of claim 17, wherein generating the modified two-dimensional image comprises:

determining a mapping between the two-dimensional image and the three-dimensional mesh;
determining a three-dimensional position of the displaced portion of the selected three-dimensional object mesh; and
generating, based on the mapping between the two-dimensional image and the three-dimensional mesh, the modified two-dimensional image comprising the at least one modified portion at a two-dimensional position of the two-dimensional image corresponding to the three-dimensional position of the displaced portion of the selected three-dimensional object mesh.

* * * * *